United States Patent
Graham et al.

(10) Patent No.: US 9,333,814 B2
(45) Date of Patent: May 10, 2016

(54) SYSTEM AND METHOD FOR PERFORMING AUTO-LOCATION OF A TIRE PRESSURE MONITORING SENSOR ARRANGED WITH A VEHICLE WHEEL USING CONFIDENCE INTERVAL ANALYSIS AND ROLLBACK EVENTS

(71) Applicant: Schrader Electronics Ltd., Antrim (GB)

(72) Inventors: Gary Graham, Co. Antrim (GB); Peter Walker, Co. Londonderry (GB); Alan Millen, Co. Londonderry (GB); Steven Baird, Co. Londonderry (GB); John Greer, Co. Antrim (GB); James Coalter, Co. Fermanagh (GB)

(73) Assignee: Schrader Electronics Ltd., Antrim, Northern Ireland (GB)

( * ) Notice: Subject to any disclaimer, the term of this patent is extended or adjusted under 35 U.S.C. 154(b) by 135 days.

(21) Appl. No.: 13/973,855

(22) Filed: Aug. 22, 2013

(65) Prior Publication Data
US 2015/0057876 A1 Feb. 26, 2015

(51) Int. Cl.
*B60C 23/04* (2006.01)
*G01B 21/22* (2006.01)

(52) U.S. Cl.
CPC ......... *B60C 23/0416* (2013.01); *B60C 23/0489* (2013.01)

(58) Field of Classification Search
None
See application file for complete search history.

(56) References Cited

U.S. PATENT DOCUMENTS

| | | |
|---|---|---|
| 4,966,034 A | 10/1990 | Bock et al. |
| 5,612,671 A | 3/1997 | Mendez et al. |
| 6,112,587 A | 9/2000 | Oldenettel |

(Continued)

FOREIGN PATENT DOCUMENTS

| | | |
|---|---|---|
| DE | 102005016110 A1 | 10/2006 |
| EP | 1193151 A2 | 3/2002 |

OTHER PUBLICATIONS

PCT International Search Report and Written Opinion for PCT/US2010/049871, mailing date Dec. 6, 2010.

(Continued)

*Primary Examiner* — John R Olszewski
*Assistant Examiner* — Jason Roberson
(74) *Attorney, Agent, or Firm* — Holland & Hart LLP

(57) ABSTRACT

Auto-location systems and methods of tire pressure monitoring sensor units arranged with a wheel of a vehicle detect a predetermined time (T1) when a wheel phase angle reaches angle of interest using a rim mounted or a tire mounted sensor. The systems and methods transmit a radio frequency message associated with a wheel phase angle indication. The wheel phase angle indication triggers wheel phase and/or speed data such as ABS data at the predetermined time (T1) to be stored. A correlation algorithm is executed to identify the specific location of a wheel based on the wheel phase and/or speed data at the predetermined time (T1). TPM sensor parameters from a tire pressure monitoring sensor unit are assigned to the specific location of the wheel based on a confidence interval width analysis of the ABS data at the predetermined (T1). The confidence interval width analysis identifies the specific location of the wheel whose ABS sensor shows a lowest confidence interval width as a result of a normal distribution pattern or similar pattern. The confidence interval width analysis may calculate a weighted cumulative confidence interval width for the ABS data which experience rollback events.

20 Claims, 38 Drawing Sheets

(56) References Cited

U.S. PATENT DOCUMENTS

| | | | |
|---|---|---|---|
| 6,340,930 | B1 | 1/2002 | Lin |
| 6,435,020 | B1 | 8/2002 | Oldenettel et al. |
| 6,463,391 | B1 * | 10/2002 | Early .......................... 702/85 |
| 6,486,773 | B1 | 11/2002 | Bailie et al. |
| 6,885,293 | B2 | 4/2005 | Okumura |
| 6,922,140 | B2 | 7/2005 | Hernando et al. |
| 6,988,026 | B2 | 1/2006 | Breed et al. |
| 7,010,968 | B2 | 3/2006 | Stewart et al. |
| 7,053,761 | B2 | 5/2006 | Schofield et al. |
| 7,205,886 | B2 | 4/2007 | Kin |
| 7,336,161 | B2 | 2/2008 | Walraet |
| 7,362,218 | B2 | 4/2008 | McCall et al. |
| 7,367,227 | B2 | 5/2008 | Stewart et al. |
| 7,404,427 | B2 | 7/2008 | Hillman et al. |
| 8,013,725 | B2 | 9/2011 | Murata et al. |
| 2002/0084896 | A1 | 7/2002 | Dixit et al. |
| 2004/0136628 | A1 * | 7/2004 | Inoue ........................... 384/448 |
| 2004/0257213 | A1 | 12/2004 | Tsujita |
| 2005/0068161 | A1 | 3/2005 | Ichinose et al. |
| 2011/0071737 | A1 | 3/2011 | Greer et al. |
| 2011/0169627 | A1 | 7/2011 | Fink |
| 2011/0170763 | A1 * | 7/2011 | Seubert et al. ................ 382/141 |
| 2011/0313623 | A1 * | 12/2011 | Greer et al. .................... 701/49 |
| 2012/0194333 | A1 | 8/2012 | Kessler |
| 2012/0259507 | A1 | 10/2012 | Fink |

OTHER PUBLICATIONS

International Search Report, International application No. PCT/IB2014/00255 dated Mar. 5, 2015 from the European Patent Office.

* cited by examiner

| WU | ABS sensor | ABS Sensor location | Histogram array for LR Wheel unit (Correlated ABS tooth counts) | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
| 101 | 201 | LF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | RF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | RR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | LR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 102 | 202 | LF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | RF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | RR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | LR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 103 | 203 | LF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | RF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | RR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | LR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 104 | 204 | LF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | RF | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | RR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | LR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Figure 17

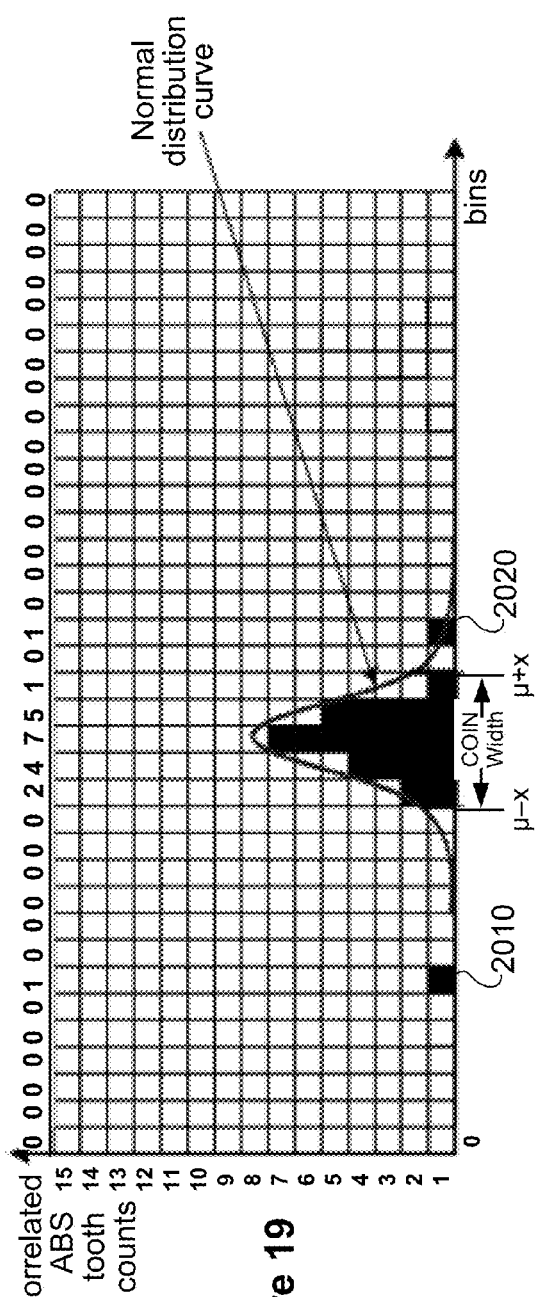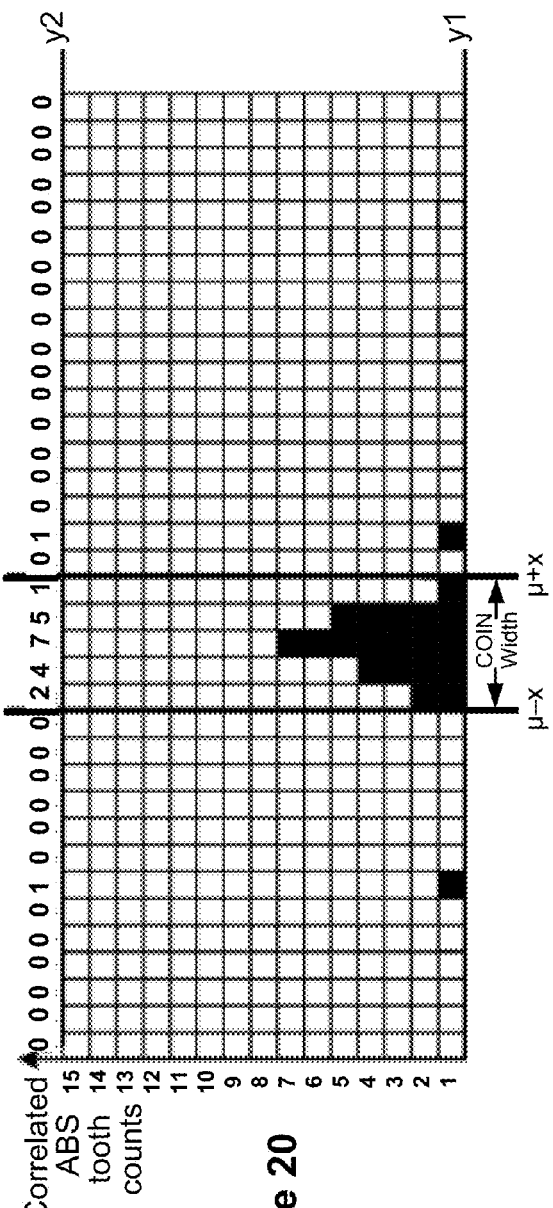

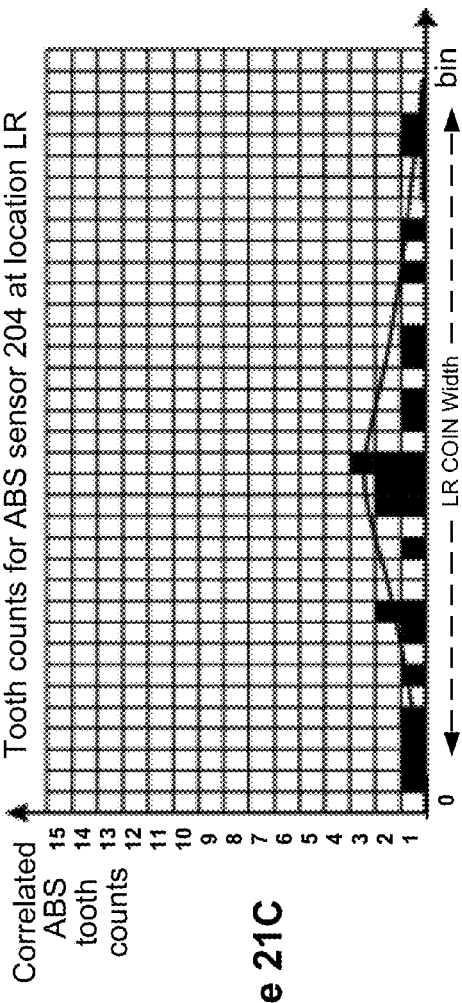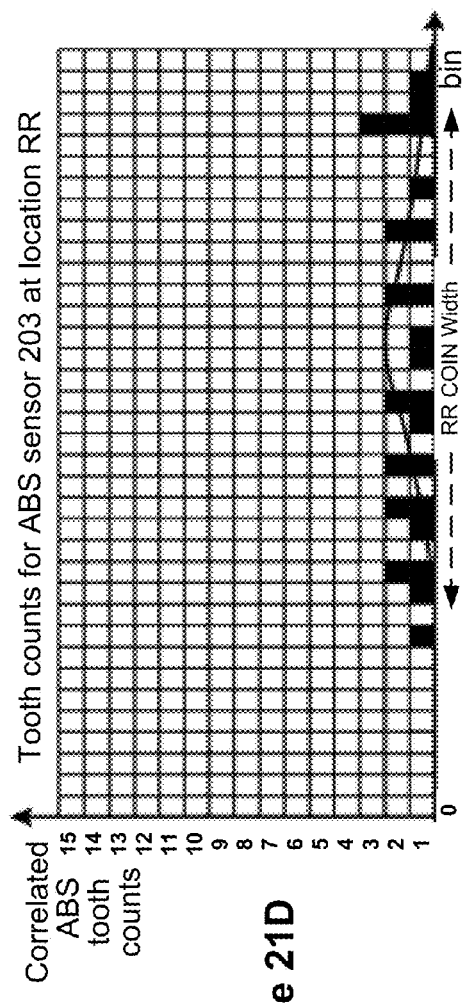

SYSTEM AND METHOD FOR PERFORMING AUTO-LOCATION OF A TIRE PRESSURE MONITORING SENSOR ARRANGED WITH A VEHICLE WHEEL USING CONFIDENCE INTERVAL ANALYSIS AND ROLLBACK EVENTS

BACKGROUND

1. Technical Field

This application relates generally to a system and method for performing auto-location of a wheel in a vehicle and more particularly to a tire pressure monitoring system and method for performing auto-location of a tire pressure monitoring sensor arranged with a vehicle wheel using confidence interval analysis. This application further relates to a tire pressure monitoring system and method for performing auto-location of a tire pressure monitoring sensor using confidence interval analysis which takes into consideration rollback events of wheels.

2. Related Art

In tire pressure monitoring systems, performing auto-location of a wheel is needed for a number of reasons. Tire pressure monitoring systems generally include a tire pressure monitoring (TPM) sensor in or at each wheel of a vehicle and a central controller which receives tire pressure information from each TPM sensor, to be reported to the driver of the vehicle. Auto-location is the identification of each TPM sensor and determination of its position on the vehicle, automatically and without human intervention. Auto-location may be done initially upon installation and subsequently in the event of tire rotation or replacement. Performing auto-location involves determining the identity or serial number of a TPM sensor in each of the wheels in the car. In premium vehicles, knowing the identity of the TPM sensor in each wheel allows a pressure by position display to be implemented and shown to the driver. In basic vehicles with different placard tire pressures for front and rear axles, it is desirable to know TPM sensor identities and positions in order to check pressure against a correct threshold for an applicable axle.

Auto-location may use antilock brake systems ("ABS") which are employed in most vehicles. The ABS allows independent wheel speeds to be monitored in near real-time. In one embodiment, the wheel phase and/or speed data includes or is based on the ABS data. The ABS data typically indicates ABS tooth counts. By analyzing ABS tooth counts, correlation between ABS data and other data from TPM sensors can be used to locate wheel positions where the TPM sensors are arranged. ABS sensors provide the ABS data and may be associated with one or more wheels. As one example, ABS sensors are associated with each wheel of a vehicle, or with selected wheels of the vehicle. The wheel phase and/or speed data is not limited to the ABS data. A sensor, a device, a system, or a mechanism that may provide wheel phase and/or speed data directly or in various forms may be used in addition to, or instead of antilock brake systems.

The ABS data may be analyzed statistically. For instance, a historic trace of the ABS data may be observed to determine the location of a wheel based on a statistically significant value of the ABS data, or based on a lowest standard variation of ABS tooth count values. Statistical analysis involving a standard deviation, a variance, dispersion, etc. may fully take even extreme data points into consideration and such data points may significantly influence determination of the location of the wheel. The extreme data points may be caused by nuisance factors such as road noise, vehicle vibrations, error in ABS source data, communication delays, etc. Accordingly, the extreme data points may cause irregular and unexpected changes to the ABS data which may bias the auto-location of the wheel.

The ABS data such as ABS tooth counts increment upwards, regardless of whether a wheel associated with an ABS sensor rotates clockwise or counter clockwise. Any counter clockwise movement over the course of a drive may cause the mean of correlated ABS tooth counts to shift. Accordingly, the counter clockwise movement of the wheel may need to be monitored and upon detection of such movement, it is desirable to take the ABS tooth counts associated with the counter clockwise movement into a consideration in performing the auto-location.

SUMMARY

The present embodiments are directed to auto-location systems and methods in which ABS sensor data is correlated with a radio frequency transmission from a TPM sensor located at or on a specific wheel and such correlation is analyzed based on a confidence interval of a histogram representing correlated ABS sensor data to determine a location of the TPM sensor at or on the specific wheel on a vehicle. The present embodiments determine the wheel location in order to determine the location of a TPM sensor arranged with the wheel. In the present embodiments, the auto-location of a wheel indicates auto-location of the TPM sensor arranged with the wheel so that parameters from the TPM sensor may be assigned to the wheel. ABS sensor data, such as correlated ABS tooth counts, are converted and stored in a histogram array. A normal or Gaussian distribution pattern is portrayed from a histogram of an ABS sensor associated with a wheel having a TPM sensor which transmits RF transmissions. On the other hand, a random distribution pattern is portrayed from a histogram of an ABS sensor associated with different wheels where the TPM sensor is not arranged. The location of the wheel where the TPM sensor is mounted is identified based on the histogram of actual ABS sensor data which resembles a normal distribution pattern. The histogram having the most normal distribution pattern shows a lowest confidence interval width. The histogram having a more random distribution pattern shows a significantly higher confidence interval width. Based on the lowest confidence interval width, the wheel location of the TPM sensor is identified.

By way of example, one embodiment of a wheel auto-location method includes (i) the step of receiving a radio frequency (RF) transmission that indicates one-measurement point during a rotation of a wheel and tire pressure monitoring (TPM) sensor parameters, wherein the RF transmission is associated with a phase correlation data storage event trigger and (ii) the step of storing a current content of a rolling window of an antilock brake system (ABS) data indicative of a wheel phase angle in response to the phase correlation data storage event trigger, wherein a time period covered by the rolling window is the same or greater than a time period between the one-measurement point and a receipt point of the RF transmission, and the current content of the rolling window corresponds to the ABS data between the one-measurement point and the receipt point of the RF transmission. The one-measurement point is calculated based on the time period between the one-measurement point and the receipt point of the RF transmission, and relevant ABS data is determined from the current content of the rolling window of the ABS data based on the one-measurement point over time. The relevant correlated ABS data is converted in a histogram array and a confidence interval (COIN) width value is calculated from the histogram array. The wheel auto-location method further includes the step of applying an auto-location algorithm to identify a specific location of the wheel based on a lowest COIN width value where the TPM sensor parameters are associated with the specific location of the wheel.

In one embodiment, a method for performing auto-location of a wheel in a vehicle includes the steps of arranging a wheel unit to be associated with a wheel of the vehicle, the wheel unit comprising a tire pressure monitoring ("TPM") sensor and a wheel phase angle sensor and the wheel unit transmitting TPM sensor parameters; arranging an antilock brake system ("ABS") sensor to be associated with each wheel of the vehicle, the ABS sensor producing ABS data indicative of the wheel phase angle; upon rotation of the wheel, detecting with the wheel phase angle sensor a first time (T1) at a predetermined wheel phase angle; at a second time (T2), sending from the wheel unit an radio frequency (RF) transmission; at an electronic control unit ("ECU"), receiving the RF transmission; continually maintaining a rolling window of the ABS data associated with each wheel; storing a current content of the rolling window of ABS data for each wheel upon receipt of the RF transmission; and calculating the first time (T1) based on a predetermined time delay (T2−T1) between the first time (T1) and the second time (T2); determining the ABS data at the first time (T1) for each wheel. The method further includes the steps of converting the ABS data at the first time (T1) in a histogram array, calculating a confidence interval (COIN) width value from the histogram array and identifying a location of the wheel whose COIN width value of ABS data is the smallest.

Another embodiment of the present invention includes a wheel auto-location method includes (i) receiving an RF transmission indicating a predetermined one-measurement point during rotation of a wheel and TPM sensor parameters; (ii) calculating the predetermined one-measurement point based on the RF transmission; (iii) maintaining a rolling window of ABS data and capturing a relevant rolling window of ABS data at the predetermined one-measurement point; (iv) monitoring the ABS data and detecting a valid rollback event which causes the ABS data to represent an irregular pattern; (v) correlating the ABS data at the one-measurement point with a specific location of a wheel based on COIN width analysis of the relevant rolling window of ABS data at the predetermined one-measurement point; and (vi) determining the specific location of the wheel where the TPM sensor parameters are assigned.

Another embodiment of the present invention includes a tire pressure monitoring system for performing auto-location of a wheel in a vehicle. The system includes a wheel unit to be associated with a wheel of the vehicle. The wheel unit includes a TPM sensor that measures TPM sensor parameters of the wheel and a wheel phase angle sensor that detects an angle of interest (P1) at a first time (T1), and the wheel unit transmits at the second time (T2) a radio frequency (RF) message including an identification of the TPM sensor and measured TPM sensor parameters. The system further includes an electronic control unit ("ECU") of the vehicle in communication with the wheel unit and an ABS sensor and computer program code operable in conjunction with the ECU of the vehicle. The ECU is in communication with the wheel unit and the ABS sensor of the vehicle. In response to the phase correlation data storage event trigger, the ECU is operable in response to the computer program code to execute instructions of (i) calculating the first time (T1) based on a predetermined time delay (T2−T1); (ii) storing a count of a number of ABS teeth or data which represents the number of ABS teeth that have passed each ABS sensor in a given period of time and is indicative of wheel phase angle based on a phase correlation data storage event trigger and determining the count of the number of ABS teeth or data at the first time (T1); (iii) correlating a location of the wheel with a location of the ABS sensor based on a COIN width value calculated from the distribution of correlated ABS teeth or data at the first time (T1); and (iv) associating the TPM sensor parameters with the determined location of the wheel.

The foregoing has outlined rather broadly some exemplary embodiments along with some features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification and in which like numerals designate like parts, illustrate embodiments of the present invention and together with the description, serve to explain the principles of the invention. In the drawings:

FIG. 17 illustrates one example of a histogram array structure.

FIG. 19 illustrates a histogram array of correlated ABS tooth counts with a normal distribution curve.

FIG. 20 illustrates the boundary of the histogram array of FIG. 19 defined by the observed confidence interval.

FIGS. 21A-21D illustrate different patterns of histograms with respect to correlated ABS tooth counts of four ABS sensors for a wheel unit 101 mounted at a left front location after twenty four (24) transmissions.

FIG. 28B illustrates three distinct localizations of distributed correlated ABS tooth counts around three different means μ1, μ2 and μ3.

DETAILED DESCRIPTION

Figure 1:
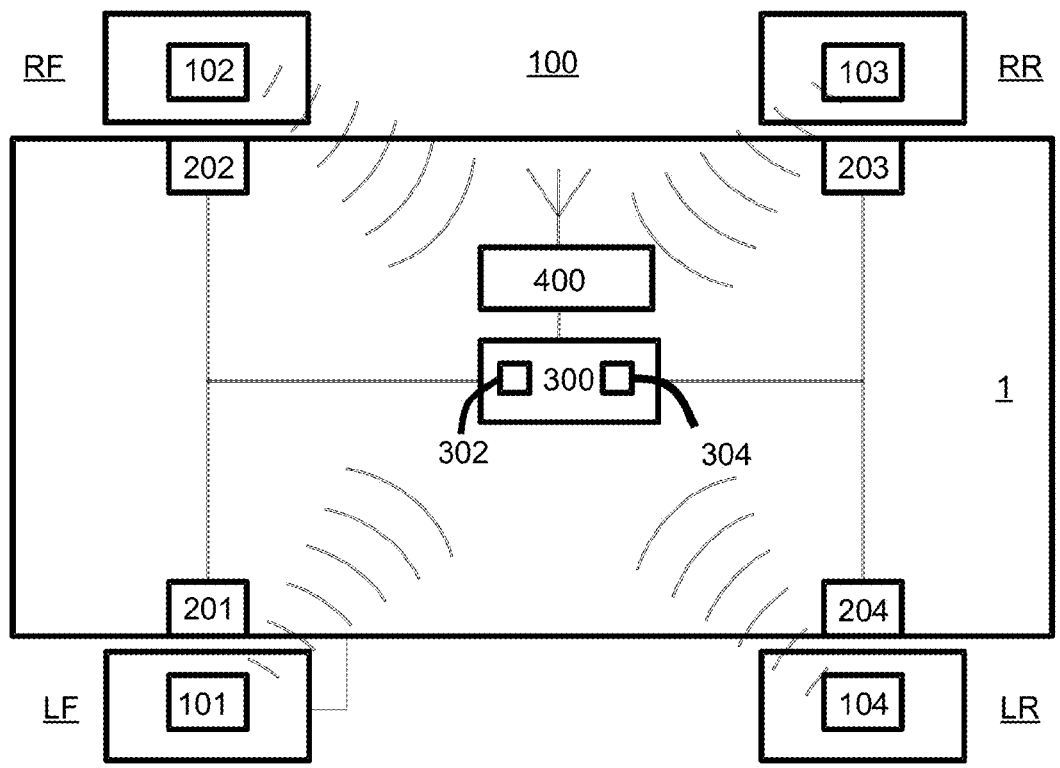
FIG. 1 illustrates one embodiment of a tire pressure monitoring system.

The present invention is directed to systems and methods in which a measurement from a wheel is combined or correlated with wheel phase and/or speed data such as antilock brake system (ABS) data to allow identification of tire pressure monitor (TPM) sensors to a specific location on a vehicle by using confidence interval analysis. In accordance with various embodiments of the present invention, a tire pressure monitoring system comprises wheel rim or tire mounted TPM sensors, typically four, and an Electronic Control unit (ECU) that receives signals from the TPM sensors. In addition, the system employs data presented to the ECU from the ABS module.

In accordance with various embodiments of the present invention, the identification of the TPM sensors may require snapshots of information at one-measurement point during a rotation of a wheel, where a snapshot is a capture of information from a short duration of a continuous stream of information. The ECU holds a rolling window of ABS data for all wheels or selected wheels associated with ABS sensors. When a radio frequency (RF) data frame is received, the ECU uses the RF data frame to store and determine relevant ABS data from the rolling window of the ABS data. An auto-location algorithm is applied to stored ABS data to identify a specific location of a wheel where a TPM sensor is arranged. The auto-location algorithm converts the correlated ABS data and stores it in memory in histogram arrays. In one embodiment, each correlated ABS tooth count per RF transmission is converted into an equivalent bin number and stored along with a number of occurrences of the same bin number in an array. The equivalent bin numbers and the number of occurrences of identical bin numbers are represented in two-dimensional histogram. For each histogram, a confidence interval width value is calculated.

It has been observed and determined through extensive testing and simulations that when correlation of RF transmissions from a wheel unit mounted at a selected wheel location and an ABS sensor mounted at the selected wheel location is plotted in a probability distribution function, it is portrayed as a normal distribution pattern about a mean value. On the other hand, a probability distribution function plotting correlation between RF transmissions from the wheel unit and ABS sensor or sensors mounted at the location other than the selected wheel location portrays a non-normal distribution, or a random distribution pattern. The confidence interval analysis takes advantage of an expected distribution shape of correlated ABS data, i.e., the normal distribution pattern or the random distribution pattern of correlated ABS data. The confidence interval analysis matches a distribution shape of actual data set with the expected distribution shape. In other words, the confidence interval analysis involves pattern-matching statistical analysis which enables association and location of each transmitting wheel unit to a respective wheel such wheel unit is mounted.

As the confidence interval analysis is based on the pattern-matching between the actual distribution shape and the expected distribution shape, it may not require measurements of absolute spread of data. Also, the confidence interval analysis may not require tracking and storing a mean value of distributions. Nor does the confidence interval analysis require a perfect normal distribution shape, as it uses the pattern matching between the actual and the expected distribution shapes. The actual random distribution shapes are significantly different from the normal distribution shape. The confidence interval analysis focuses on a highly relevant range of data rather than the entire range of data. Accordingly, the confidence interval analysis may avoid disproportional impacts on an overall analysis by extreme data points such as significantly low or high value of ABS data for a certain RF transmission in light of various nuisance factors. Extreme data points are to be expected during a regular course of driving of any vehicle. Thus, the confidence interval analysis may provide a reliable and robust technique for auto-location with high precision and accuracy.

Referring to FIGS. 1-13, embodiments of obtaining ABS data for each RF transmission from a wheel unit are explained. FIG. 1 illustrates a tire pressure monitoring system 100 according to a first embodiment of the present invention. The system 100 is arranged in a standard vehicle 1 having four wheels. Four wheels include a left front wheel (LF), a right front wheel (RF), a left rear wheel (LR) and a right rear wheel (RR). In another embodiment, the system 100 may be arranged in any other vehicle having a different number of wheels. The system 100 includes wheel units 101, 102, 103 and 104 that are associated with each wheel of the vehicle 1.

The system 100 further includes four antilock brake system (ABS) sensors 201, 202, 203 and 204. In this embodiment, ABS sensors 201, 202, 203, 204 are also associated with each wheel of the vehicle 1. Accordingly, each wheel is assigned with one of the wheel units 101, 102, 103 and 104 and one of ABS sensors 201, 202, 203 and 204. In another embodiment, ABS sensors 201, 202, 203, 204 may not be associated with all four wheels. Fewer numbers of ABS sensors may be present in a structure of a vehicle such as a single axle and associated with a few selected wheels.

The system 100 also includes an Electronic Control Unit (ECU) 300 and a receiver 400. The ECU 300 is coupled to the ABS sensors 201, 202, 203, 204 via a communication bus such as a Controller Area Network (CAN) bus and receives ABS data from the ABS sensors 201, 202, 203, 204. The ECU 300 includes a processor 302 and storage 304. The ECU 300 operates to store received ABS data in the storage 304 to provide a historic ABS trace. The ECU 300 may be implemented by any suitable means, for example a microprocessor, microcontroller, an Application Specific Integrated Circuit (ASIC), or other suitable data processing device programmed to perform the functions described herein. Further, the ECU 300 may communicate with other vehicle components using any other suitable device, either wire line or wireless. The CAN bus is an exemplary implementation of data communication among components of the vehicle. The ECU 300 stores computer program code. In one embodiment, the ECU 300 executes the computer program including instructions of calculating a first time (T1) based on a predetermined time delay (T2−T1), storing ABS data indicative of a wheel phase angle based on a phase correlation data storage event trigger and determining the ABS data at the first time (T1), and correlating a location of the wheel with a location of the ABS sensor based on a historic trace of the ABS data at the first time (T1).

The ECU 300 also receives data from the wheel units 101, 102, 103 and 104 via the receiver 400. For example, the wheel units 101, 102, 103 and 104 transmit radio frequency or other wireless communications conveying data and other information to the ECU 300. The respective wheel units include a suitable radio transmission circuit and the ECU 300 includes a suitable radio reception circuit for radio communication. Further, the radio circuits may use an agreed upon transmission and reception format and data encoding technique. The ECU 300 operates to correlate the data received from the wheel units 101, 102, 103 and 104 with the ABS data in order to perform auto-location, as will be discussed in detail below.

Figure 2:
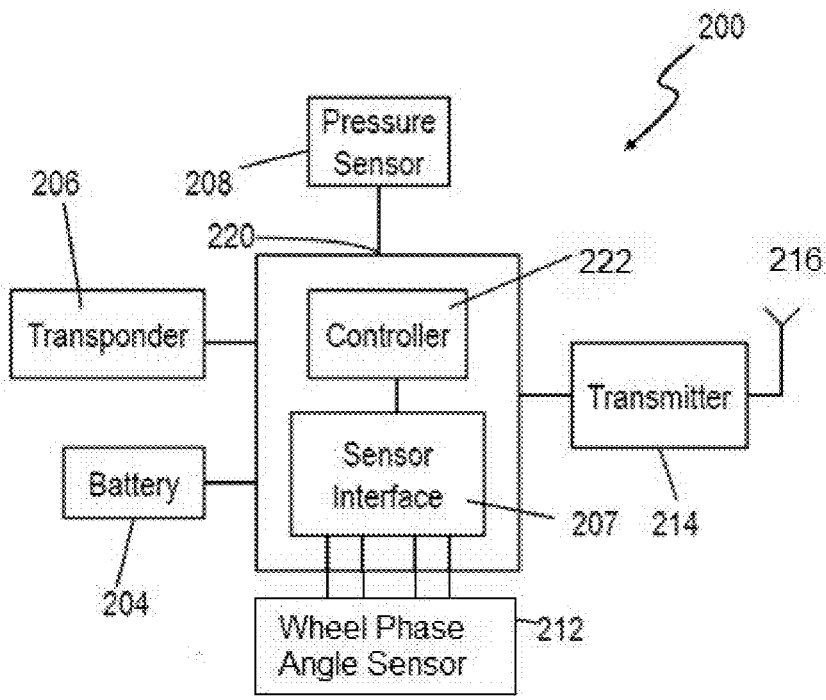
FIG. 2 illustrates one embodiment of a wheel unit for use with the tire pressure monitoring system.

Referring to FIG. 2, an exemplary structure of the wheel unit 101 is illustrated in more detail. The wheel units 102-104 may incorporate the same structure as that of the wheel unit 101. As shown in FIG. 2, the wheel unit 101 includes a microcontroller 222, a battery 204, a transponder coil 206, a sensor interface 207, a pressure sensor 208, a wheel phase angle sensor 212, a transmitter 214 and an antenna 216. In other embodiments, the wheel unit 101 may have a different structure from the structure illustrated in FIG. 2. The microcontroller 222 is coupled to the sensor interface 207. The sensor interface 207 is coupled to the wheel phase angle sensor 212. In one embodiment, the wheel phase angle sensor 212 measures a wheel phase angle at multiple different times. The wheel phase angle sensor 212 provides measurements to the sensor interface 207. Alternatively, or additionally, the wheel phase angle sensor 212 provides other value or information indicative of wheel phase angle measurements. The sensor interface 207 receives the measurements of the wheel phase angle sensor 212 in the form of an electrical output signal. The sensor interface 207 receives the electrical output signal and amplifies and filters the signal. The sensor interface 207 sends the processed signal to an analog to digital converter (not shown) in order to convert the signal into a digital signal. The microcontroller 222 receives the digital form of the output signal from the wheel phase angle sensor 212 for processing.

In the illustrated embodiment, the pressure sensor 208 detects the pneumatic air pressure of the tire with which the wheel unit 101 is associated. In alternative embodiments, the pressure sensor 208 may be supplemented with or replaced by a temperature sensor or other devices for detecting tire data. An indication of the tire pressure data is sent to the microcontroller 222 via the analog-to-digital converter (not shown).

The battery 204 is a power source of the wheel unit 101. The transponder coil 206 detects external activation of the transponder by a signal applied by a remote exciter and may modulate a signal to communicate data to a remote detector from the wheel unit 101. The wheel unit 101 provides data including tire pressure from the pressure sensor 208 and the wheel phase angle information from the wheel phase angle sensor 212 through the transmitter 214 and the antenna 216 to the ECU 300 (see FIG. 1).

Upon rotation of a wheel, the wheel phase angle sensor 212 operates to measure a wheel phase angle. The wheel phase angle measurements may not be against an absolute reference. The reference may be arbitrarily selected based on accuracy capability and ease of implementation or based on other criteria. In other words, the phase measurements do not have to be measured from a top of wheel, or road striking point. In this embodiment, the key piece of information may be a phase difference, or a phase delta of the wheel, and therefore, the requirement is that two different phase angles are measured relative to the same angle. Alternatively, or additionally, in another embodiment, the key piece of information may include one-measurement point during a rotation of a wheel.

The wheel phase angle sensor 212 may be mounted on a rim of the wheel, or a tire mounted sensor. Alternatively, or additionally, the wheel phase angle sensor 212 may be arranged on any suitable location associated with a wheel. In one embodiment, the wheel phase angle 212 includes a rotation sensor. For example, the rotation sensor may be a piezoelectric rotation sensor which measures a wheel phase angle based on the gravitational force. Specifically, as the wheel rotates, the gravitational force causes a sensing element of the rotation sensor to experience different forces which results in a different output signal representing a wheel phase angle or wheel angular position. In that way, the rotation sensor produces an output signal indicating a wheel phase angle at a predetermined time. The output signal of the rotation sensor may have different amplitude and/or different polarity depending on the wheel phase angle. For instance, the rotation sensor produces the output signal having amplitude M at 0 degrees and having the amplitude −M at 180 degrees. Alternatively, or additionally, any conventional rotation sensor may be used as the wheel phase angle sensor 212.

In another embodiment, the wheel phase angle sensor 212 comprises a shock sensor of the type that produces an electrical signal in response to acceleration. The electrical signal is indicative of, or typically proportional to, the experienced change in acceleration. Alternatively, the wheel phase angle sensor 212 may each comprise an accelerometer or a microelectromechanical systems (MEMS) sensor. The main difference between an accelerometer and a shock sensor is that the output signal from a shock sensor is related to a change of force applied to the shock sensor, whereas the output signal from an accelerometer is proportional to the absolute force applied. Shock sensors may be implemented, for example, with shock sensors discussed in commonly owned U.S. Pat. No. 7,362,218, issued Apr. 22, 2008 and entitled Motion Detection Using A Shock Sensor In A Remote Tire Pressure Monitor System and commonly owned U.S. Pat. No. 7,367,227, issued May 6, 2008 and entitled Determination Of Wheel Sensor Position Using Shock Sensors And A Wireless Solution, the disclosures of which are incorporated here in its entirety. Accelerometer sensors may be implemented, for example, with sensors discussed in commonly owned U.S. Pat. No. 7,010,968, issued Mar. 14, 2006 and entitled Determination Of Wheel Sensor Position Using A Wireless Solution, the disclosure of which is incorporated here in its entirety.

Figure 3A:
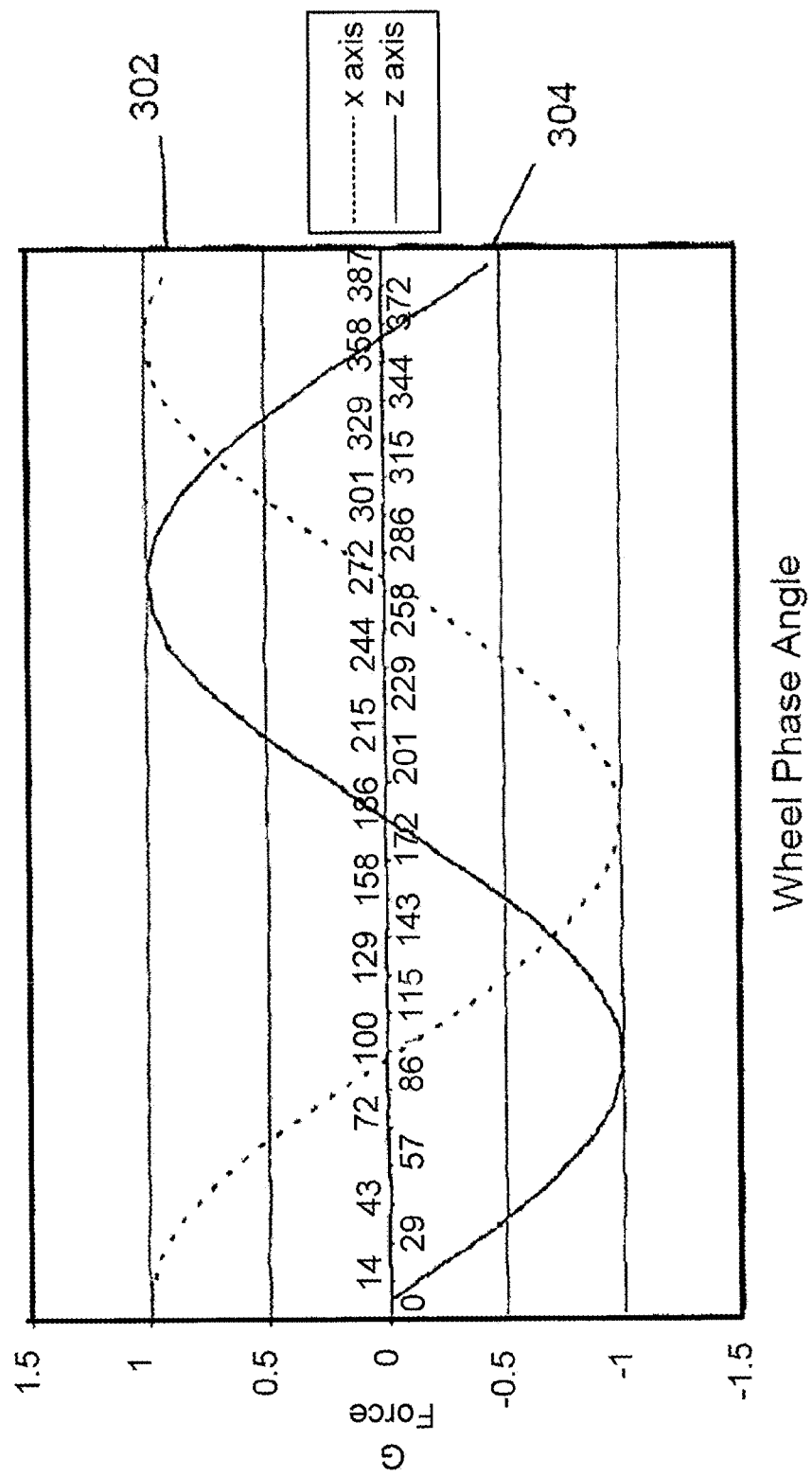
FIG. 3A illustrates a wheel phase angle as a function of the gravitational force, i.e., acceleration

In the embodiment where shock sensors or accelerometers are used as the wheel phase angle sensor 212, FIG. 3A is a graph illustrating a wheel phase angle or a wheel angular position as a function of the gravitational force or acceleration. In the illustrated embodiment, the wheel rotates counter clockwise, and acceleration along the axis 304 leads acceleration along the x axis by approximately 90 degrees. The output signal is a sinusoid with a period equal to one revolution of the wheel. The magnitude of the output signal is a voltage proportional to the change in acceleration or acceleration experienced by the wheel phase angle sensor 212 such as the shock sensors or accelerometers as they rotate. The graph as shown in FIG. 3A is by way of example, and the actual acceleration experienced in a moving wheel may be different from the amount illustrated in FIG. 3A.

Figure 3B:
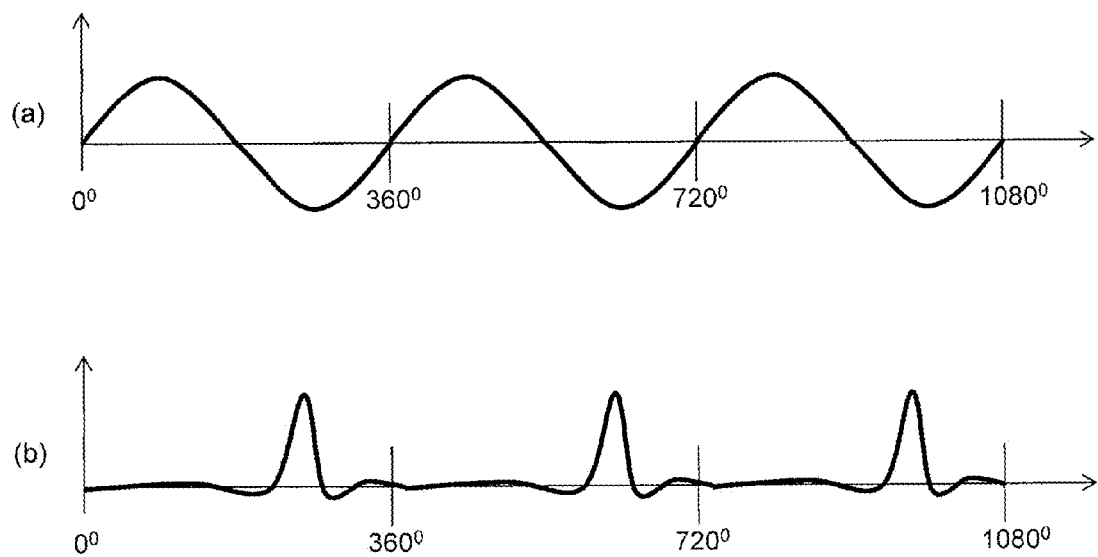
FIG. 3B illustrates phase varying signals from different sensors.

FIG. 3B(a) illustrates phase varying signals output from the wheel phase angle sensor 212 which may be a shock sensor or an accelerometer. FIG. 3B(b) illustrates phase varying signals output from the wheel phase angle sensor 212 which may be a Hall effect sensor, or a road striking sensor. The phase varying signals illustrated in FIG. 3B (a) and (b) are provided to the microcontroller 222. For example, the phase varying signals show in FIG. 3B may be voltage signals that are converted to digital data in an analog to digital converter. The digital data may be stored and processed by the microcontroller 222. The microcontroller 222 recognizes a repeated pattern in the phase varying signals and determines one rotation of the wheel. Then, the microcontroller 222 determines how far through the one rotation of the wheel it is at the first time (T1) and the second time (T2) and determines a first phase angle (P1) and a second phase angle (P2). Assuming that the phase-varying signal does not change its characteristics between the first time (T1) and the second time (T2), the first phase angle (P1) and the second phase angle (P2) will be relative to each other, and can be used as auto-location data.

Referring back to FIG. 2, the sensor interface 207 is configured to provide the necessary control signals and detect the electrical signals from the wheel phase angle sensor 212 such as the shock sensor. As discussed above, the shock sensor detects change in acceleration to produce an output in the form of an electrical charge output signal. The output signal is typically in the order of 1 mV/G. Preferably, if the wheel phase angle sensor 212 includes more than one shock sensor, shock sensors can share the same interface 207 via multiplexing.

Through the sensor interface 207, the microcontroller 222 receives output signals representing wheel phase angle from the wheel phase angle sensor 212. The microcontroller 222 may include, for example a memory for data storage and a data processing unit. The microcontroller 222 stores a received wheel phase angle, or data related thereto, for a later transmission to the ECU 300. The microcontroller 222 may not transmit every time the output signal has been received. In one embodiment, the microcontroller 222 calculates and determines a difference in two wheel phase angles measured by the wheel phase angle sensor 212. For instance, the microcontroller 222 subtracts a first wheel phase angle measured at a first time (T1) from a second wheel phase measured at a second time (T2). In another embodiment, the microcontroller 222 determines the second time (T2) based on a predetermined known time delay (T2−T1). For instance, the microcontroller 222 may consider the first time (T1) as the one-measurement point of a wheel phase angle during the rotation of a wheel and the second time (T2) as a data transmission point of a radio frequency message as described below. The microcontroller 222 may include a clock or time base, or other circuit or module for measuring time increments and operating at specified times or during specified time durations.

The microcontroller 222 encodes and transmits a radio frequency message via the transmitter 214 and the antenna 216. The radio frequency message includes, among other things, tire pressure information, an identifier of the wheel unit 101, and wheel phase angle information. The wheel phase angle information may include actual wheel phase angles measured at different times. In another embodiment, the wheel phase angle information may include a wheel phase angle measured at a transmission time, such as the second time (T2), and a difference in wheel phase angle measured at two different times. Alternatively, the wheel phase angle information may include only the difference in wheel phase angles.

In another embodiment, the wheel phase angle information may include no actual wheel phase angle. Instead, the wheel phase angle information includes a wheel phase angle indication. As one example, the wheel phase angle indication may include a predefined function code which will trigger a phase correlation data storage event. The wheel phase angle indication may be implemented by establishing predetermined data values or patterns such as by setting a bit which is normally unused in a RF message structure (see FIG. 11A). Alternatively, or additionally, the wheel phase angle indication may be implemented with a most significant bit, which is normally set to zero (see FIG. 11B). Additionally, the wheel phase angle indication may also include a predetermined time delay, such as T2−T1, or any other information indicative of a wheel phase angle (e.g., a pseudo-random number).

Referring again back to FIG. 1, the ECU 300 receives the radio frequency message from the wheel unit 201. The ECU 300 stores the radio frequency message, or data contained in the radio frequency message. Such data may be stored in the storage 304 which is a suitable data store such as a memory device. Also, the ECU 300 extracts the tire pressure, the identifier, and the wheel phase angle information from the radio frequency message. The ECU 300 correlates the wheel phase angle information with the ABS data from the ABS sensors 201, 202, 203, 204. In one embodiment, the ECU 300 analyzes the ABS data and determines a wheel phase angle or a wheel phase angle difference which is indicated by and corresponds to the ABS data. The ECU 300 compares the wheel phase angle information from the wheel unit 101 with the wheel phase angle or the wheel phase angle difference of the ABS data in order to determine the closest match. Upon finding the closest match, the ECU 300 assigns the identifier sent from the wheel unit 101 to a wheel whose ABS data most closely matches with the wheel phase angle information from the wheel units 101, 102, 103, 104.

In another embodiment, the ECU 300 analyzes the ABS data and determines whether the ABS data maintains a consistent value or a statistically significant trend at a predetermined time (e.g., T1). Alternatively, or additionally, the ECU 300 analyzes the ABS data and determines whether the ABS data shows a lowest standard deviation for a particular wheel location. By using this statistical correlation method, as will be described in detail below, the ECU assigns the identifier sent from the wheel unit 101 to a wheel whose ABS data is the most consistent or shows the lowest deviation, or shows a statistically significant trend.

Figure 4:
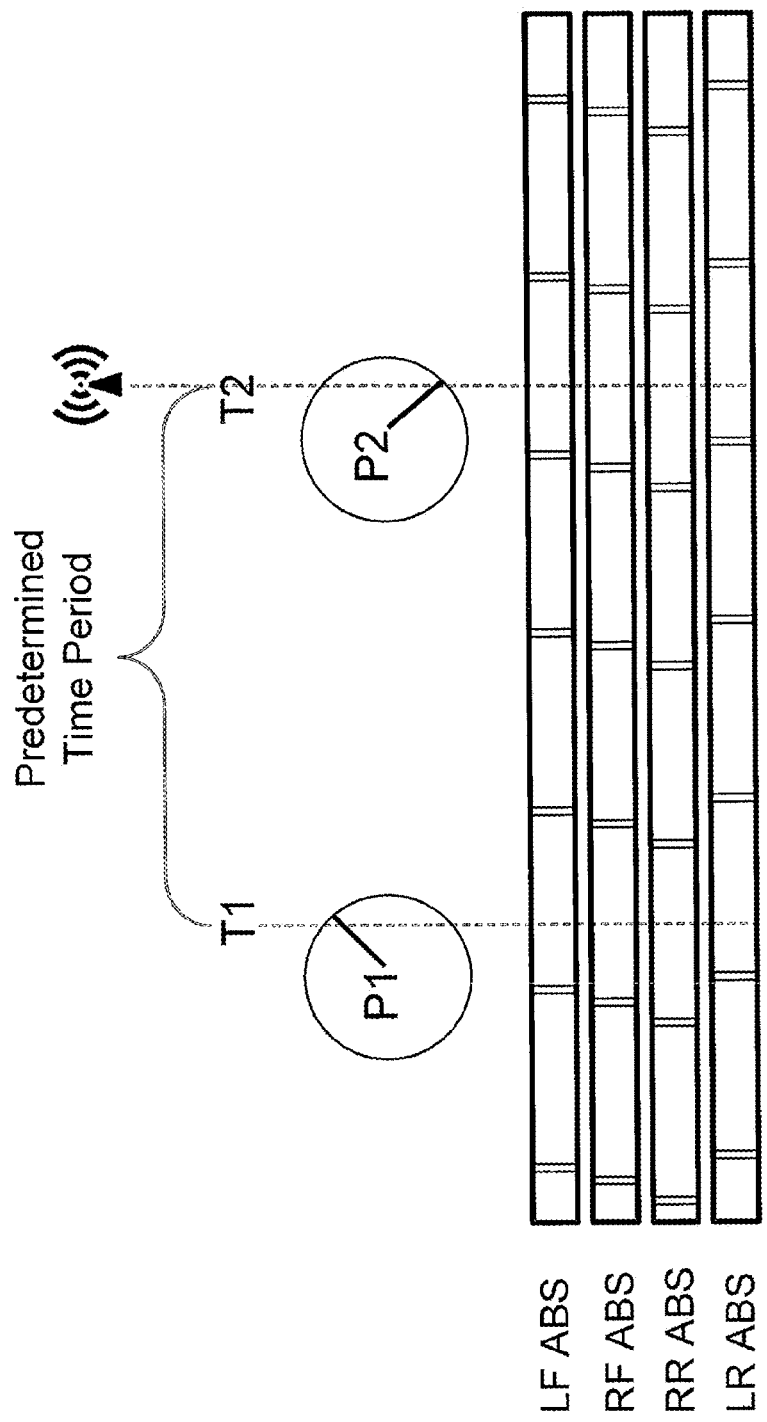
FIG. 4 illustrates one embodiment of correlation between wheel phase angle information from the wheel unit and ABS data.

Referring to FIG. 4, correlation of the wheel phase angle information from the wheel unit 101, 102, 103, 104 with the ABS data is further explained. In one embodiment, the wheel phase angle sensor 212 measures a wheel phase angle multiple times. In another embodiment, the wheel phase angle sensor 212 measures a wheel phase angle at the one-measurement point (e.g., T1 in FIG. 4) and does not measure the wheel phase angle at a different time (e.g., T2 in FIG. 4). In this embodiment, the wheel phase angle sensor 212 measures a first wheel phase angle (P1) at a first time (T1) and waits a predetermined time. The wheel phase angle sensor 212 then transmits a radio frequency message at a second time (T2) where T2=T1+Predetermined Time. The method with which the time T2−T1 is predetermined will be discussed later. Alternatively, the wheel phase angle sensor 212 measures the first wheel phase angle (P1) and detects the first time (T1) when the wheel phase angle reaches the first wheel phase angle (P1), which will be further described later. In this embodiment, the wheel units 101, 102, 103, 104 may be pre-programmed to recognize this Predetermined Time. For example, in a tire mounted TPM sensor the act of "striking" the ground provides an indication that the tire sensor has completed a revolution, relative to a previous "strike." If the TPM sensor reports the time since the last strike, then the phase of the wheel can be deduced. It may also be desirable, although not essential, that the period of the wheel revolution may also be sent.

In one embodiment, the Predetermined Time (T2−1) may be fixed and selected to ensure multiple wheel rotations between the first time (T1) and the second time (T2). In case the difference in wheel speed between vehicle wheels may be small, setting the value of the Predetermined Time (T2−T1) to cover multiple wheel rotations may improve accuracy of the auto-location. Accordingly, a tire pressure monitoring system according to this embodiment may sufficiently comply with accuracy requirements. Alternatively, in another embodiment, a period between the first time and the second time (T1, T2) may be variable, whereas a phase angle difference or a phase delta may be fixed. This embodiment will be further explained in detail below.

As discussed in connection with FIG. 2 above, the microcontroller 222 calculates and determines a wheel phase angle difference (PD) by subtracting the second wheel phase angle (P2) from the first wheel phase angle (P1). The wheel phase angle difference (PD) may range between 0 degrees and 360 degrees. In this embodiment, the wheel units 101, 102, 103, 104 may transmit a radio frequency message including the wheel phase angle difference to the ECU 300. The wheel units 101, 102, 103, 104 may transmit the radio frequency message at a time that the wheel phase angle difference (PD) is obtained, i.e., the second time (T2). Because the wheel units 101, 102, 103, 104 provide the wheel phase angle difference (PD), the ECU 300 may reduce the burden of calculating the wheel phase angle difference. Tire pressure monitoring systems are time-critical applications, and additional time to process the calculation of the wheel phase angle difference (PD) may introduce uncertainty and increase inaccuracy.

As shown in FIG. 1, the ECU 300 periodically receives ABS data from the ABS sensors 201, 202, 203, 204. Additionally, the vehicle may include an Electronic Stability Control (ESC) system which may be the source of other inputs, such as steering angle, vehicle yaw, etc. to the ABS system information to help control vehicle progress through curves in the road. For instance, in one example the ECU 300 receives the ABS data every 40 ms. As shown in FIG. 4, a rolling window of ABS data is stored, running from the present point to a point in the past. In this embodiment, the rolling window of the ABS data is stored for each wheel throughout the entire drive. The rolling window of the ABS data is variable and large enough to contain the first time (T1). The stored ABS data provides a historic ABS trace between the first time (T1) and the second time (T2). The ABS data includes information that is used to measure a phase through which the wheel has rotated. In one embodiment, the ABS data may include a number of ABS teeth that pass through the ABS sensors 201, 202, 203, 204 during a predetermined period of time. Only as one example, 48 teeth pass through the ABS sensor 210, which indicates completion of a full cycle. The ABS data for the number of counts may be divided by the number of teeth per wheel which is constant. The remainder of the number of counts divided by the number of teeth gives an estimate of wheel angle change over any given period. Using the above example of 48 teeth, 48/48=1 and the remainder is zero. Accordingly, the ECU 300 determines that there is no wheel phase angle change.

As shown in FIG. 4, the first time (T1) and the second time (T2) may serve as time points at which correlation of wheel phase angles (P1, P2) with ABS data shall occur. The time delay or the time period between the first time (T1) and the second time (T2) may be predetermined in order to ensure generation of effective phase angle data and ABS data that result in accurate auto-location. The time delay or the time period between the first time (T1) and the second time (T2) may be known to the ECU 300 and the wheel units 101-104 such that the first time (T1), the second time (T2), the first phase angle (P1), etc. may be later calculated and determined. Alternatively, in another embodiment, the time period between the first time (T1) and the second time (T2) may be variable.

Figure 5:
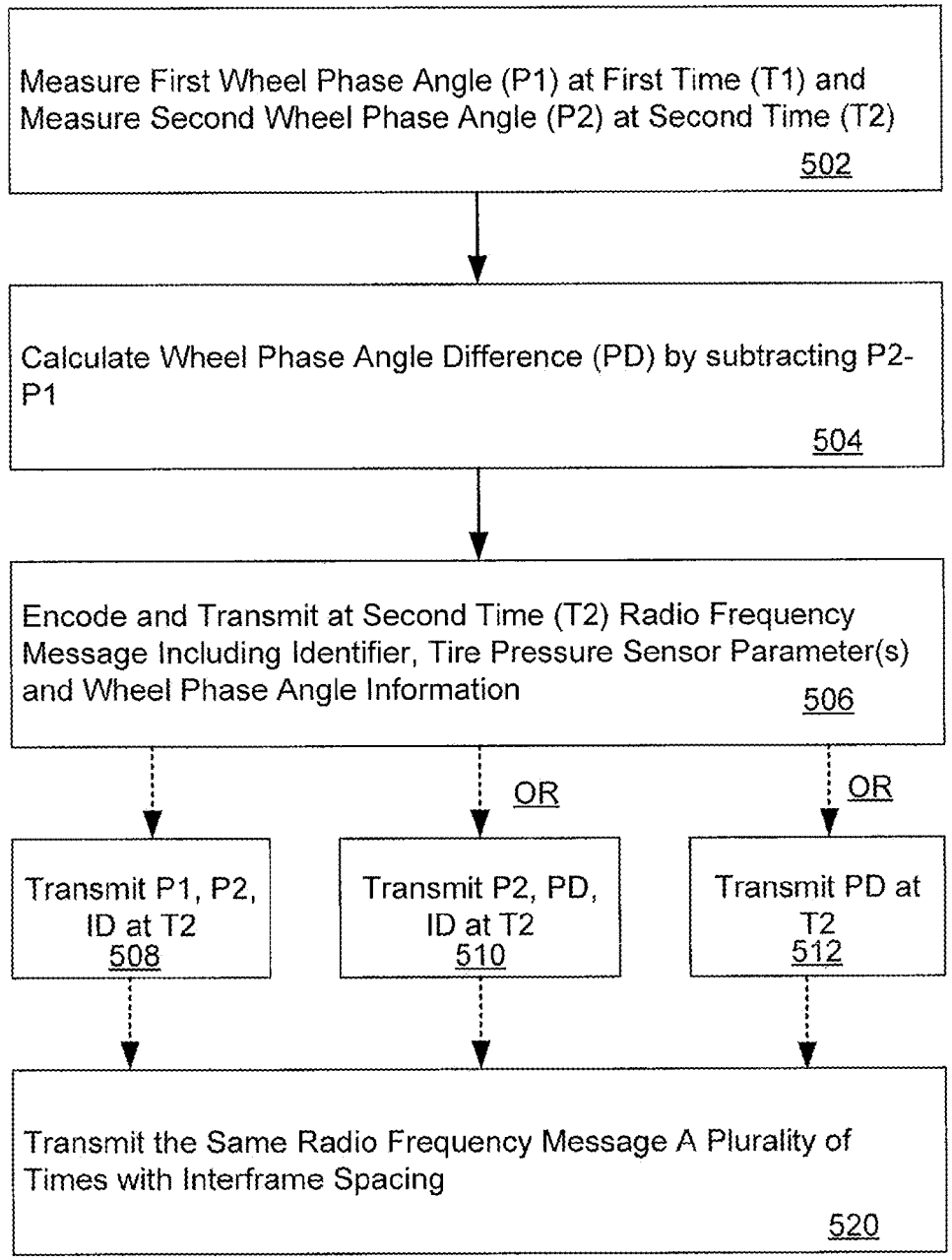
FIG. 5 is a flow chart illustrating one embodiment of a method for performing auto-location of a wheel using wheel phase angle information at the wheel unit.

Referring to FIGS. 5-8, an exemplary method for performing auto-location of a wheel using wheel phase angle information is explained in detail. FIG. 5 is a flow chart illustrating one embodiment of a method for performing auto-location of a wheel using wheel phase angle information. In particular, FIG. 5 shows operations at the wheel unit 101 for convenience. The operations at the wheel unit 101 may be equally applicable to the wheel units 102, 103, 104. In the embodiment illustrated in FIG. 5, the time period between the first time (T1) and the second time (T2) is pre-determined, whereas a phase angle difference between the first phase angle (P1) and the second phase angle (P2) is variable.

As shown in FIG. 5, at the wheel unit 101, the first wheel phase angle (P1) is measured at the first time (T1) and the second wheel phase angle (P2) is measured at the second time (T2) after passage of the predetermined time (Step 502). At the wheel unit 101, the wheel phase angle difference (PD) is calculated by subtracting P1 from P2 (Step 504). The microcontroller 222 generates the radio frequency message including tire pressure, the identifier of the TPM sensor 208, and the wheel phase angle information. The radio frequency message is transmitted via the transmitter 214 and the antenna 216 (Step 506). The radio frequency message is transmitted a plurality of times (e.g., 5 times or 8 times) to ensure that the ECU 300 receives the message, considering clashing and path loss. Thus, interframe spacing may be introduced to avoid clashing, which occurs when two transmitters transmit at the same time so as to be indistinguishable to the receiver. (Step 520). The same wheel phase angle information is duplicated in each frame 1 to 8. If the first frame of data is not received, then the ECU 300 must be able to calculate the time at which frame 1 was transmitted in order for the wheel phase angle data to be accurate (Step 520). Therefore, the transmitted frames which contain the wheel phase angle information need a predetermined interframe spacing known to the ECU 300. The frames may be numbered 1 through 8, or alternatively, the frame number information could be deduced by the ECU from the interframe spacing.

In one embodiment, the wheel phase angle information includes the first wheel phase angle (P1) and the second wheel phase angle (P2). The wheel unit transmits the first and the second wheel angles (P1 and P2) at the second time (T2) (Step 508). In another embodiment, the wheel phase angle information includes the second wheel phase angle (P2) and the wheel phase angle difference (PD) which is transmitted at the second time (T2) (Step 510). In further another embodiment, the wheel phase angle information includes only the wheel phase angle difference (PD) (Step 512).

Figure 6:
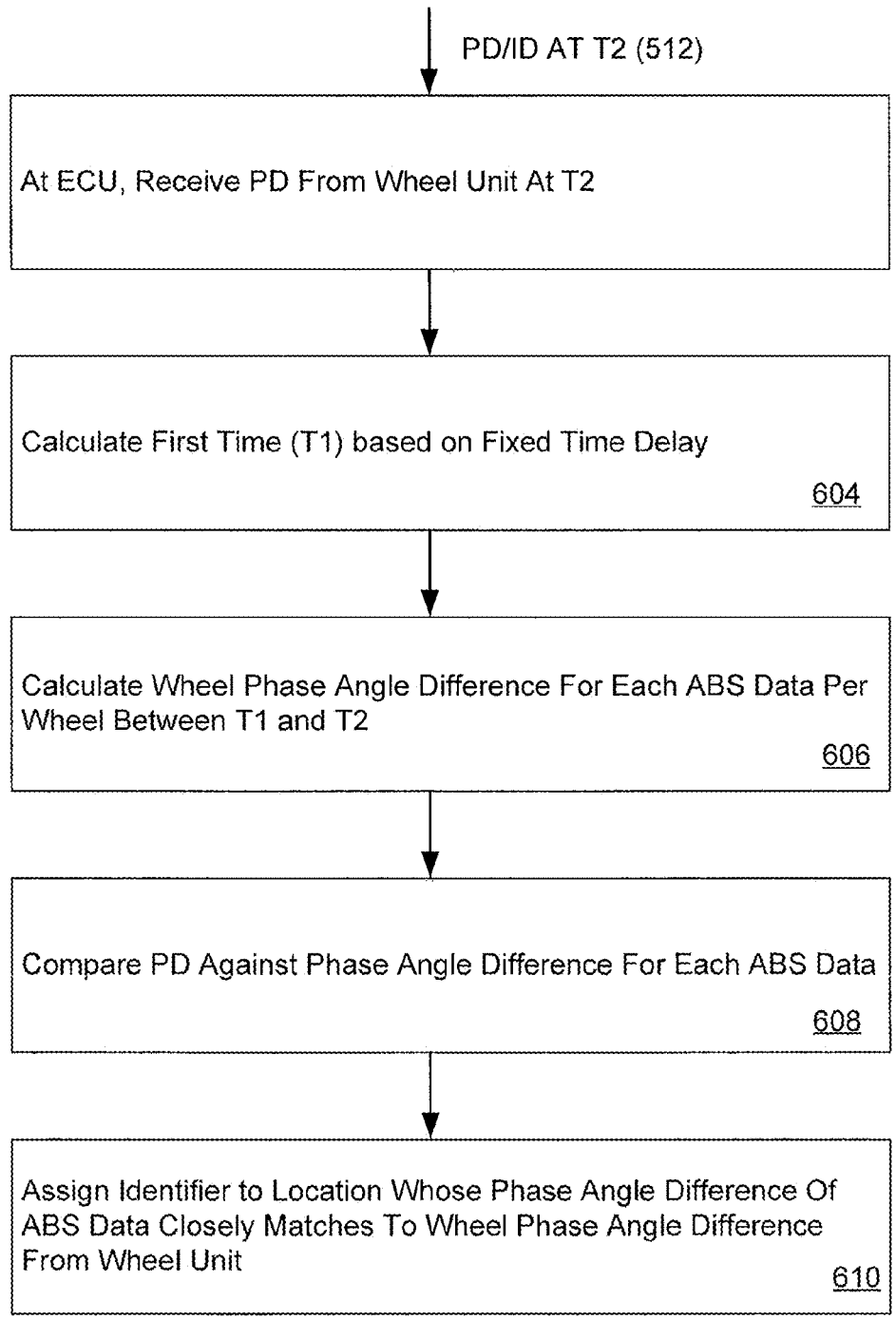
FIG. 6 is a flow chart further illustrating the method for performing auto-location of the wheel at an Electronic Control Unit ("ECU").

FIG. 6 is a flow chart illustrating one embodiment of the method for performing auto-location of the wheel using wheel phase angle information at the ECU 300. In the illustrated embodiment, the wheel phase angle difference (PD) is received at the second time (T2) (Step 602 and Step 512). Here it is assumed that the ECU 300 has received the first frame. The ECU 300 calculates the first time (T1) based on the fixed time delay which is known to the ECU 300 (Step 604). The first time (T1) may need calculation to give a reference point at which the ABS data will be analyzed. As noted above, the period between the first time (T1) and the second time (T2) is set up to ensure that a meaningful phase angle difference between the measured phase angles can be obtained.

After determining the first time (T1), the ECU 300 is able to calculate a phase angle difference for each ABS data per wheel between T1 and T2 (Step 606). Using the example discussed above, 48 teeth of ABS teeth that have passed the period between T1 and T2 may indicate two full rotations of the wheel and the zero remainder of 48 teeth/24 teeth indicates zero phase angle difference. The ECU 300 compares the wheel phase angle difference (PD) against the phase angle difference for each ABS data (Step 608). In other words, the ECU may estimate, by interpolation of the RF message phase measurement, what the number of counts from each ABS sensor would have been and search for a match from the ABS data for a wheel angle that has a similar wheel angle. The purpose of the correlation is to determine which set of ABS data matches with the deduced phase rotation of the wheel phase angle sensor 212.

There are a number of ways to perform the interpolation. For example, linear interpolation based on the assumption that the vehicle speed is relatively constant may be used. For example, every wheel on the vehicle will rotate at least 0.1% difference in overall effective circumference. After 60 seconds at 40 kmh (typically 5.5 Hz), the difference in angular rotation of each wheel will likely be 0.001*5.5*60. This equates to ⅓ of a revolution or 120 degrees. As a result, the ECU 300 assigns the identifier to a location whose phase angle difference of ABS data mostly closely matches to the wheel phase angle difference transmitted from the wheel unit 101.

Figure 7:
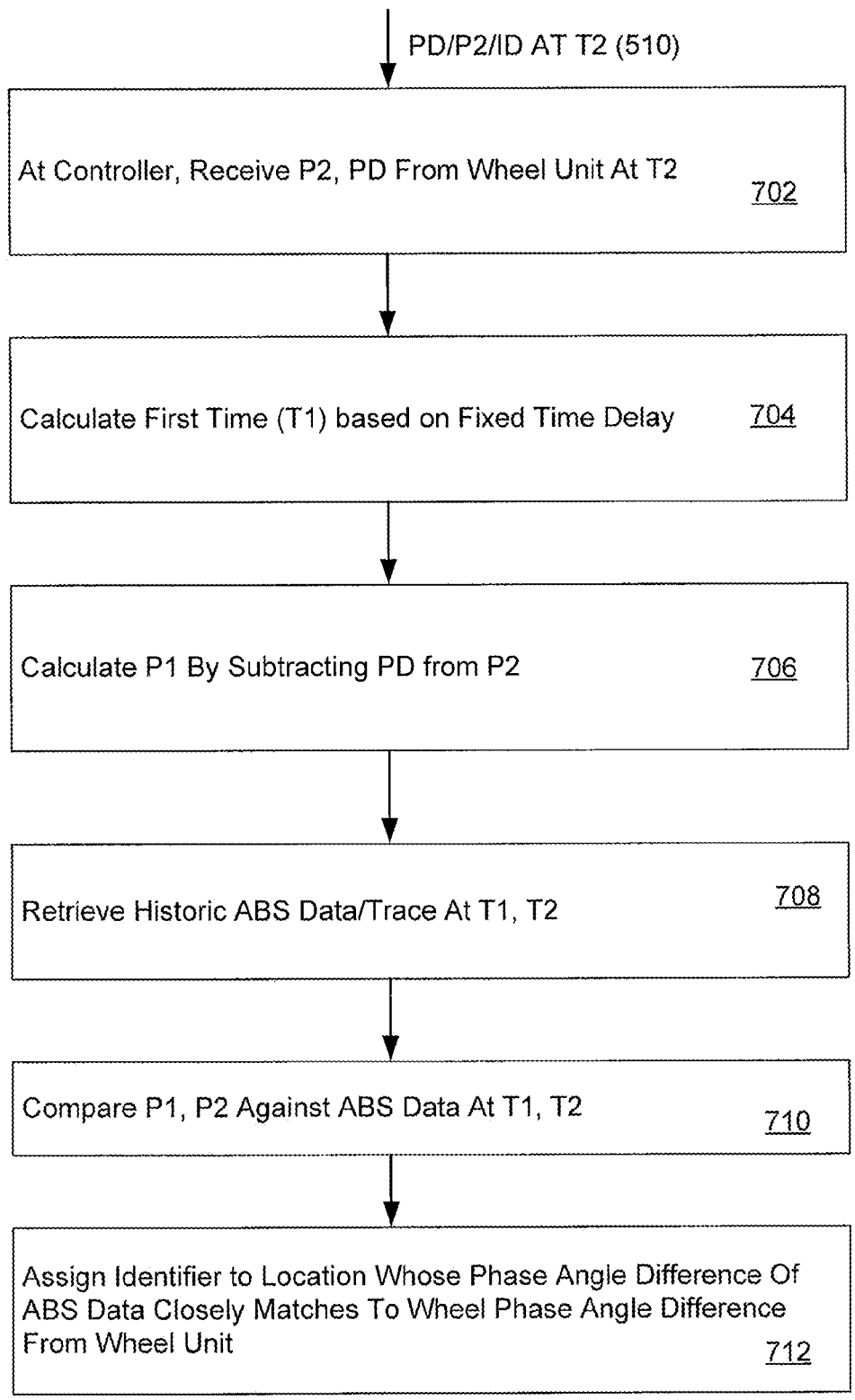
FIG. 7 is a flow chart illustrating another embodiment of the method for performing auto-location of the wheel using wheel phase angle information.

FIG. 7 is a flow chart illustrating another embodiment of the auto-location method. In the illustrated embodiment, the wheel phase angle (P2) and the wheel phase angle difference (PD) are received at the second time (T2) (Step 702 and Step 510, as shown in FIG. 7. It is assumed that the ECU 300 has received the first frame. The ECU 300 calculates the first time (T1) based on the fixed time delay known to the ECU 300 (Step 704). The calculated first time (T1) is a reference point at which the ABS data will be analyzed. The ECU 300 further calculates wheel phase angle (P1) by subtracting the wheel phase angle difference (PD) from the second phase angle (P2) (Step 706). The ECU 300 retrieves historic ABS data that is stored and determines ABS trace at the first and the second times (T1, T2)(Step 708). Subsequently, the ECU 300 compares wheel phase angles (P1, P2) which are transmitted from the wheel unit against ABS data at the first and the second time (T1, T2)(Step 710). As a result, the ECU 300 assigns the identifier to a location whose phase angle difference of ABS data mostly closely matches to the wheel phase angle difference transmitted from the wheel unit (Step 712).

Figure 8:
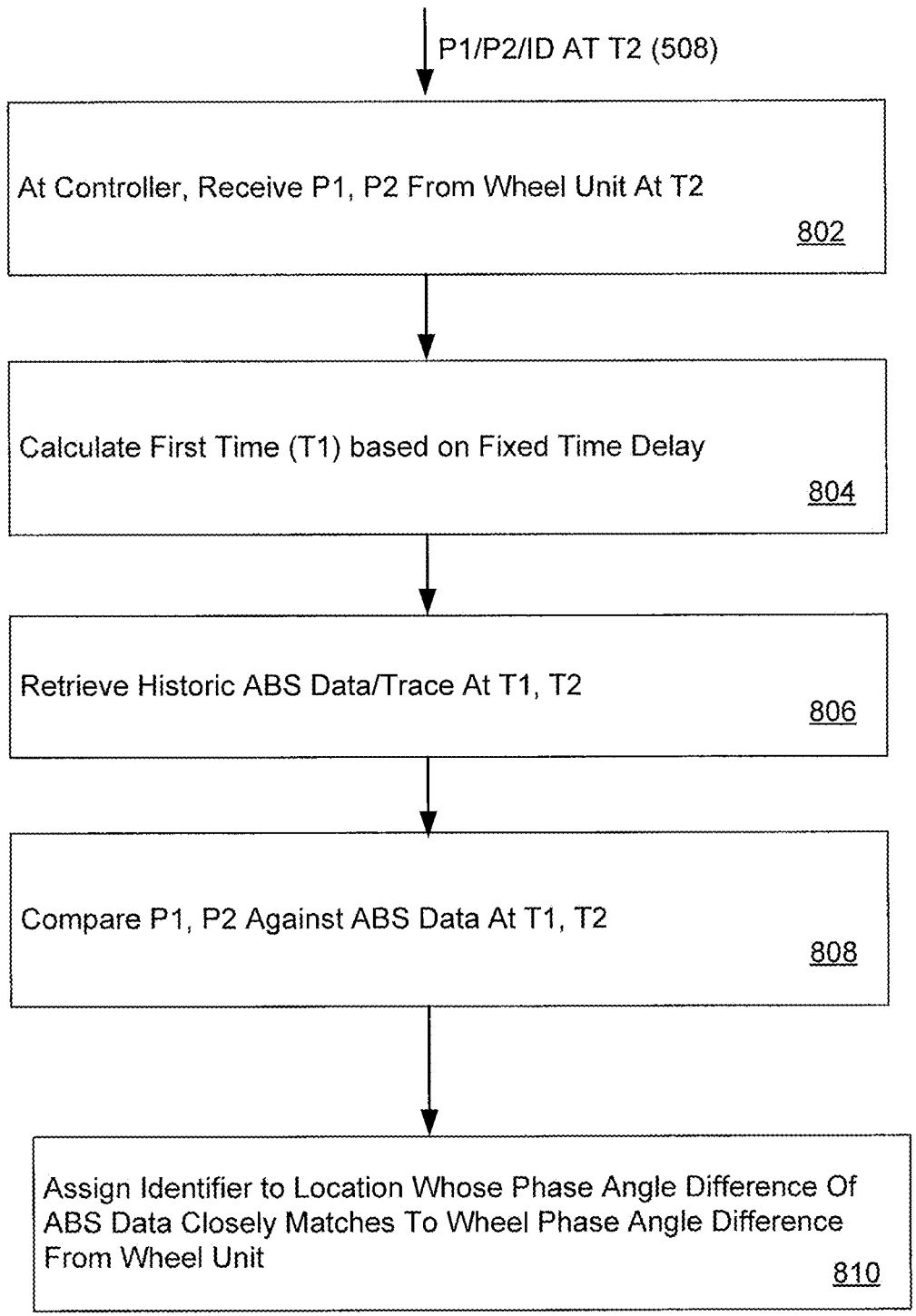
FIG. 8 is a flow chart illustrating another embodiment of the method for performing auto-location of the wheel using wheel phase angle information.

FIG. 8 is a flow chart further illustrating another embodiment of the auto-location method. In the illustrated embodiment, the wheel phase angles (P1, P2) are received at the second time (T2) (Step 802), as shown in FIG. 8, unlike the embodiments illustrated in FIGS. 6 and 7. The ECU 300 calculates the first time (T1) based on the fixed time delay as the reference point (Step 804). Subsequently, the ECU 300 retrieves stored ABS data and determines ABS trace at the first and the second times (T1, T2) (Step 806). The ECU 300 then compares wheel phase angles (P1, P2) which are transmitted from the wheel unit 101 against ABS data at the first and the second time (T1, T2) (Step 808). As a result, the ECU 300 assigns the identifier to location whose phase angle difference of ABS data most closely matches to the wheel phase angle difference transmitted from the wheel unit (Step 810).

As discussed in connection with the above-described embodiments, the wheel units 101, 102, 103, 104 measure the wheel phase angle of the associated wheels LF, RF, LR and RR at two different times and determine the relative phase angle difference. The relative phase angle difference is transmitted to the ECU 300 at a later measurement time such that the relative phase angle difference is compared with similar information extracted from the ABS system. The ECU 300 will receive RF messages from the wheel units 101, 102, 103, 104 including the phase angle difference and compare the phase angle difference from the wheel units 101, 102, 103, 104 with the ABS data from the ABS sensors 201, 202, 203, 204. The ECU 300 periodically receives the ABS data and stores a variable rolling window of the ABS data which covers the first time (T1) and the second time (T2). Thus, the ECU 300 may estimate, by interpolation of the RF message phase measurement, what the ABS data from each ABS sensor would have been between the first time (T1) and the second time (T2) and searches for a match from the ABS data for a wheel unit that has a similar wheel angle. The purpose of the correlation is to determine which set of ABS data matches with the deduced phase angle of the wheel phase angle sensor 212.

In the above-described embodiments, the ECU 300 determines and uses as a reference point the first and the second times T1, T2 in order to perform the auto-location. The ECU 300 calculates the first time based on the second time T2 and the fixed time delay known to the ECU 300. The ECU 300 then determines ABS data that corresponds to the first and the second time T1 and T2. In other words, the above-described embodiments rely upon the first time (T1) and the second time (T2) to define a relevant wheel phase angle and relevant ABS data for correlation. By comparing two different sets of data within the identical reference points, T1 and T2, accurate correlation may be obtained. Simple and accurate implementation of correlation between the wheel phase angle information from the wheel units 101, 102, 103, 104 and the ABS data may be obtained. Furthermore, the period between the first time (T1) and the second time (T2) may be easily variable to accommodate changing situations and ensure the system accuracy requirements.

Moreover, as the wheel units 101, 102, 103, 104 may calculate and determine the phase angle difference, calculation burdens on the ECU 300 may be reduced. Because a tire pressure monitoring system is a time-sensitive application, reduced calculation time by the ECU 300 may increase accuracy and efficiency of such systems.

Figure 9:
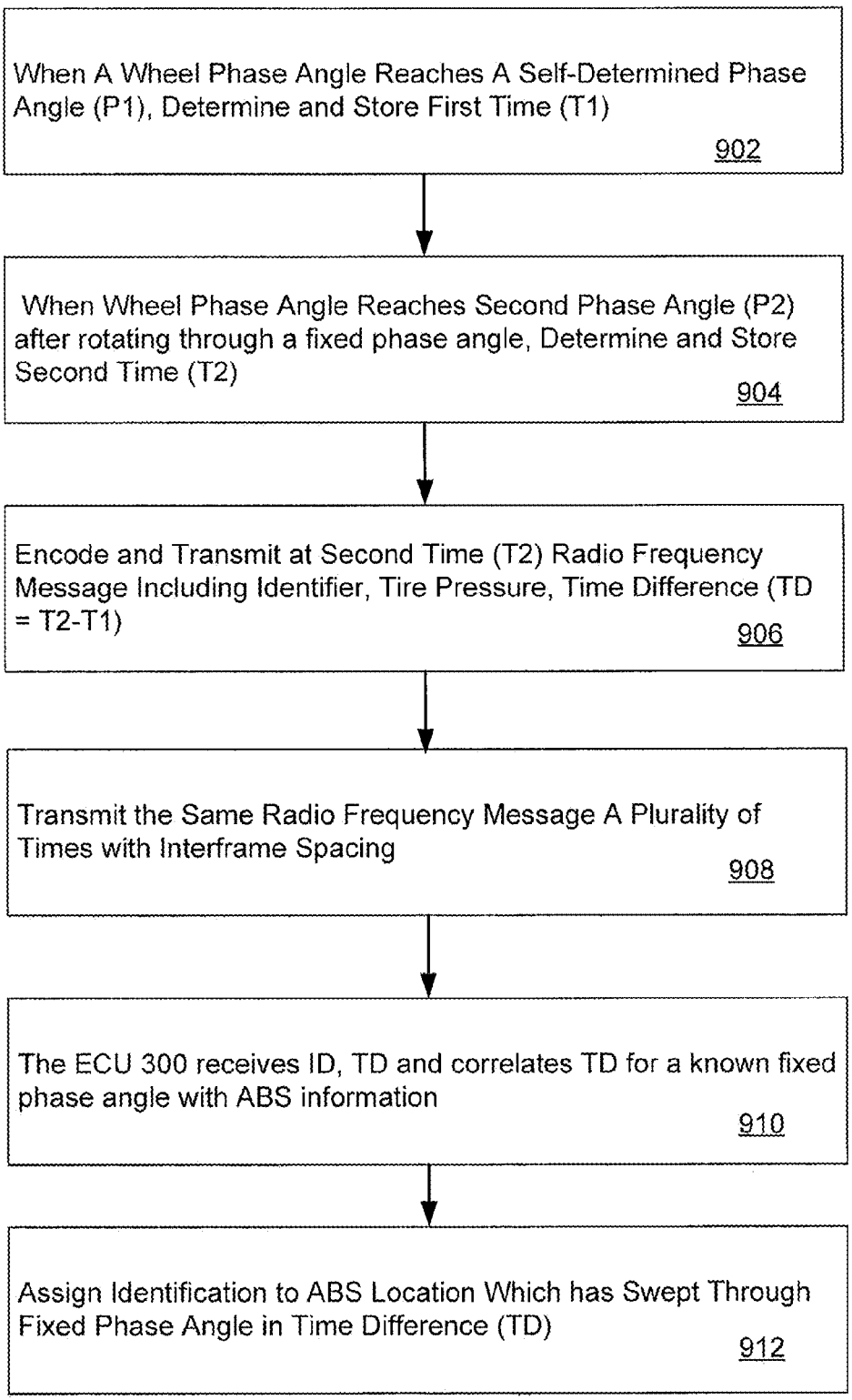
FIG. 9 is a flow chart illustrating another embodiment of the method for performing auto-location of the wheel using wheel phase angle information.

In the above-described embodiments, auto-location for determining the location of TPM sensors is performed based on the fixed time delay between the phase angle measurements and the variable phase angle difference. In another embodiment, the auto-location may also be realized by the wheel units 101, 102, 103, 104 and the ECU 300 knowing a fixed phase angle difference or a fixed phase delta which will occur between variable measurements times (TD=T2−T1). In other words, the phase delta is fixed, and the period between the first time (T1) and the second time (T2), i.e., T2−T1 is variable. Referring to FIG. 9, the embodiment where the phase delta is fixed and the time period (T2−T1) is variable is explained in detail. When a wheel unit 102 decides to perform an auto-location event, the wheel unit 102 waits until it reaches a self-determined phase angle (P1). The wheel unit 102 then determines the time that the self-determined phase angle (P1) is reached and stores such time (T1) (Step 902). In this embodiment, the wheel unit 102 is discussed only for convenience and other wheel units 101, 103 and 104 may be equally available. After rotating through the fixed phase delta known to the wheel unit 102 and the ECU 300, the wheel unit 102 reaches the second phase angle P2 (P2=P1+fixed phase delta) (Step 904). The wheel unit 102 determines the time that the second phase angle P2 is reached and stores the time (T2) (Step 904).

The wheel unit 102 transmits the identification, and Time Difference (TD=T2−T1) (Step 906). As discussed above in conjunction with FIG. 5, the wheel unit 102 transmits the same radio frequency message a plurality of times to ensure that the ECU 300 receives the radio frequency message (Step 908). The ECU 300 receives the identification and the Time Difference (TD). The ECU 300 correlates the Time Difference (TD) for a known phase angle with ABS information (Step 910). The identification is assigned to the ABS location which has swept through the fixed phase angle in the Time Difference (TD) (Step 912). In this implementation, the fixed phase angle does not have to be an integer number of revolutions. In other words, the second phase angle (P2) does not have to equal (P1+(N*360°)), where N is an integer. The phase difference (PD) could be encoded in the transmission at T2, or it could be a pre-determined value which is known to both the wheel unit and the ECU.

The foregoing embodiments describe a wheel unit that transmits wheel phase angle information which includes actual measurements, a value derived from the actual measurement, etc. such as first phase angle P1, the second phase angle P2, and/or the phase angel difference (PD). The wheel phase angle information, however, is not limited to the actual measurement of the wheel phase angle and/or the phase angle difference. The wheel phase angle information may include any information indicative of, and/or translatable to a wheel phase angle. Moreover, the wheel phase angle information may include information that prompts or triggers auto-location. For example, the wheel phase angle information may include wheel phase angle indication. Receipt or detection of the wheel phase angle indication may trigger the ECU to perform a phase correlation data storage event. The ECU continuously maintains a rolling window of the ABS data. In response to the phase correlation data storage event, the ECU stores or captures relevant ABS data. In one embodiment, the wheel phase angle indication may include a predefined function code. In another embodiment, the wheel phase angle indication may include setting a bit which is normally unused in a RF message structure, or a most significant bit of a certain data byte. Alternatively, or additionally, the wheel phase angle indication may include temperature data or interframe spacings of RF transmissions.

Moreover, the foregoing embodiments compare a wheel phase angle difference with ABS data at two different times (T1, T2) to perform auto-location of a wheel. Alternatively, or additionally, the auto-location of the wheel where the TPM sensor is arranged may require a snapshot of information at one measurement point of a wheel phase angle during a rotation of the wheel, where a snapshot is a capture of information from a short duration of a continuous stream of information. The wheel unit transmits an RF message that includes or is associated with the wheel phase angle indication. The ECU holds a rolling window of wheel phase and/or speed data such as ABS data for all wheels. Upon receipt of the RF message, the ECU captures and stores a current content of the rolling window of the ABS data. Then, the ECU determines relevant ABS data from the rolling window at a predetermined time, i.e., T1. An auto-location algorithm is applied to the stored ABS data in order to identify the specific location of the wheel where the TPM sensor is arranged. Referring to FIGS. 10-17, these different embodiments of the wheel auto-location system and method are described below.

Figure 10A:
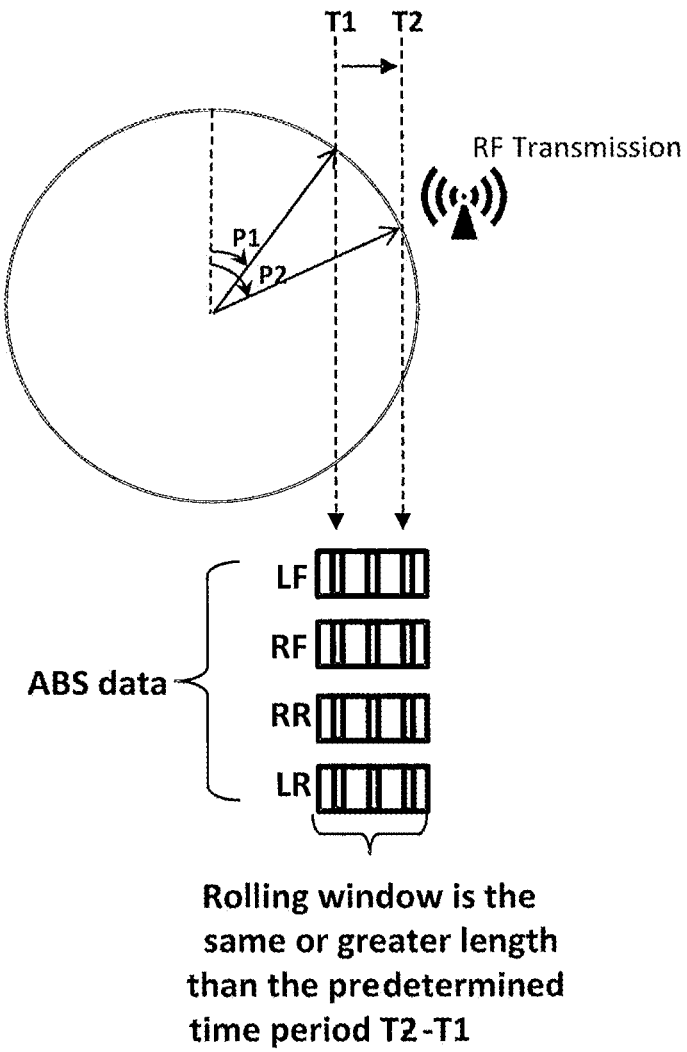
FIG. 10A illustrates correlation between ABS data and a one-measurement point during a rotation of a wheel and FIG. 10B illustrates storage of the ABS data at the one-measurement point.

FIG. 10A illustrates the one-measurement point during the rotation of the wheel. The wheel unit 101 detects the first time (T1) when the wheel phase angle reaches the first phase angle (P1). The first phase angle (P1) is an angle of interest which may be set depending on the hardware configurations of tire pressure monitoring systems. As one example, the first phase angle (P1) may be a zero-crossing point, i.e. zero, or a peak in order to facilitate efficient implementation of system hardware configurations. The first phase angle (P1) is not limited to the zero-crossing point or the peak and any angle can be set as the first phase angle (P1). The wheel unit 101 is described in this embodiment by way of example, and other wheel units 102, 103, 104 can be used. The wheel unit 101 waits a predetermined time delay (TD=T2−T1) and transmits a RF message. In this embodiment, the controller 222 of the wheel unit 101 is programmed to know the predetermined time delay (TD). The wheel unit 101 may not measure a wheel phase angle at the second time (T2). Accordingly, the wheel phase angle at the second time (T2) is undetermined in this embodiment. In other embodiments, the wheel phase angle at the second time (T2) may be measured. The ABS sensors 201, 202, 203, 204 transmit ABS data to the ECU 300 via the receiver 400, as described in connection with FIG. 1 above. In another embodiment, fewer than four ABS sensors may transmit ABS data to the ECU 300, which will be further described below.

Figure 10B:
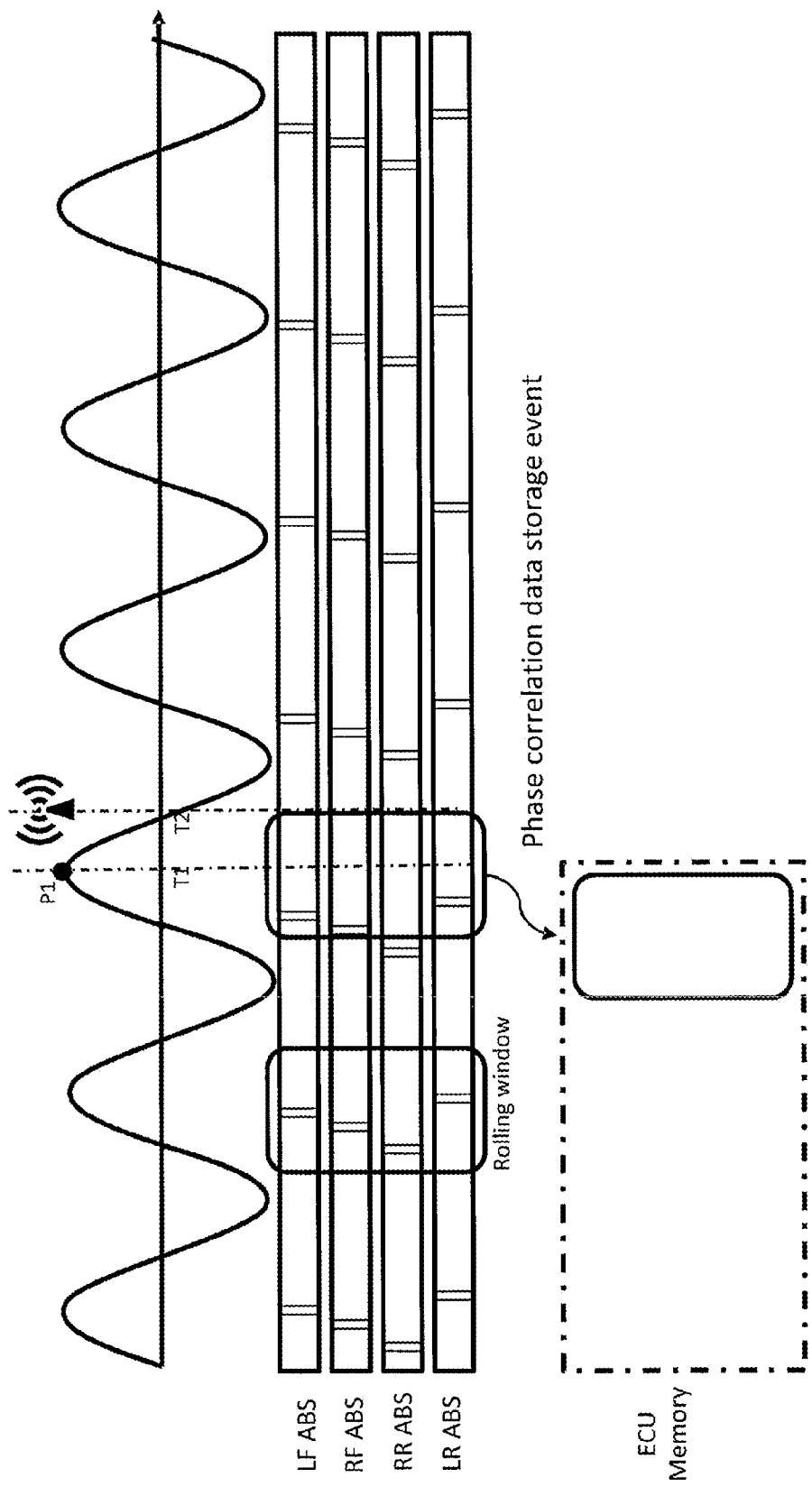

FIG. 10B illustrates the rolling window of the ABS data from four wheels. The ECU 300 continuously maintains the rolling window of the ABS data as shown in FIG. 10B. The sinusoidal wave of the wheel phase angle at the first time (T1) and the second time (T2) is also shown in FIG. 10B. The ECU 300 does not store or capture each rolling window of the ABS data. Instead, the ECU 300 responds to a phase correlation data storage event trigger and captures the current content of the rolling window of the ABS data that spans the first time (T1) and the second time (T2) as illustrated in FIG. 10B. The phase correlation data storage event trigger will be described in detail below, referring to FIGS. 11A-11D. The ECU 300 repeats this capturing or storing process multiple times until a significant number of the current contents of the ABS data is captured and stored in order to ensure reliability.

Figure 11A:
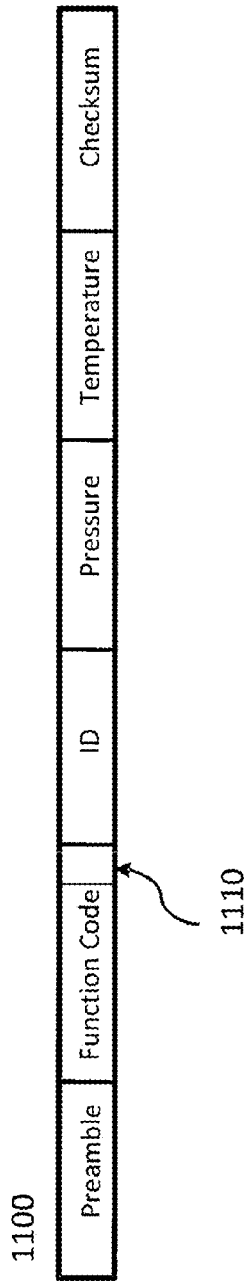
FIGS. 11A-11D illustrate various embodiments of a phase correlation data storage event trigger based on various wheel phase angle indications.
Figure 11B:
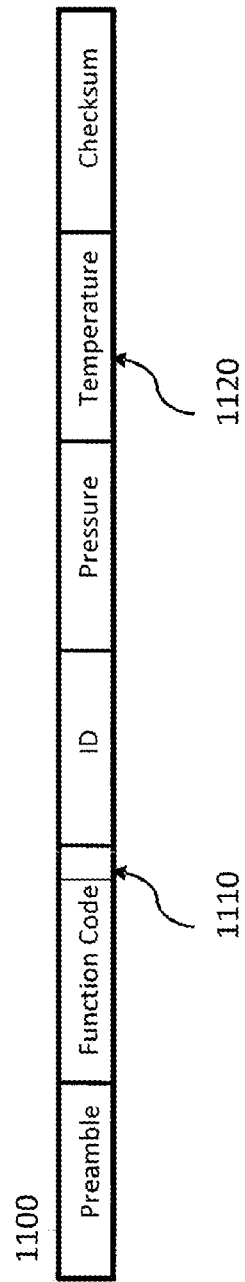
Figure 11C:
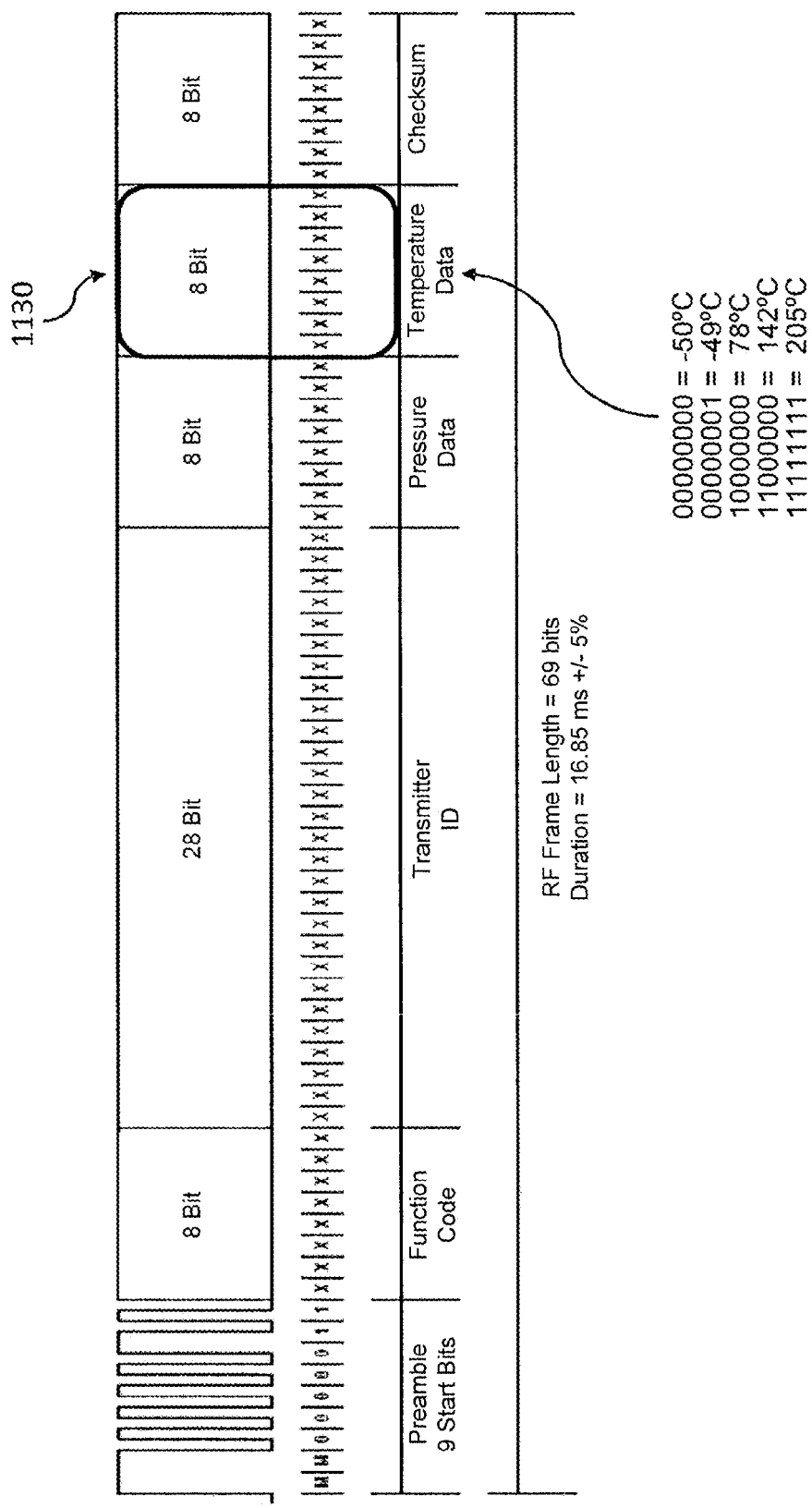

FIGS. 11A-11D illustrate various embodiments of implementing the phase correlation data storage event trigger. FIGS. 11A-11D also illustrate various embodiments of implementing wheel phase angle indication such that the phase correlation data storage event is triggered. FIGS. 11A-11C illustrate contents of RF messages transmitted by a wheel unit and received by the ECU. Referring to FIGS. 11A and 11B, a first embodiment of the wheel phase angle indication is explained. In the first embodiment, an RF message 1100 contains information corresponding to wheel phase angle indication. In FIGS. 11A and 11B, an exemplary RF message 1100 sent from the wheel unit 101 is illustrated. The RF message includes digital data arranged in a number of data fields including, for example, a synchronization field such as a data preamble, a function code field, an identifier field, a pressure data field, a temperature data field and an error detection and correction field such as a checksum. Additional or fewer data fields may be used and the field locations in the RF message may be standardized to ensure reliable reception of the RF message. The structure of the RF message 1100 may vary depending upon vehicle hardware and/or software where this embodiment of the wheel auto-location system and method is used. In this embodiment, the function code field corresponds to the wheel phase angle indication. The function code field may be referred to as a status code field or a status byte field.

As described above, the wheel unit 101 transmits the RF message 1100 at the second time (T2) after the wheel phase angle reaches the first phase angle (P1) and waits the predetermined time delay (TD). The RF message 1100 may not include an actual wheel phase angle, as shown in FIGS. 11A and 11B. The RF message of FIG. 11A includes a preamble, a function code 1110, an identification of a wheel, tire pressure, temperature, and a checksum. The RF message structure including the preamble, the tire pressure, the checksum, etc. as shown in FIG. 11A uses a conventional RF message structure. The function code 1110 may include a predefined function code which prompts or instructs the ECU 300 to trigger a phase correlation data storage event. The phase correlation data storage event indicates to the ECU 300 that a current content of a rolling window of the ABS data should be captured by the ECU 300. As described in connection with FIG. 1 above, the ECU 300 receives ABS data from the ABS sensors 201, 202, 203, 204. The ECU 300 is continuously holding a rolling window of the ABS data which has dimensions the same or greater than the predetermined time period (TD). As shown in FIG. 10B, the ECU 300 captures the current content of the rolling window of the ABS data in response to the phase correlation data storage event and stores it in its storage.

Referring back to FIGS. 11A and 11B, the function code 1110 may include a bit that has been set or changed to set to trigger the phase correlation data storage event. As one example, the bit is normally unused in a RF message structure. As another example, the bit includes two most significant bits of a certain data byte, which is normally set to zero. As shown in FIG. 11A, the RF message 1100 sent from the wheel unit 101 includes wheel phase angle indication by adding the function code 1110. For example, the RF message 1100 is encoded to set a bit of the function code 1110 that triggers the phase correlation data storage event. The RF message 1100 shown in FIG. 11A includes no actual phase angle. The RF message 1100 may include the wheel phase angle indication implemented by the function code bits 1110. The structure of the RF message 1100 has benefits of including no wheel phase angle information. This message structure having no wheel phase angle information may provide flexibility as a standard frame protocol may not need to change in order to include phase angle information.

In FIG. 11B, the RF message 1100 may include data defining the predetermined time delay (TD=T2−T1) 1120 using a dataframe assigned to temperature data in addition to the function code bits 1110. The predetermined time delay may represent the wheel phase angle. In another embodiment, the RF message 1100 may include a pseudo-random number that indicates or is translatable to the wheel phase angle. Various types of information which represents the wheel phase angle may be included in the RF message 1100. For example, the wheel phase information could be encoded into 8 bits of data. This would allow a phase resolution of 360/255=1.41° to be realized.

Another method to provide wheel phase information is to assign a code to specific wheel phase angles. In such an exemplary embodiment, the transmitter 214 (FIG. 2) transmits the code which corresponds to the particular phase angle of interest. In this embodiment, the ECU 300 stores a lookup table in the storage 304. The lookup table maps the codes to actual phase angles, and the ECU 300 then deduces the phase from the transmitted code. In a further embodiment, the time delay (TD) may be one of several options known to both the wheel units 101, 102, 103, 104 (FIGS. 1 and 2) and the ECU 300. More specifically, the wheel units 101, 102, 103, 104 will transmit a short code which corresponds to one of the several options. The ECU decodes the short code, and determines which of the several options for the time delay (TD) have been used by the wheel units 101, 102, 103, 104. In a further embodiment, the wheel units 101, 102, 103, 104 may encode the actual time delay (TD) value in the radio frequency transmission. For example, with a resolution of 1 millisecond and eight bits of information, a time delay of 255 milliseconds could be communicated.

Referring to FIG. 11C, a second embodiment of the phase correlation data storage event trigger is described. FIG. 11C illustrates an RF message that includes temperature data 1130. In this embodiment, the temperature data 1130 includes 8 bits. As shown in FIG. 11C, 8 bits of temperature data indicate the normal operating temperature range of the tire pressure sensor 208 (FIG. 2). The normal operating temperature generally ranges from −40° C. to +125° C., and the temperature byte 1130 has the capability to indicate temperatures from −50° C. to +205° C. The temperatures above +125° C. may not have any practical application. Accordingly, some of the temperature bits are used to encode the wheel phase angle indication. By using the example illustrated in FIG. 11C, the temperature of +142° C. corresponds to 11000000 and the two most significant bits of the temperature byte are '11.' The temperature of +142° C. is well above the maximum operating temperature. The code, 11000000 may be used to trigger a phase correlation data storage event in this embodiment.

Figure 11D:
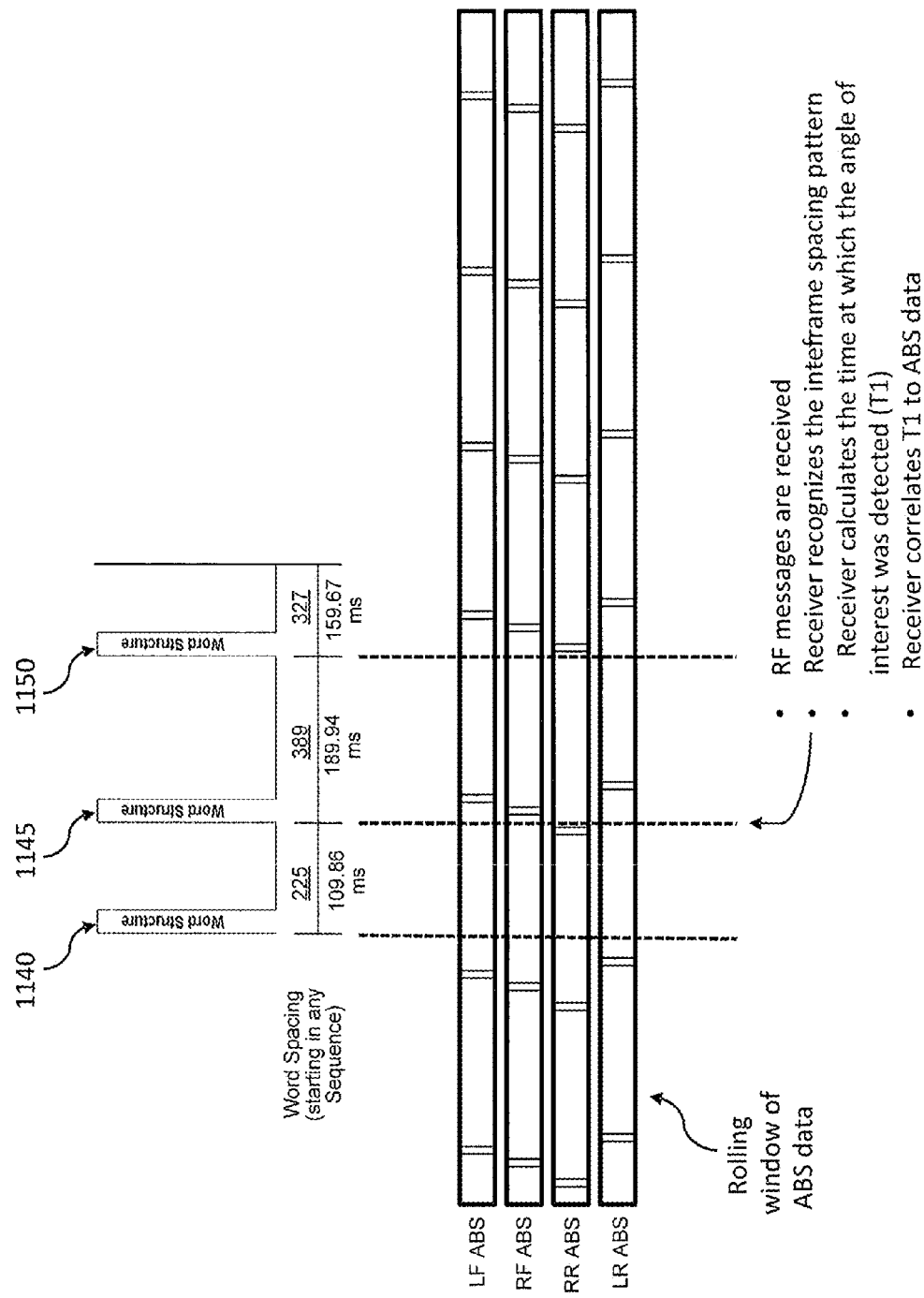

In FIG. 11D, a third embodiment of a phase correlation data storage event trigger is illustrated. In the third embodiment, an interframe spacing among a series of RF message transmissions corresponds to the wheel phase angle indication and is used to trigger the phase correlation data storage event. In this embodiment, multiple RF message transmissions occur during the one second transmission. For instance, the identical information is transmitted eight times over a one second time period. The structure of the RF message frame, the number of RF message frames and the interframe spacings discussed in this embodiment are only by way of example and not limited thereto. The structure of the RF message frame, the number of RF message frames and/or the interframe spacings may vary.

As shown in FIG. 11D, each interframe spacing between two consecutive RF transmissions varies. In this embodiment, 109.86 ms, 189.94 ms and 159.67 ms are respectively set as interframe spacings. The interframe spacings are encoded and known to the ECU 300. When the ECU 300 receives the first three RF transmissions 1140, 1145 and 1150, the ECU 300 recognizes the interframe spacings of 109.86 ms and 189.94 ms. Then, the ECU 300 calculates when the first RF transmission 1140 is received. The time that the first RF transmission 1140 is received corresponds to the second time (T2). The ECU 300 subsequently calculates the first time (T1) and determines the ABS data at the first time (T1).

In FIGS. 11A-11D, various embodiments of the phase correlation data storage event trigger are explained. However, the wheel auto-location method is not limited to those embodiments and other ways of implementing the phase correlation data storage event are available. As described in connection with the embodiments of FIGS. 11A-11D, the ECU 300 receives or recognizes the phase correlation data storage event trigger based on the wheel phase angle indication. The ECU 300 responds to the wheel phase angle indication and performs the phase correlation data storage event. As illustrated in FIG. 10B, the ECU 300 stores or captures the current content of the rolling window of the ABS data in response to the wheel phase angle indication. Then, the ECU 300 calculates the first time (T1) based on the predetermined time delay (TD) which has been known to the ECU 300. The ECU 300 determines relevant ABS data from the ABS data stream, i.e., the stored current content of the rolling window of the ABS data relevant to the first time (T1). In this embodiment, the relevant ABS data corresponds to an ABS tooth count number at the first time (T1). The relevant ABS data is stored over time as the ECU 300 receives the RF message 1100 multiple times and repeatedly determines and stores the relevant ABS data. The ECU 300 stores the ABS data in the storage 304 and executes an auto-location algorithm that correlates the stored relevant ABS data with a specific wheel location. The auto-location algorithm is executed to identify the specific wheel location based on the trace of the relevant ABS data using a statistical correlation method.

Figure 12:
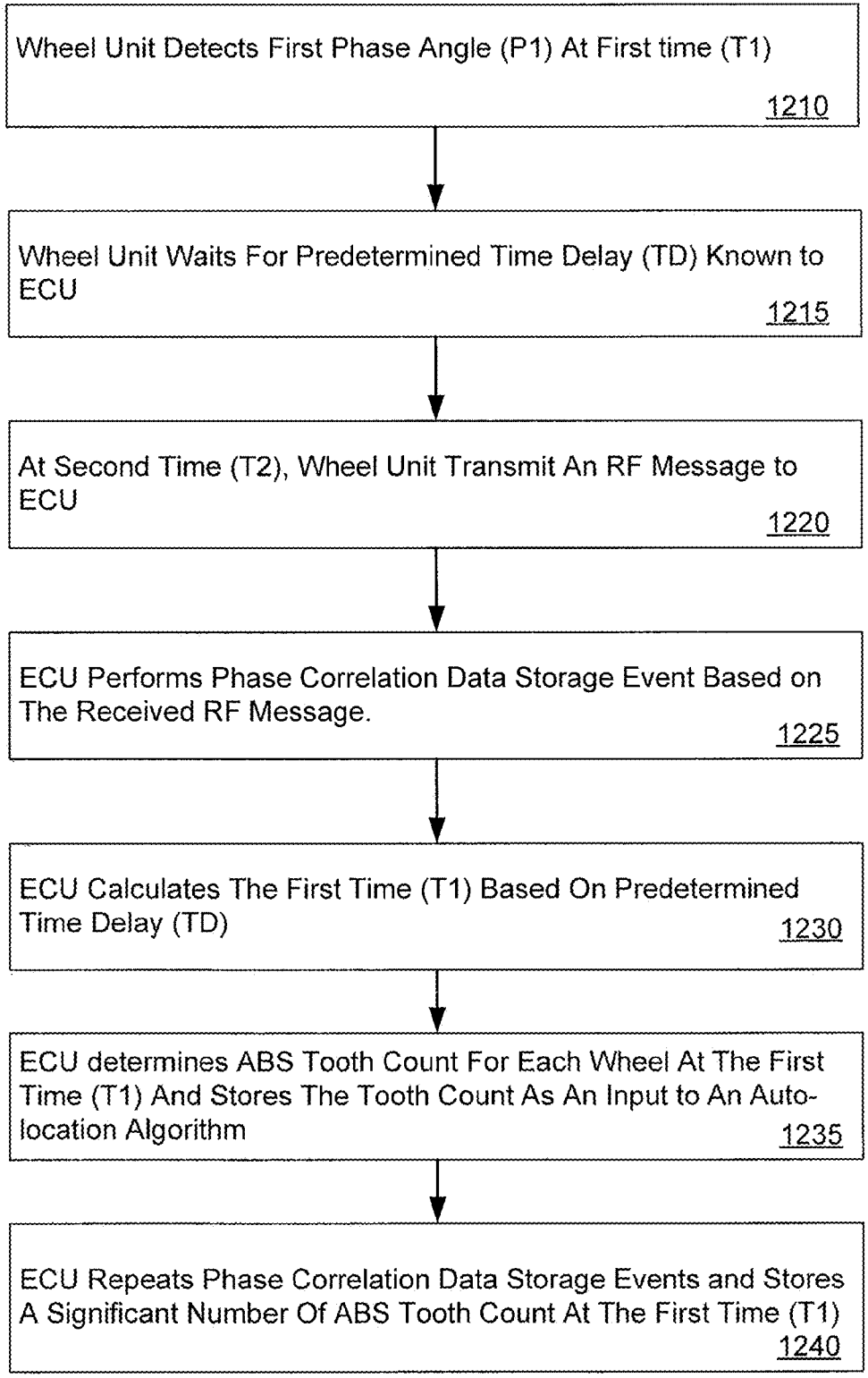
FIG. 12 is a flow chart illustrating one embodiment of an auto-location method based on the ABS data at the one-measurement point.

Referring to FIG. 12, one embodiment of an auto-location method is further explained in detail. The wheel unit 101 detects the first phase angle (P1) which is set as an angle of interest at the first time (T1) when the first phase angle (P1) is reached (Step 1210). The first phase angle (P1) is not limited to a particular angle and is set depending on system hardware configuration. Actual values of the first phase angle (P1) may depend on a frequency of wheel rotation.

The wheel unit 101 waits for the predetermined time delay (TD=T2−T1) where the time delay is known to the ECU 300 (Step 1215). The wheel unit 101 may not measure a phase angle other than the measurement at the first time (T1). In this embodiment, timing of one measurement, i.e., T1 and the predetermined time delay (TD) may be indicative of the wheel phase angle. Actual phase angles of the wheel may not be used.

After waiting the predetermined time delay (TD), the wheel unit 101 transmits the RF message 1100 to the ECU 300 at the second time (T2) (Step 1220). The RF message 1100 includes the wheel phase angle indication. As described above, the RF message 1100 includes predefined function code bits 1110 such that the phase correlation data storage event will be triggered by the ECU 300.

The ECU 300 continuously maintains a rolling window of the ABS data, the window having dimensions the same or greater than the predetermined time delay (TD). The ECU 300 receives the RF message 1100 and recognizes the function code bits 1110 (Step 1225). When the RF message 1100 includes the time delay (TD) data, the ECU 300 also recognizes such data. When the time delay (TD) data is recognized, the ECU 300 stores the current values in the rolling window of the ABS data. These current values of the rolling window will be used by the ECU 300 to perform the phase correlation data storage event upon receipt of the RF message 1100.

The ECU 300 calculates the first time (T1) based on the predetermined time delay (TD) upon receipt of the RF message 1100 (Step 1230). The ECU 300 then determines an ABS tooth count for each wheel at the first time (T1) (Step 1235). The ECU 300 stores the ABS tooth count and repeats this process until a significant number of the phase correlation data storage events have occurred (Step 1240). The stored ABS tooth count values are provided as an input to the auto-location algorithm. The output of the auto-location algorithm is the association of a wheel unit ID with a specific ABS sensor location on the vehicle.

Figure 13:
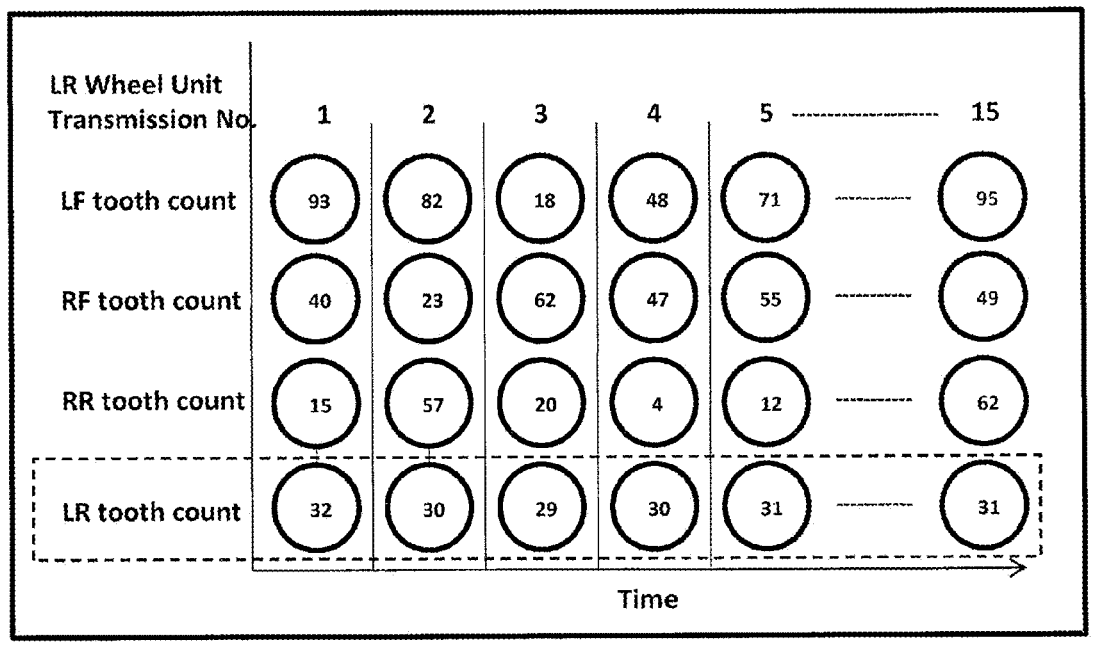
FIG. 13 illustrates one embodiment of ABS tooth count values for four wheels with respect to RF transmissions from a left rear wheel unit.

FIG. 13 illustrates one example of the ABS tooth count values at the first time (T1) for all wheels which have been stored by the ECU 300. With respect to a series of the RF transmissions from a left rear wheel unit, the ABS tooth count values at the first time (T1) from a left front ABS sensor are 93, 82, 18, 48, and 71 for the first five transmissions. Likewise, the ABS tooth count values at the first time (T1) from a right front ABS sensor and a right rear ABS sensor are 40, 23, 62, 47, 55 and 15, 57, 20, 4, 12, respectively, for the first five transmission. On the other hand, a left rear ABS sensor shows a statistically significant and consistent tooth count values, i.e., 32, 30, 29, 30, 31 at the first time (T1) for the first five transmissions. Even after 15 transmissions, the consistent tooth count values remain unchanged. The auto-location algorithm uses the stored ABS tooth count values as an input.

The stored ABS tooth count values as shown in FIG. 13 enable the ECU 300 to perform various statistical processing techniques. In this embodiment, the ECU 300 performs a confidence interval analysis. In other embodiments, various other processing techniques are available. A confidence interval provides a range of values which is likely to indicate the population parameter, or the population characteristics. Confidence intervals are constructed at a confidence level, such as 95% only by way of example. The confidence level of 95% works as a bracket that defines the true population parameter or characteristics in approximately 95% of cases when the same population is sampled numerous times and interval is estimated each time.

Figure 14A:
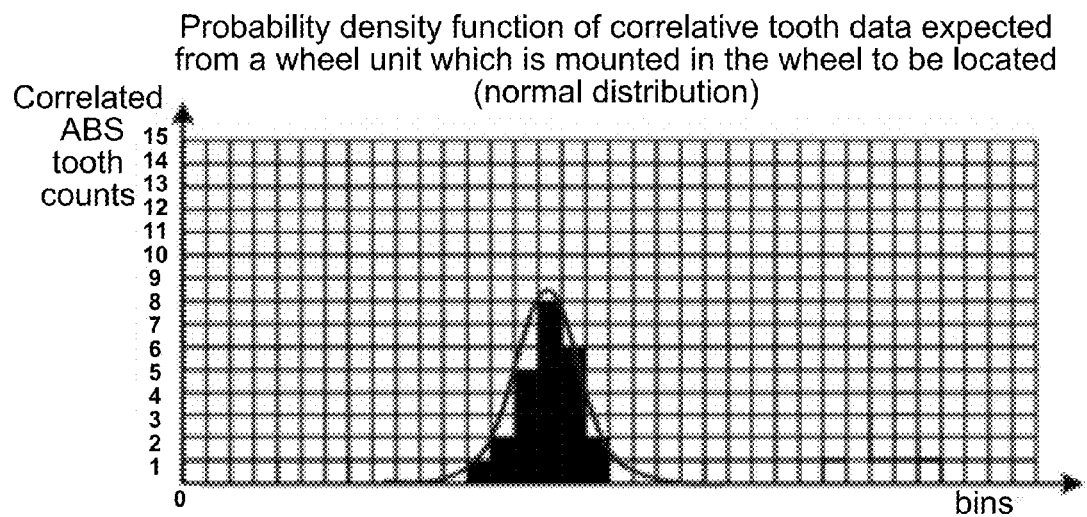
FIGS. 14A and 14B are histograms illustrating correlated ABS tooth count values over bins.
Figure 14B:
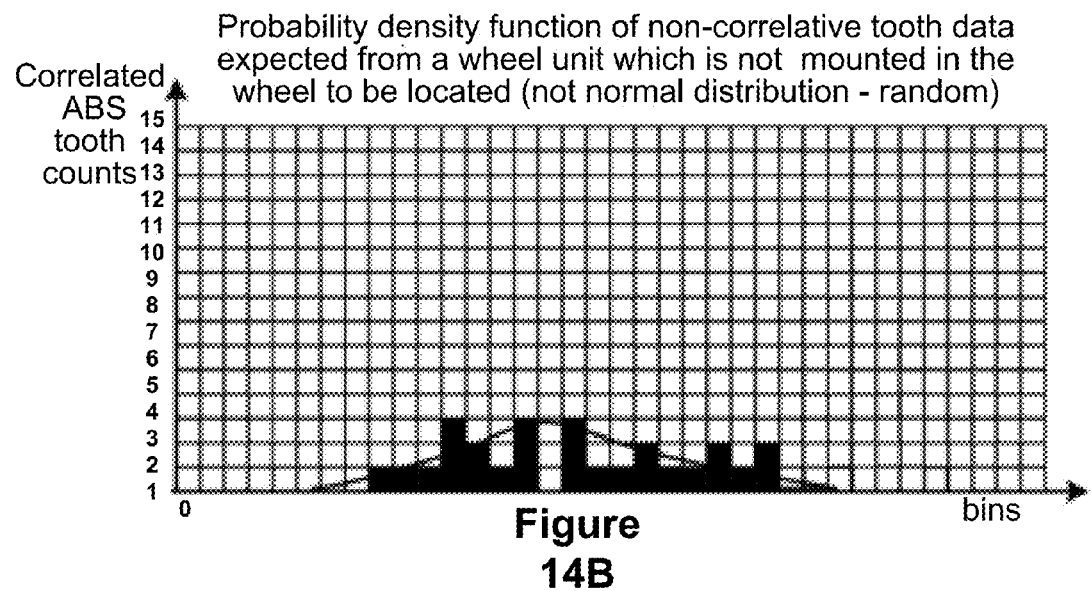

It has been observed through extensive testing and simulation that when plotted in a probability distribution function, correlation between radio frequency (RF) transmissions from a wheel-unit mounted at a wheel location and ABS tooth counts from an ABS sensor mounted at the same wheel location portrays a normal distribution pattern about a mean value. FIG. 14A illustrates one example of the normal distribution pattern. On the other hand, FIG. 14B illustrates one example of a distribution pattern of correlation between RF transmissions from a wheel-unit mounted at a wheel location and ABS tooth counts from an ABS sensor mounted at a different wheel location. The distribution pattern as shown in FIG. 14B illustrates a non-normal distribution and rather, a random distribution.

Depending on a location match between a wheel unit and an ABS sensor, a distribution pattern is expected to appear as a normal distribution, or a random distribution, as shown in FIGS. 14A and 14B. The confidence interval analysis takes advantage of such expected shape of distribution patterns in the auto-location of a wheel unit. The confidence interval analysis is a pattern-matching statistical analysis technique which enables association and location of each transmitting wheel unit identification (ID) to a respective wheel in which it is mounted. The confidence interval analysis matches a distribution shape of actual observed data sets to an expected distribution shape, for example, a normal distribution shape, or a random distribution shape. Accordingly, the auto-location using the confidence interval analysis is different from auto-location method using conventional statistical analysis based on absolute spread of data, a standard deviation, a statistically significant value, etc. The auto-location using the confidence interval analysis may be more flexible as a pattern match between a normal distribution shape and a random distribution shape may be performed based on relative similarity rather than an absolute value. The auto-location using the confidence interval analysis may be more reliable as the confidence interval focuses on highly relevant range of data rather than infrequent and/or substantially out of range data such as extreme data points.

Figure 15:
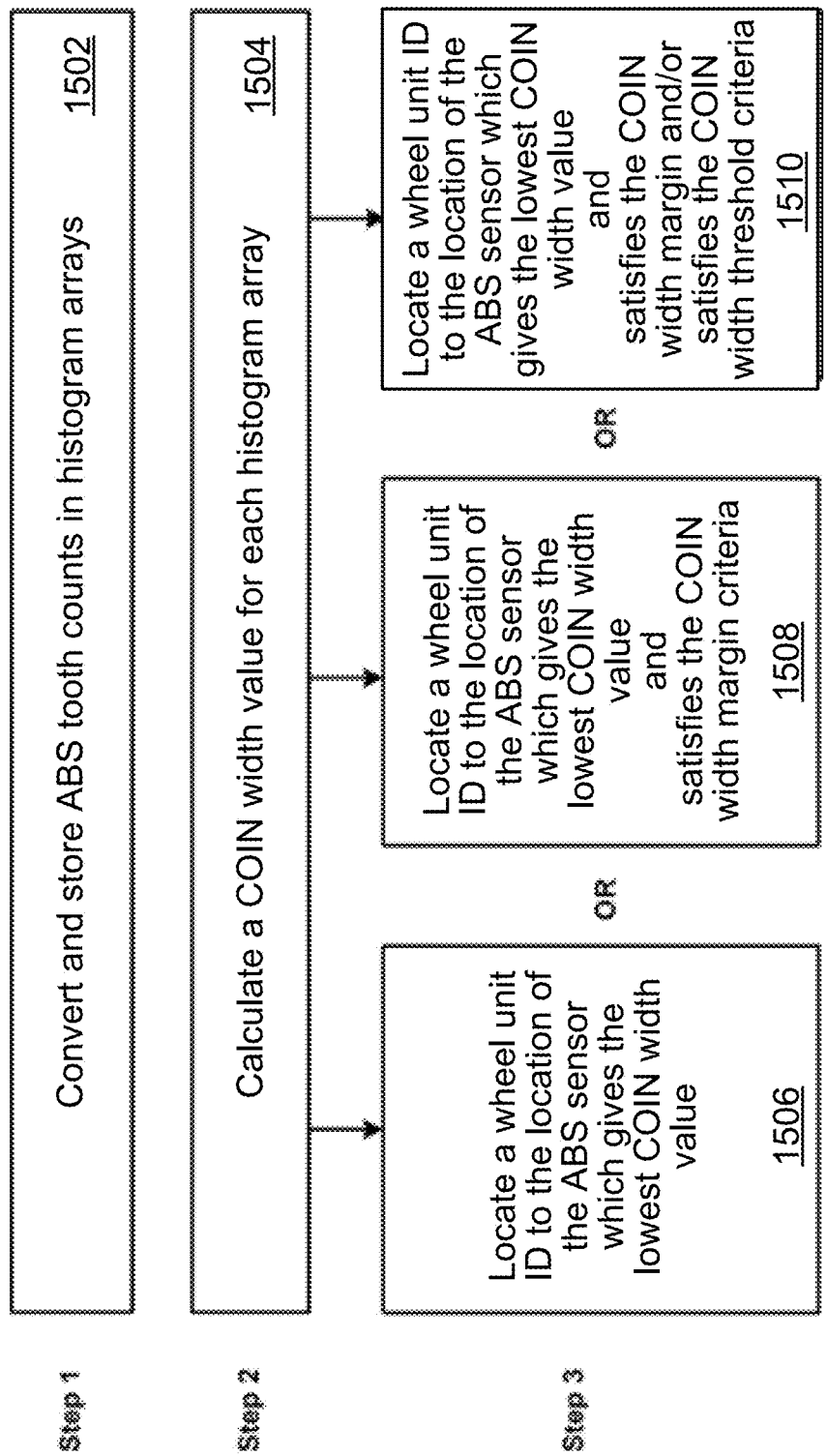
FIG. 15 is a flow chart illustrating one embodiment of an auto-location algorithm based on a COIN width analysis.

Referring to FIGS. 15-21, embodiments of an auto-location method using the confidence interval analysis are explained in detail. FIG. 15 is a flow chart illustrating one embodiment of the auto-location method based on the confidence interval analysis. In the illustrated embodiment of the auto-location method, correlated ABS tooth counts as shown in FIG. 13 above are converted and stored in histogram arrays (Step 1502). Referring to FIGS. 16A and 16B and 17, converting and storing ABS tooth counts (Step 1502) will be explained in detail. From each histogram array, a confidence interval (hereinafter referred to as "COIN") width value is calculated (Step 1504). Referring to FIG. 18, calculating the COIN width value (Step 1504) will be explained in detail. Based on the COIN width value, the auto-location method identifies a location (Step 1506, Step 1508, or Step 1510) of a wheel where a wheel unit sending RF transmission is mounted. In one embodiment, the auto-location method identifies a location of a wheel unit by assigning a wheel unit ID to the location of an ABS sensor which provides a lowest COIN width value (Step 1506). In another embodiment, the auto-location method uses the lowest COIN width value and a COIN width margin (Step 1508). In further another embodiment, the auto-location method uses the lowest COIN width value, a COIN width margin and/or a COIN width threshold (Step 1508). Referring to FIGS. 22-26, various embodiments of the auto-location method are explained in detail.

Figure 16A:
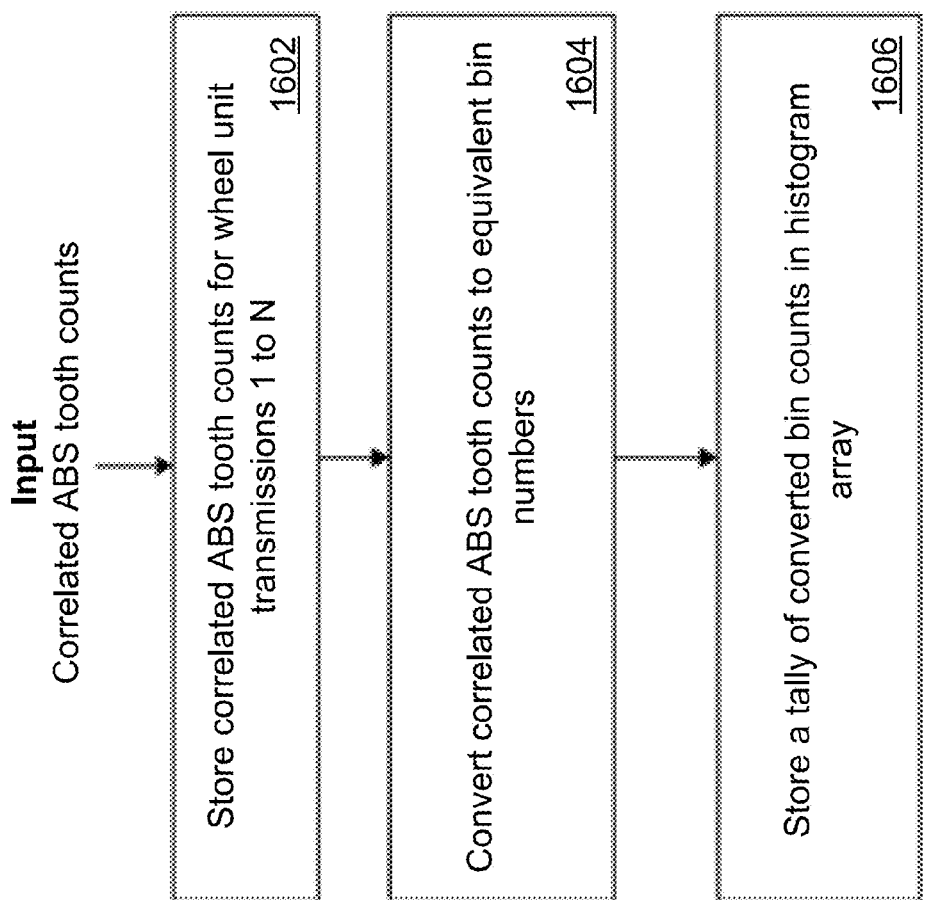
FIGS. 16A and 16B illustrate one example of converting and storing ABS tooth counts in histogram arrays in connection with the auto-location algorithm as shown in FIG. 15.
Figure 16B:
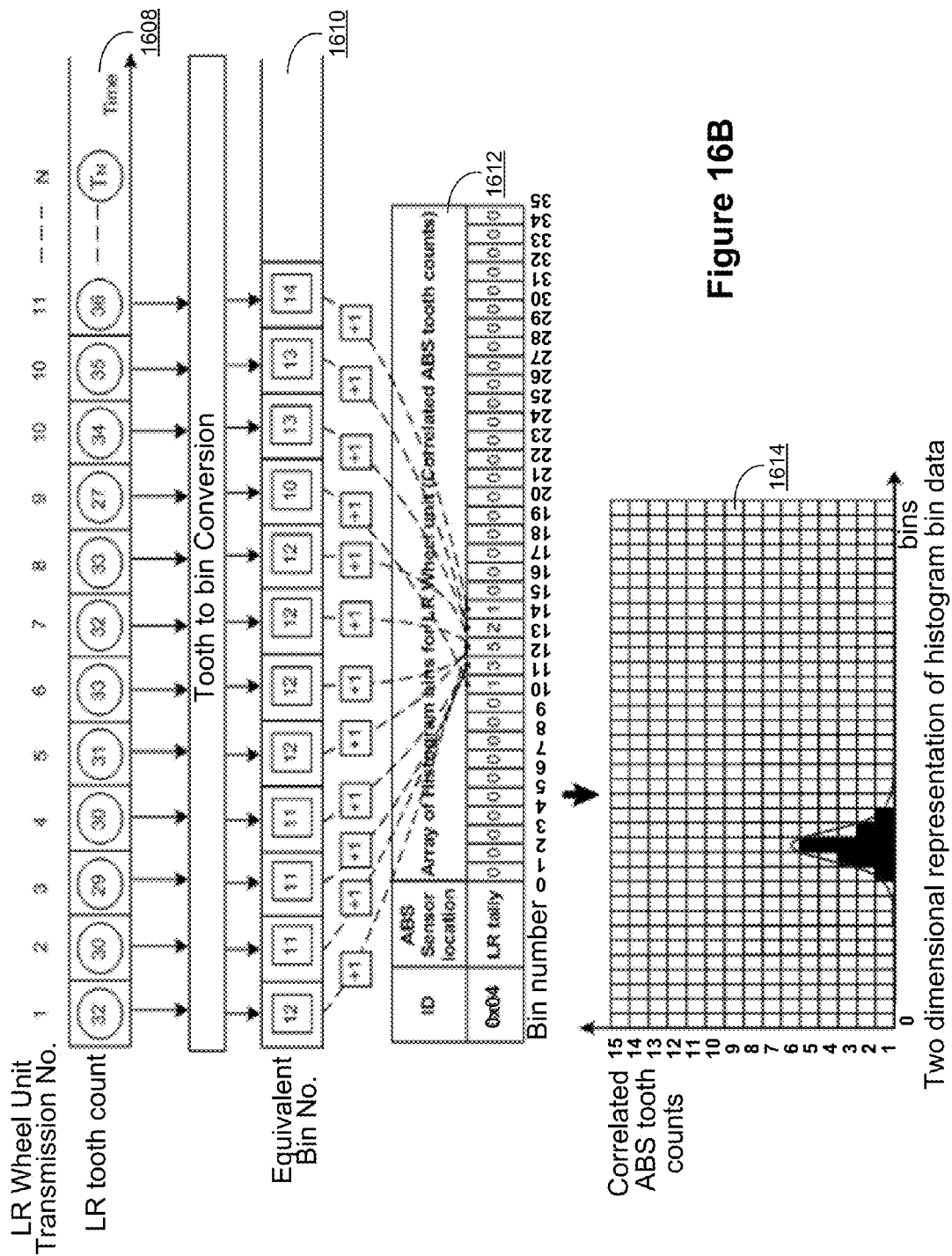

FIG. 16A is a flow chart illustrating one exemplary process of converting and storing correlated ABS tooth counts in histogram arrays (Step 1502 of FIG. 15). By way of example, correlated ABS tooth counts of the left rear (LR) ABS sensor as shown in FIG. 13 are explained. However, it would have been apparent to one of ordinary skill in the art that converting and storing correlated ABS tooth counts are not limited to the LR ABS sensor. FIG. 16B is a diagram illustrating one example of converting LR ABS correlated tooth counts into a histogram array in conjunction with the flowchart shown in FIG. 16A. In Step 1602, correlated ABS tooth counts from the LR ABS sensor (see FIG. 13) are stored for transmissions 1 to N from the wheel unit 103 as shown in a chart 1608 of FIG. 16B. In Step 1604, stored correlated ABS tooth counts are converted into equivalent bin numbers for transmissions 1 to N as shown in 1610 of FIG. 16B. A number of bins used in histogram arrays can be any value. In this embodiment, a number of bins is, for example, 36 as each histogram bin represents 10 degrees of wheel rotation (i.e., 10 degrees× 36=360 degrees). Each bin is used to tally the number of correlated ABS tooth counts which fall within that bin's range. For example, correlated ABS tooth counts 31-33 are converted into the bin number 12 which corresponds to the $120^{th}$ to 129th degree of the circumference of a wheel. As another example, correlated ABS tooth counts 34-35 are converted into the bin number 13 and correlated ABS tooth count 36 is converted into the bin number 14. In Step 1606 of FIG. 16A, a total number of converted bin counts is stored in histogram array as shown in a chart 1612 of FIG. 16B. In other words, if the equivalent bin number 12 of correlated ABS tooth counts occurs five times based on for RF transmissions 1 to N, five (5) is stored with respect to the equivalent bin number 12. FIG. 16B illustrates two dimensional plotting of bin number with respect to a number of occurrences of the same bin number. For example, FIG. 16B shows the bin number 12 on X axis and a total number of occurrences of the bin number 12, i.e., 5 on Y axis.

FIGS. 16A and 16B show the correlation histogram array between correlated ABS tooth counts from the LR ABS sensor and transmissions from the wheel unit 103. FIG. 17 illustrates a histogram array which shows all of the four wheel units 101-104, all of the four ABS sensors 201-204 and all of the four wheel locations LF, RF, RR and LR in full scale. The bin number ranges from 0 to 35 (i.e., 36) as shown at the bottom of the histogram array. The array shown in FIG. 17 will store a number of occurrences of different bin numbers for each ABS sensor for RF transmissions 1 to N. The array shown in FIG. 17 may be readily mapped to the addressable memory space of a processor such as a microcontroller.

Figure 18A:
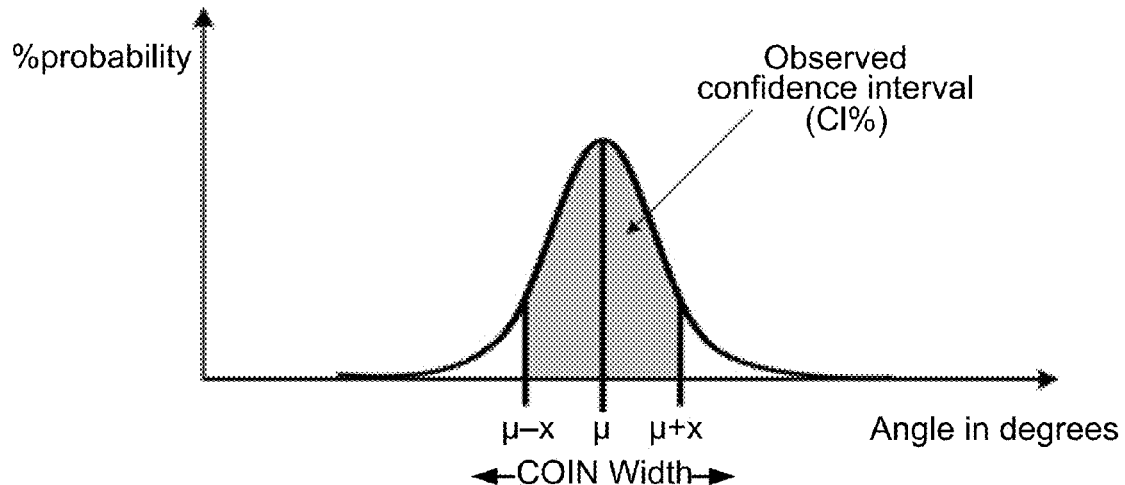
FIG. 18A illustrates a histogram having an observed confidence interval applied and FIG. 18B is a flowchart illustrating calculating a COIN width value for each histogram array in connection with the auto-location algorithm as shown in FIG. 15.

Now referring back to FIG. 15, the step of calculating an actual COIN width value for each histogram array (Step 1504) is explained in detail. FIG. 18A illustrates an observed confidence level (CI %). The relative confidence interval width is subsequently determined. The observed confidence level represents a range of values where a confidence interval width value residing in the confidence level shows properties or characteristics of correlated ABS tooth counts accurately and reliably. As shown in FIG. 18A, the COIN width is calculated as the distance of the horizontal axis named "angle in degrees" marked out by the confidence interval region or area. The COIN width, in degrees, equates to the distance between $\mu-x$ and $\mu+x$ where $\mu$ indicates the mean of the histogram distribution. The distribution may or may not be normal but the applied observed confidence interval is always the same value for all histograms. The mean $\mu$ of the distribution may or may not be at the center of the COIN width. The observed confidence interval is determined through extensive testing and simulating. The observed confidence interval ranges between 0% and 100% but it is typically higher. For example, the observed confidence interval is 90% in this embodiment.

Figure 18B:
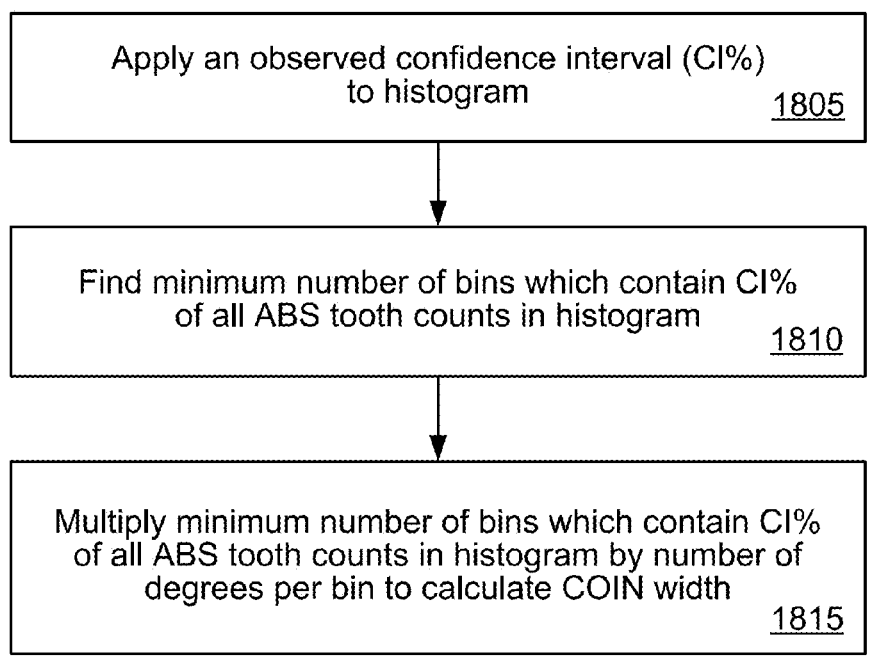

FIG. 18B is a flow chart illustrating in detail a process of calculating the COIN width value for the histogram array. As a first step (Step 1805), an observed confidence interval (typically given as a percentage, CI %) is applied to each histogram. In this embodiment, the observed confidence interval is 90%. As a result of extensive testing and simulating, it has been determined that the observed confidence interval of 90% may substantially cover a potentially relevant and meaningful value of correlated ABS tooth counts. In a subsequent step (Step 1810), a minimum number of bins which contain CI % of ABS tooth counts is identified from the histogram. Upon finding of the minimum number of bins, the minimum number of bins which is contained within CI % of all ABS tooth counts is multiplied by number of degrees per bin (e.g., 10 degrees) to calculate an actual COIN width (Step 1815).

FIG. 19 illustrates a histogram of correlated ABS tooth counts with respect to the number of bins. FIG. 19 illustrates that the histogram within the COIN width shows a normal distribution curve. The histogram of ABS tooth counts does not have to exactly portray a normal distribution pattern or shape. Also, the number of correlated ABS tooth counts constituting the observed confidence interval is not required to lie within the area bounded by the normal distribution curve, between µ−x and µ+x. As shown in FIG. 20, the number of correlated ABS tooth counts need to only lie within the area bounded by the limits y1, y2, µ−x and µ+x. The limit given as y2 in FIG. 19 can be any value. For example, the value of y2 is equal to 15. Based on the limits y1, y2, µ−x and µ+x, data points 2010 and 2020 which are outside of the limits are not taken into consideration. The confidence interval is used to assess the width of the distribution, it is not necessary to assess the height or skewness of the distribution.

Figure 21A:
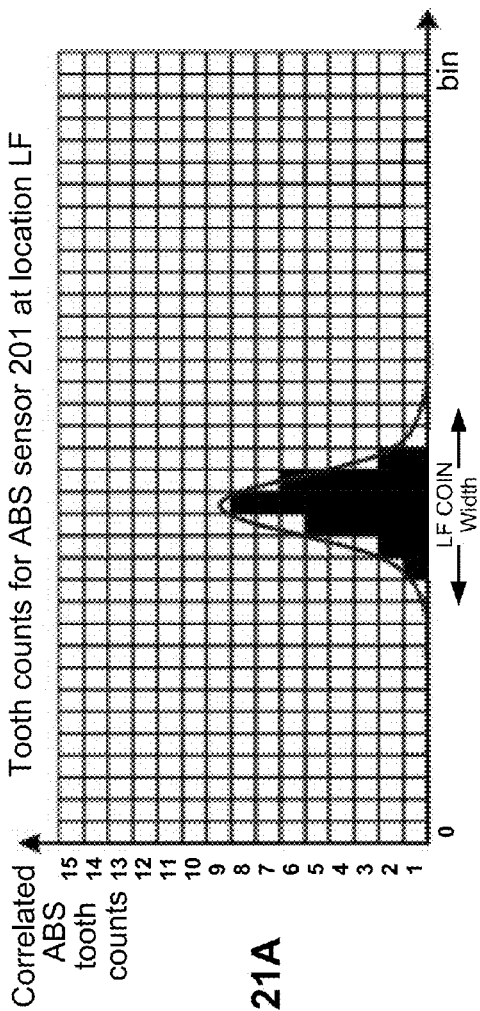
Figure 21B:
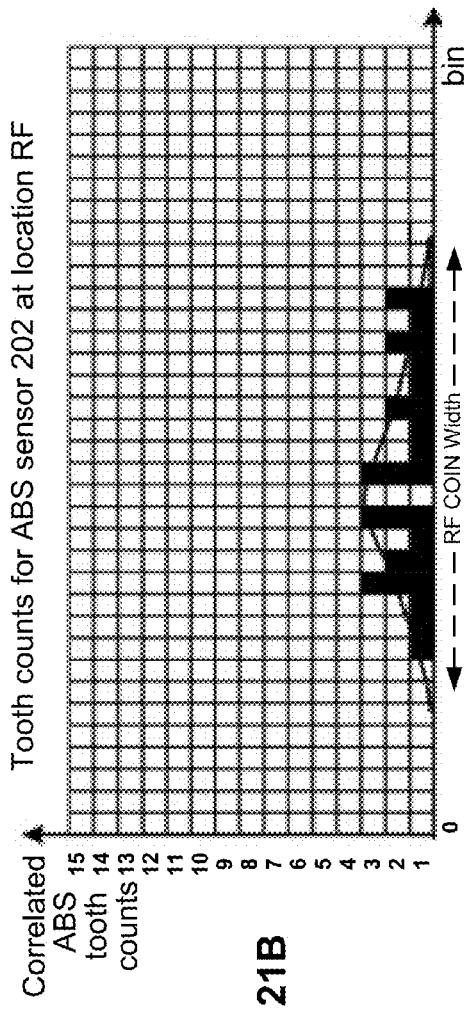

Referring back to FIG. 15 again (Steps 1506, 1508 and 1510) and FIG. 21, locating wheel units is explained in detail. In Step 1506, one embodiment of auto-location of a wheel unit is based on the location of ABS sensor which provides the lowest COIN width value. FIGS. 21A to 21D illustrate one example of COIN width values calculated for the wheel unit 101 with respect to four ABS sensors after 24 transmissions have been received. With respect to RF transmissions from the wheel unit 101 (LF wheel location), FIG. 21A shows a distribution pattern of correlated ABS tooth counts from the ABS sensor 201, FIG. 21B shows a distribution pattern of correlated ABS tooth counts from the ABS sensor 202, FIG. 21C shows a distribution pattern of correlated ABS tooth counts from the ABS sensor 203, and FIG. 21D shows a distribution pattern of correlated ABS tooth counts from the ABS sensor 204, as shown in FIG. 1. FIG. 21A shows a pattern that looks like a normal distribution pattern, as opposed to FIGS. 21B to 21D which show random distribution patterns. Accordingly, the auto-location method can determine that the wheel unit 101 is located at the LF location based on the pattern match as the LF ABS sensor 201 shows the normal distribution pattern. From histograms of FIGS. 21A to 21D, each COIN width value is calculated as the distance in degrees on the X axis within which bounds CI % of the ABS tooth counts lie. FIG. 21A shows the lowest COIN width value, as opposed to FIGS. 21B-21D showing substantially higher COIN width values.

The COIN width value is first calculated as a number of bins on the X axis as shown in FIGS. 21A to 21D and then converted into a value in degrees by multiplying the number of bins equal to the COIN width by the number of degrees per bin (e.g., 10 degrees in this embodiment). Preferably, a more precise COIN width value can be calculated by linearly interpolating between the number of bins which contain less than 90% of the entire data set after N transmissions and the number of bins which contain more than the number of counts required to give 90% of the entire data set after N transmissions in this embodiment. Upon finding the location of the ABS sensor which provides the lowest COIN width value, such location is identified as a location of the wheel unit. In the example as shown in FIGS. 21A to 21D, the LF location is identified as the location of the wheel unit.

Figure 22:
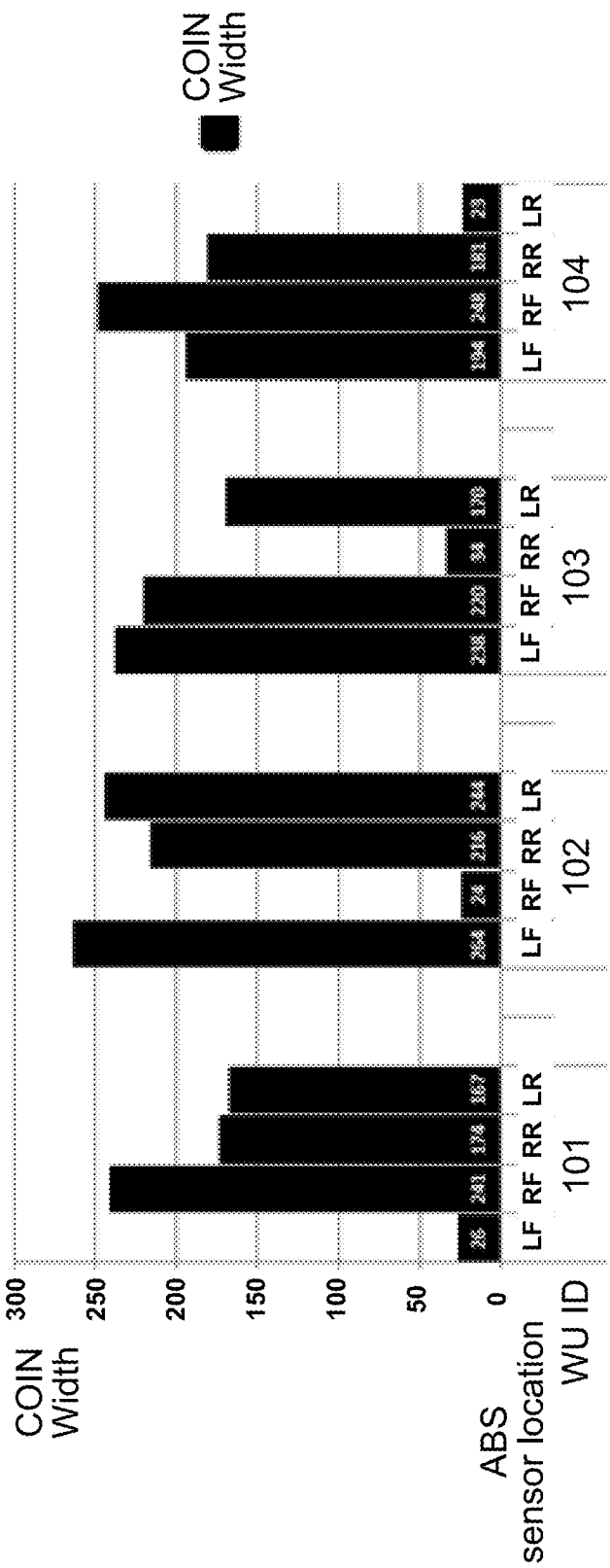
FIG. 22 illustrates one example of bar charts showing COIN widths calculated for each wheel unit and each ABS sensor located at left front, right front, left rear and right rear locations.

FIG. 22 is a bar chart illustrating COIN width values which are calculated for each wheel unit 101, 102, 103 or 104. For the wheel unit 101, the bar chart shows each calculated COIN width for LF, RF, RR and LR ABS sensors. The COIN width value of the LF ABS sensor 201 is the lowest (i.e., 26) for the wheel unit 101. Likewise, the COIN width value of the RF ABS sensor 202 is the lowest (i.e., 24) for the wheel unit 102, the COIN width value of the RR ABS sensor 203 is the lowest (i.e., 34) for the wheel unit 103, and the COIN width value of the LR ABS sensor 204 is the lowest (i.e., 23) for the wheel unit 104. With respect to the wheel unit 101, the COIN width values for three other ABS sensors 202, 203 and 204 are significantly larger. With respect to the wheel units 102, 103 and 104, three other ABS sensors which are not mounted at the same wheel where the wheel unit 102, 103 or 104 is mounted show significant COIN width values.

Figure 23:
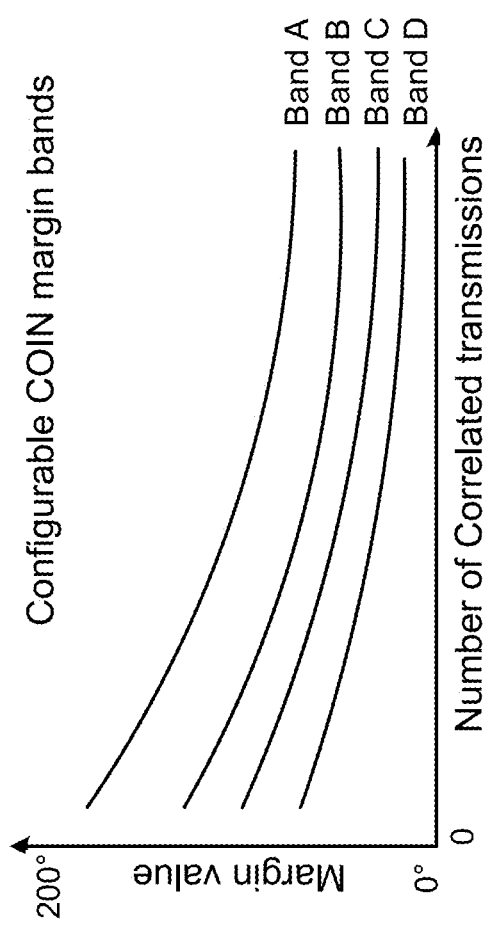
FIG. 23 illustrates one example of configuration of COIN width margin bands.
Figure 24:
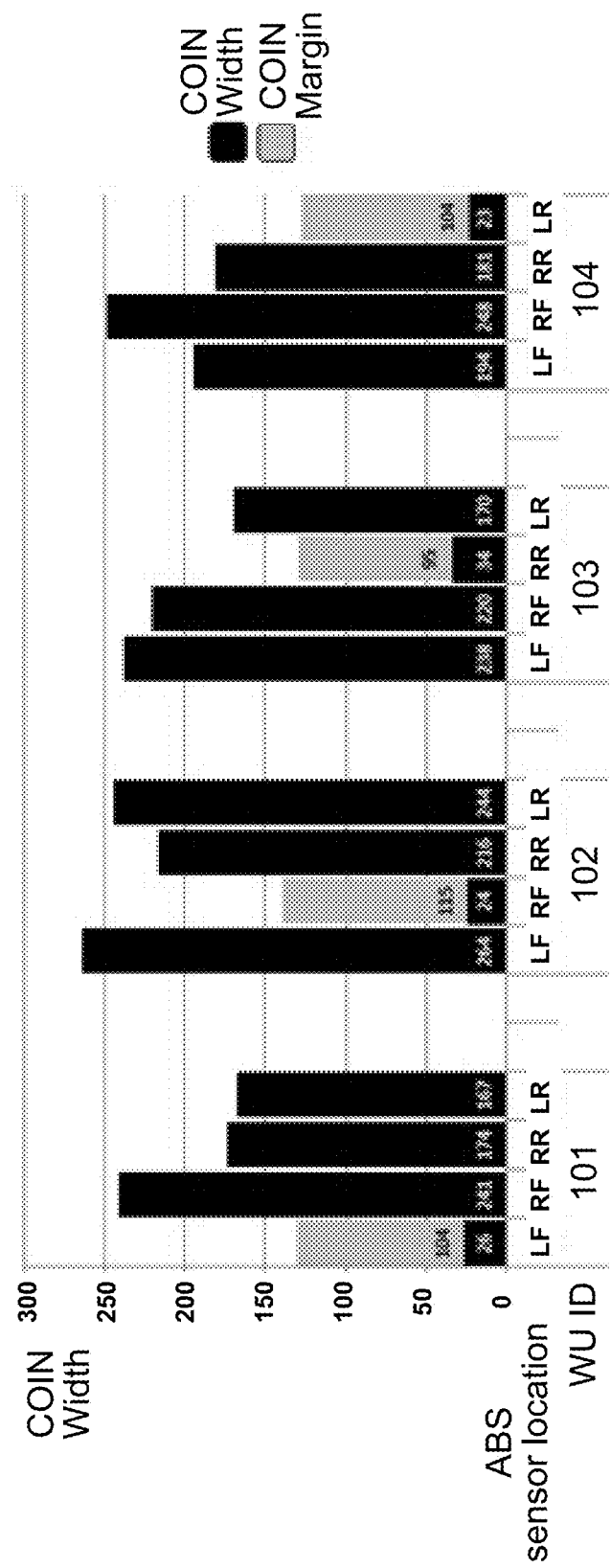
FIG. 24 illustrates bar charts of FIG. 22 with application of the COIN width margin of FIG. 23.

Referring to FIGS. 15, 23 and 24, another embodiment of auto-location of wheel units 101, 102, 103 and 104 is further described. In Step 1508 of FIG. 15, the location of a wheel unit is identified as the location of the ABS sensor which provides the lowest COIN width value and satisfies COIN width margin criteria. FIG. 23 illustrates a wheel unit is determined to be located to an ABS sensor location if the calculated COIN width value for that ABS sensor location is smaller than the COIN width values calculated for the three other ABS sensor locations by at least a distance of an applied margin. One preferred embodiment is that the margin applied is dynamic rather than fixed and is a function of the number of correlated transmissions received from the wheel unit to be located. FIG. 23 shows examples of dynamic COIN margins, how they may change dependent on the number of correlated transmissions and how their profiles may be configurable. FIG. 23 shows 4 different COIN margin bands. The COIN margin band employed can be dependent on specific vehicle characteristics. For example, if the ABS sensor signals for a vehicle are shown to be subject to a large amount of jitter, then a more conservative COIN margin band such as band A might be employed. In that situation, the distribution of the correlated ABS tooth counts may be more spread than that of a system with no or a less amount of jitter.

FIG. 24 illustrates a bar chart showing how the COIN margin might be employed to locate wheel-units to ABS sensor locations. One axis of the bar chart shows a COIN width value and the other axis of the bar chart shows ABS sensor locations as discussed above in conjunction with FIG. 23. The COIN margin is illustrated for each wheel unit. The COIN width margin may vary for each wheel unit in this embodiment. In another embodiment, the COIN width margin may be identical for each wheel. In this embodiment, the COIN width margin for the wheel unit 101 is, for example, (104). As shown in FIG. 24, for the wheel unit 101, the COIN width value of the LF ABS sensor 201 combined with the COIN width margin (104) is lower than the other COIN widths. COIN width values of other ABS sensors 202, 203 and 204 are significantly higher than the combined COIN width margin and LF COIN width value (130). Likewise, for the respective other wheels, the combined COIN width (lowest COIN width and COIN width margin) will be lowest for the wheel unit present at the ABS sensor location Using the COIN width margin may improve accuracy of auto-location. In addition to the lowest value of the COIN width from a certain location of ABS sensor, the COIN width margin adds another layer of robustness in determination of the wheel location.

Figure 25:
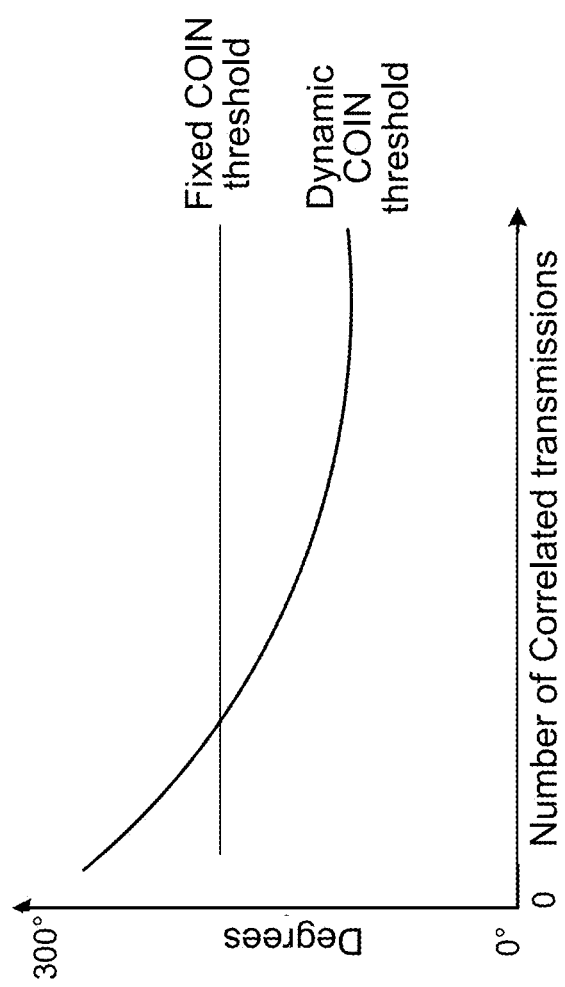
FIG. 25 illustrates two examples of configurations of COIN width thresholds i.e fixed or dynamic.
Figure 26:
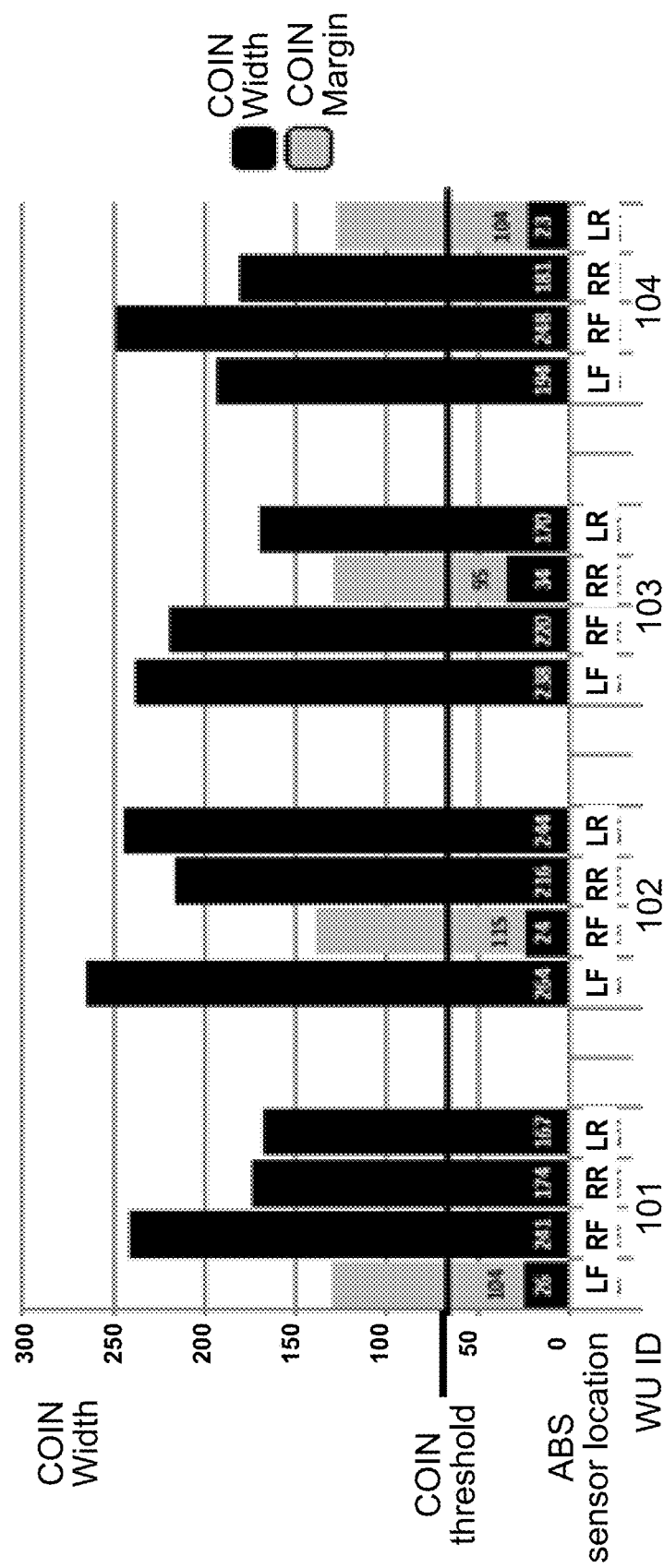
FIG. 26 illustrates bar charts of FIGS. 22 and 24 with application of the fixed COIN width threshold of FIG. 25.

Referring to FIGS. 15, 25 and 26, another embodiment of auto-location of wheel units 101, 102, 103 and 104 is further described. In step 1510 of FIG. 15, the location of a wheel unit is further defined by using a COIN width threshold. In one embodiment, the COIN width threshold may be used along with the lowest COIN width value. Alternatively, the COIN width threshold may be used along with both the lowest COIN width value and the COIN width margin criteria. FIG. 25 illustrates two examples of COIN width threshold techniques. The COIN width threshold may be fixed or dynamically changing. FIG. 26 illustrates one example of how the COIN width threshold may be used to locate wheel units to ABS sensor locations. The COIN width threshold is a predetermined value which is used to distinguish between the more normal data coming from wheel units mounted on the vehicle and more random data coming from wheel units not mounted to the vehicle. In order for a wheel unit to be located to a specific ABS sensor location the COIN width value for that ABS sensor location must be less than the COIN width threshold.

Using the COIN threshold may improve accuracy of auto-location. The COIN width margin and the COIN width threshold may be used interchangeably. If the lowest value of the COIN width, the COIN width margin and the COIN width threshold may be used all together, the maximum accuracy of auto-location may be achieved. It would have been apparent to one of ordinary skill in the art that the COIN width margin and threshold can be adjusted and modified in light of hardware conditions such as vehicle conditions, road conditions, and many other variables.

Figure 27:
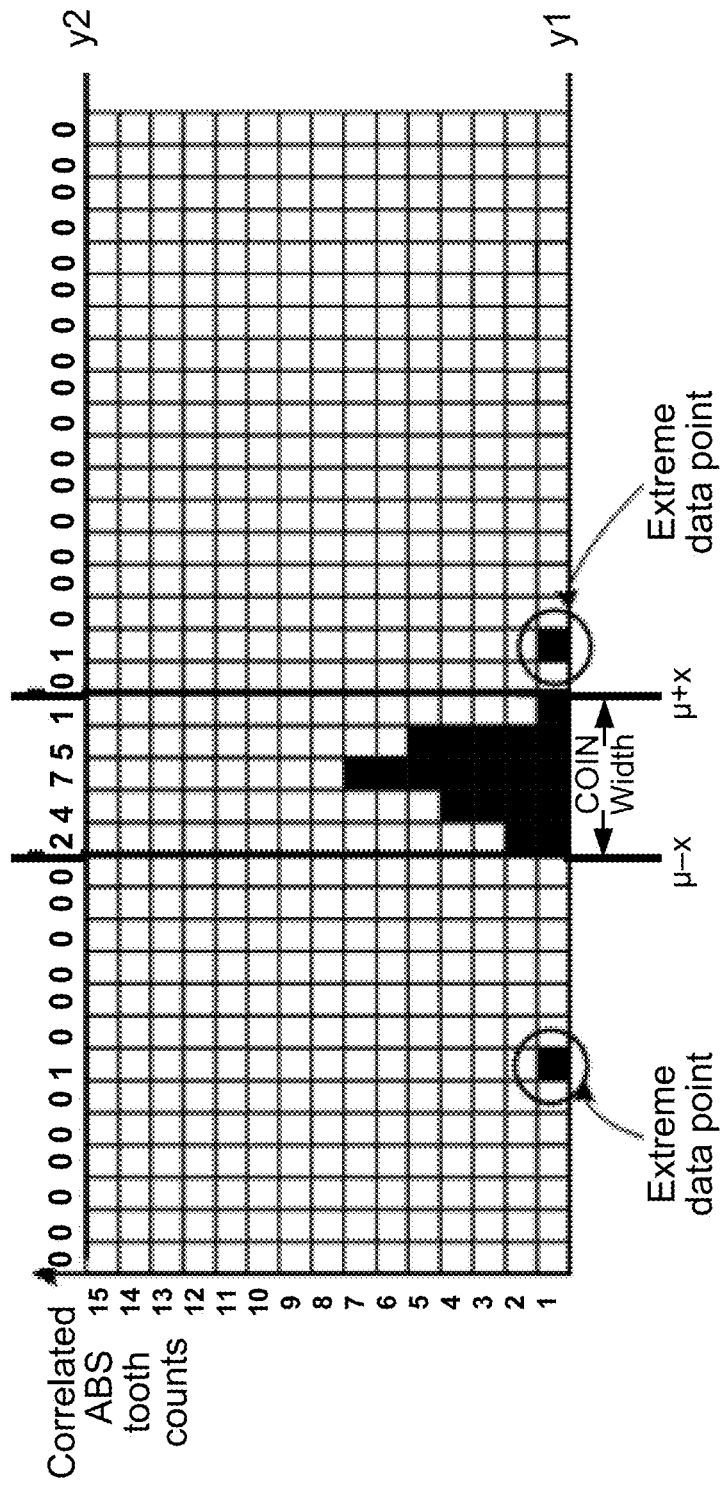
FIG. 27 illustrates consideration of extreme data points in connection with the COIN width analysis.

As the above illustrated embodiments, the COIN width value is used, instead of conventional statistical analysis. Using the COIN width may alleviate an undesirable consequence of extreme data points as shown in FIG. 27. With the conventional statistical analysis methods, extreme data points may have a disproportionate effect. In the above embodiments, the COIN width value is used and extreme data points may not be taken into consideration especially when extreme data points are infrequent and sparse. Only data points which lie within the boundary of the observed confidence level may be considered in the calculation of the COIN width and therefore, extreme data points outside the observed confidence region will likely have no bearing on the COIN width value and the auto-location of the wheel.

As extreme data points of correlated ABS tooth value do not significantly impact the determination of the wheel location, system robustness may be optimized. Accordingly, the embodiments using the COIN width analysis may alleviate the effect that the extreme data points have on the statistical analysis to correlated tooth data of ABS sensors. The COIN width analysis may not require mean calculation and tracking the mean value of the data set under analysis, which reduces processing load and complexity. Reduced processing may be suitable for implementation in software chips having low processing power.

Figures 28A, 28B:
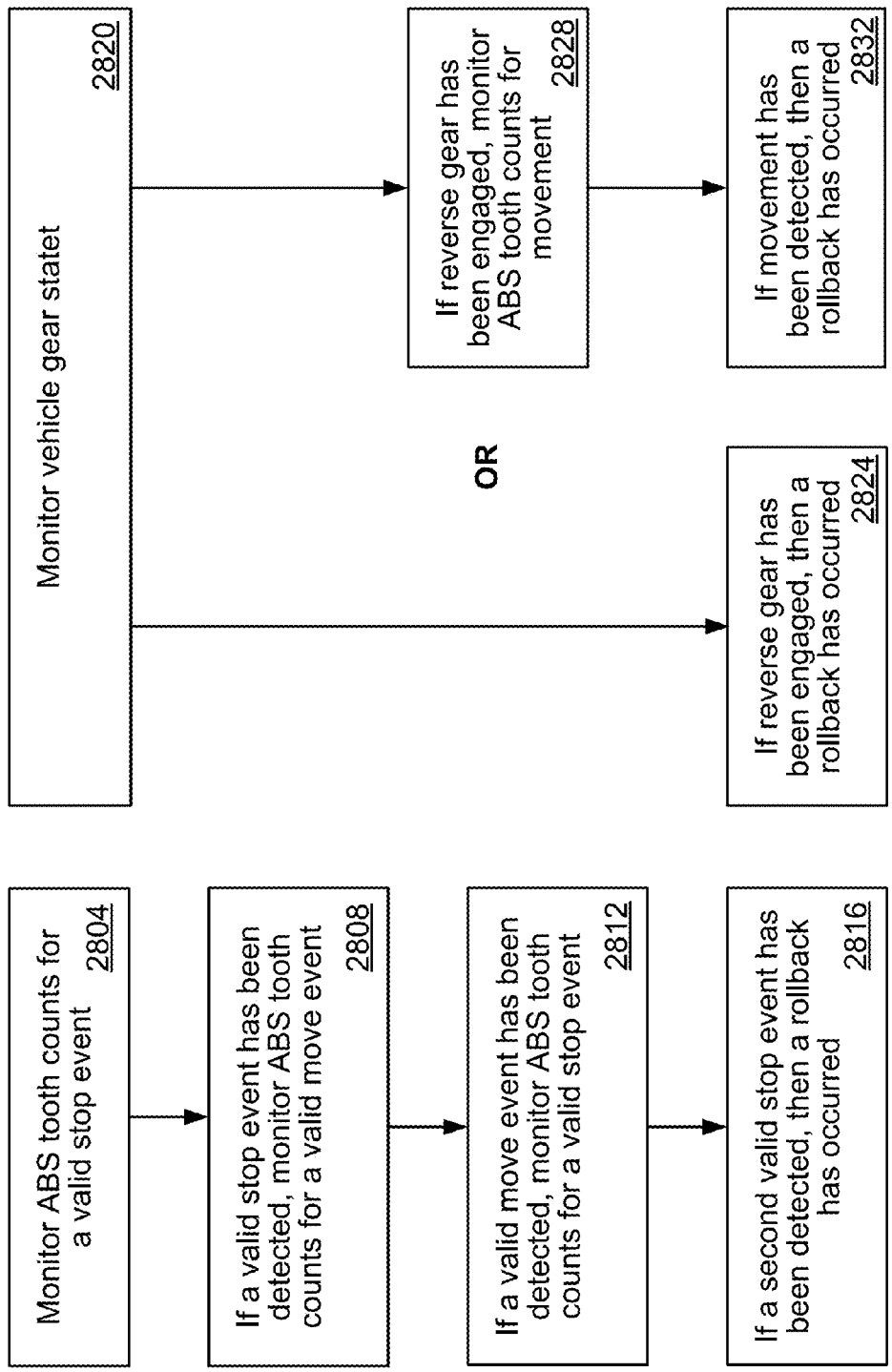
FIGS. 28A and 28B are flowcharts illustrating monitoring and detecting of rollback events.

Referring to FIGS. 28A and 28B, another embodiment of COIN width analysis is described in detail. ABS tooth counts increment upwards regardless of whether a wheel is turning clockwise or counter-clockwise. Any counter clockwise movement over the course of driving may result in a shift in the perceived mean of correlated ABS tooth counts. Two events which can cause the mean of the correlated ABS tooth counts for a particular wheel to shift are as follows. The first event is that a wheel rolls backwards while the vehicle stops at a stop sign, a junction, or a traffic light, etc. Such event has been seen to be more prevalent for a vehicle with manual transmission. The second event is that a reverse maneuvering is performed via a reverse gear. The first and the second events are referred to as rollback events.

Rollback events may change means of correlated ABS tooth counts which in turn may result in incorrect auto-location. Accordingly, rollback events should be detected and managed in order to ensure that the accurate location of a wheel unit can be made. FIG. 28A is a flow chart illustrating detecting and monitoring one example of the rollback event based on temporary stop of a vehicle in the first event. In Step 2804, ABS tooth counts are monitored for a valid stop event. If a valid stop event has been detected, then monitoring of ABS tooth counts is performed for a valid move event (Step 2808). If a valid move event has been detected, monitoring of ABS tooth counts is carried out until a valid stop event is detected (Step 2812). If a second valid stop event has been detected, then it is determined that a rollback or a roll forward event has occurred (Step 2816).

FIG. 28B is a flow chart illustrating detecting and monitoring another example of the rollback event based on a vehicle gear state. In Step 2820, monitoring of the vehicle gear state is performed. If a reverse gear has been engaged, then a rollback event has occurred (Step 2824). Alternatively, if the reserve gear has been engaged, monitoring of ABS tooth counts for movement is performed (Step 2828). Upon detection of any movement, it is determined that a rollback event has occurred (Step 2832).

Figure 29A:
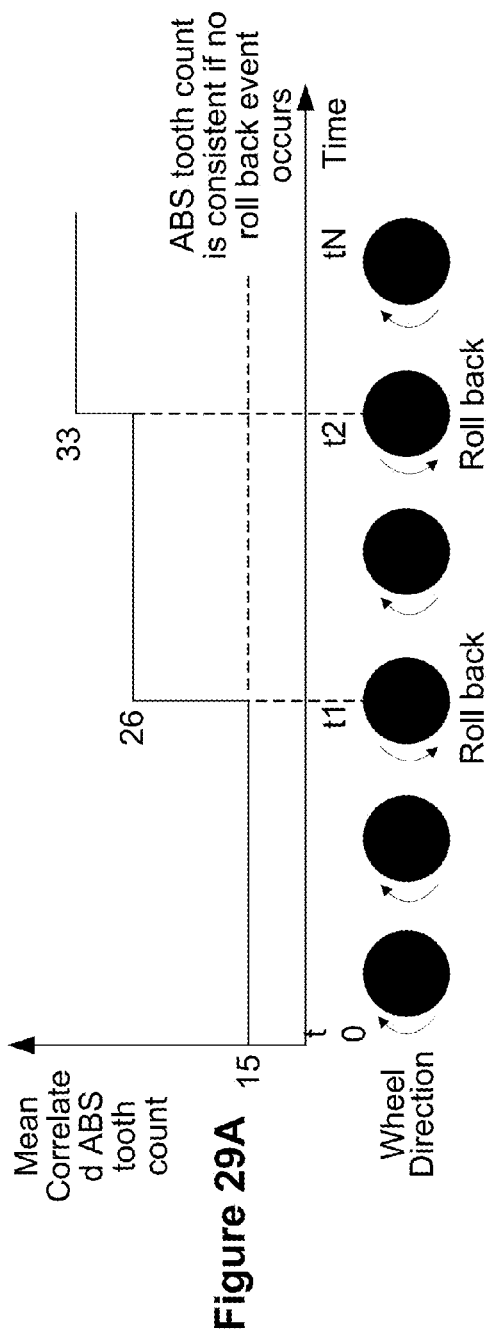
FIG. 29A illustrates a chronological example of how a mean correlated ABS tooth count my change over time upon occurrence of rollback events during a drive.

FIG. 29A illustrates one example of detecting rollback events while a vehicle is driving. As the vehicle is driving clockwise, mean correlated ABS tooth count is stayed at 15 until t1. By using the example of the wheel unit 101 in FIG. 22, upon detection of a first rollback occurrence at t1, mean correlated ABS tooth counts become 26. At t2, a second rollback occurrence takes place but mean correlated tooth count becomes 33, for example. If rollback occurrences are not taken into consideration, a larger COIN width value between t0 and tN will be considered as a relevant COIN width value. Accordingly, rollback occurrences should be considered to determine an accurate COIN width value.

Figure 29B:
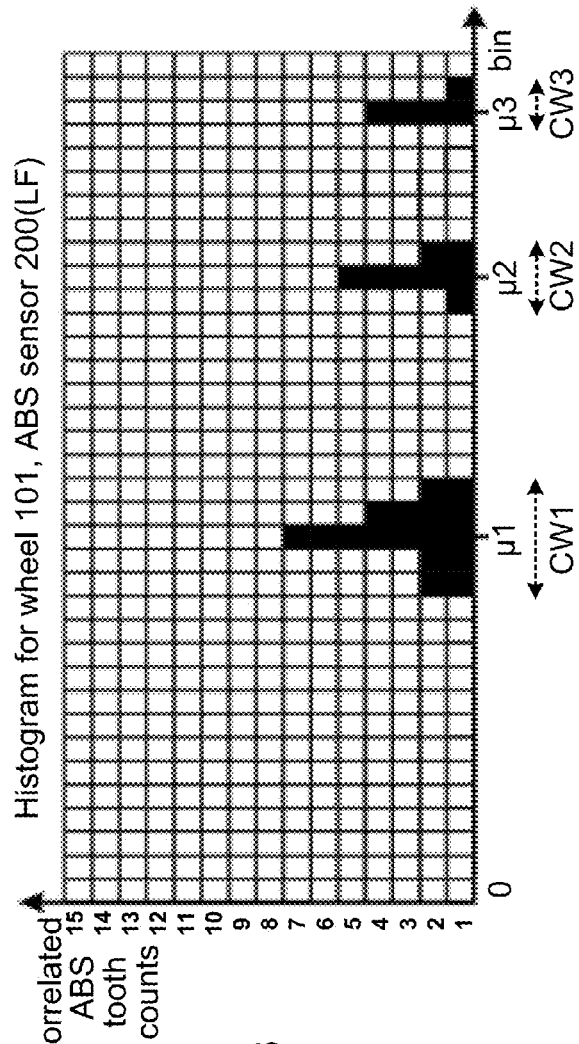

FIG. 29B illustrates one example of determining a COIN width value in the vehicle movement as shown in FIG. 29A. Instead of considering a single composite COIN width value for correlated ABS tooth counts between t0 and tN, a first COIN width value of correlated ABS tooth counts prior to the first rollback event, a second COIN width value between the first rollback event and a second rollback event, and a third COIN width value after the second rollback event are respectively considered. That way, relevant COIN width values, without being interrupted and distracted by rollback events, may be considered and result in an accurate auto-location of wheels. Only by way of example, FIG. 29B illustrates the histogram for the wheel 101 and ABS sensor 201 (i.e., LF location). However, it would have been apparent to one of ordinary skill in the art that this embodiment is not limited to such location.

Figure 30:
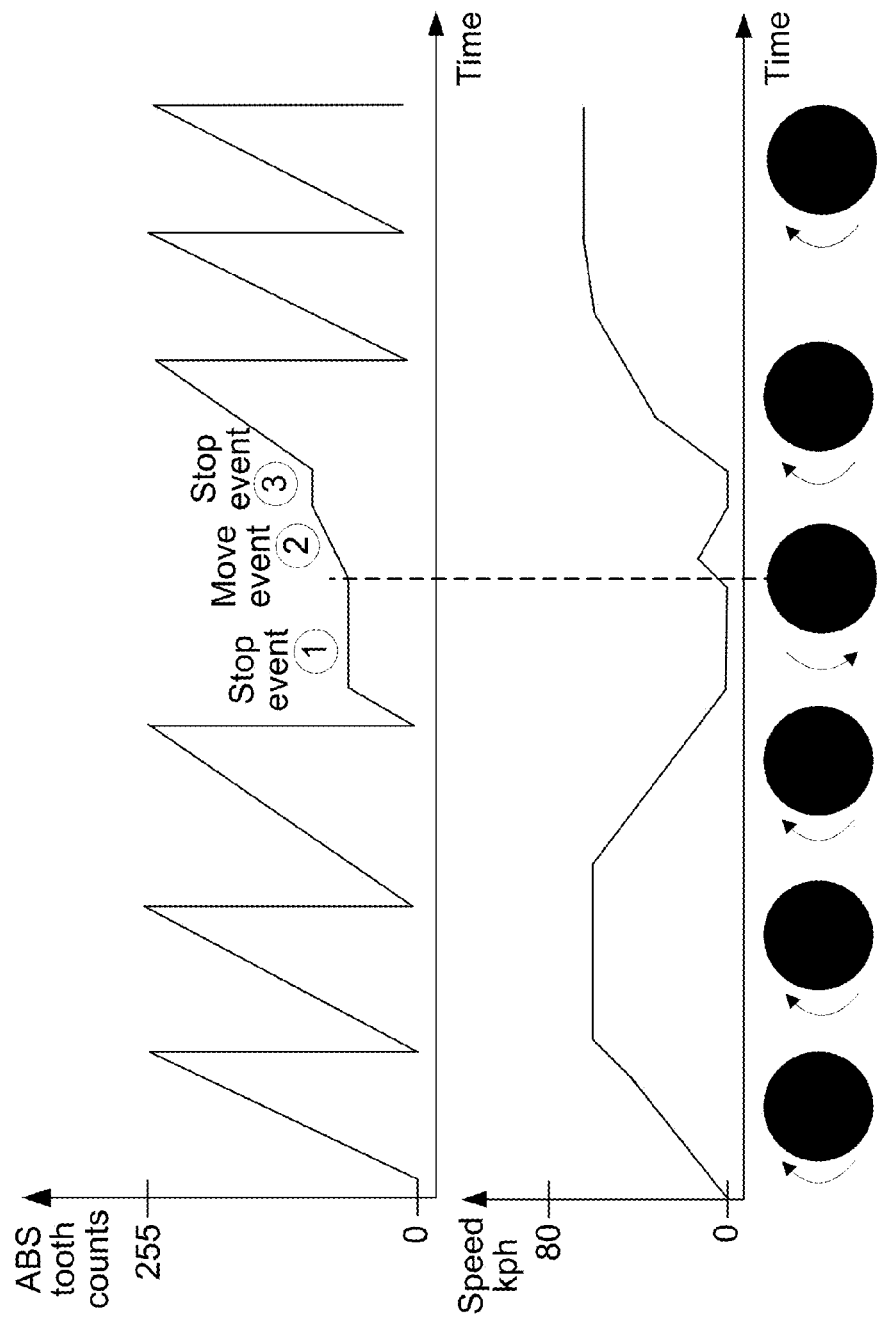
FIG. 30 illustrates a telltale pattern of a vehicle roll, backwards, or forwards between two stop events with respect to speed and ABS tooth counts.

Referring to FIGS. 30-32, detecting valid rollback events is illustrated. FIG. 30 illustrates one example of ABS tooth counts and speed of a vehicle over time. When the vehicle stops, the speed of the vehicle drops substantially. At the same time, ABS tooth counts show irregular patterns that are different from ABS tooth counts before and after rollback events. As the vehicle resumes moving subsequent to the first stop, the speed of the vehicle increases and decreases after the second stop event. Upon occurrence of the first and the second stop events, ABS tooth counts become flat and do not increase as shown in FIG. 30.

Figures 31A, 31B:
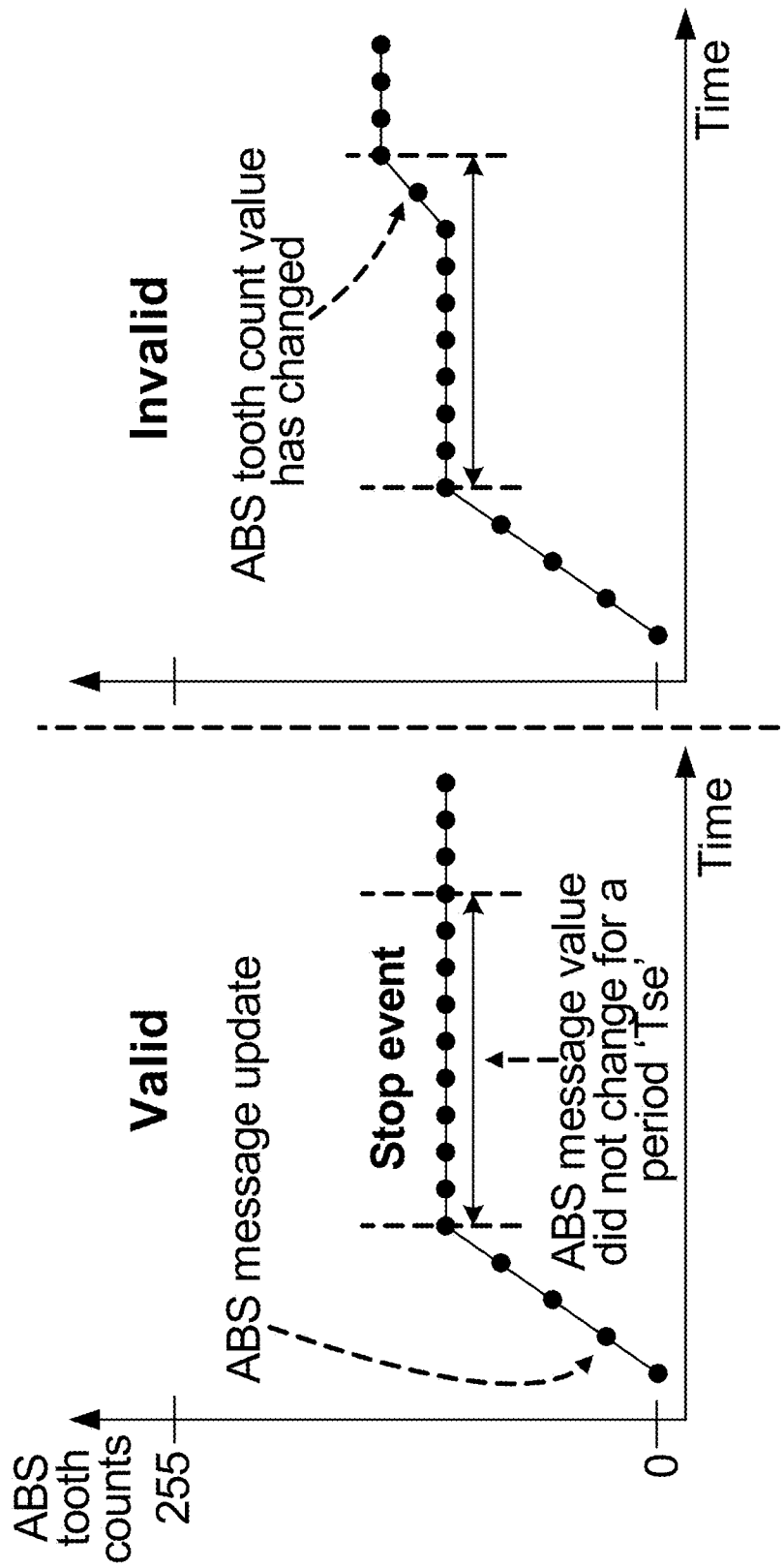
FIGS. 31A and 31B illustrate detecting a valid stop event.

FIG. 31A illustrates one example of a valid stop event. FIG. 31B illustrates one example of an invalid stop event. During a monitoring time period of Tse, ABS tooth counts in FIGS. 31A and 31B show different patterns of change. In FIG. 31A, the ABS tooth counts remain unchanged and flat for the duration of a period Tse. This signifies that a stop event has occurred. On the other hand, in FIG. 31B, the ABS tooth counts have changed during the monitoring time period of Tse. This would not signify a stop event.

Figures 32A, 32B:
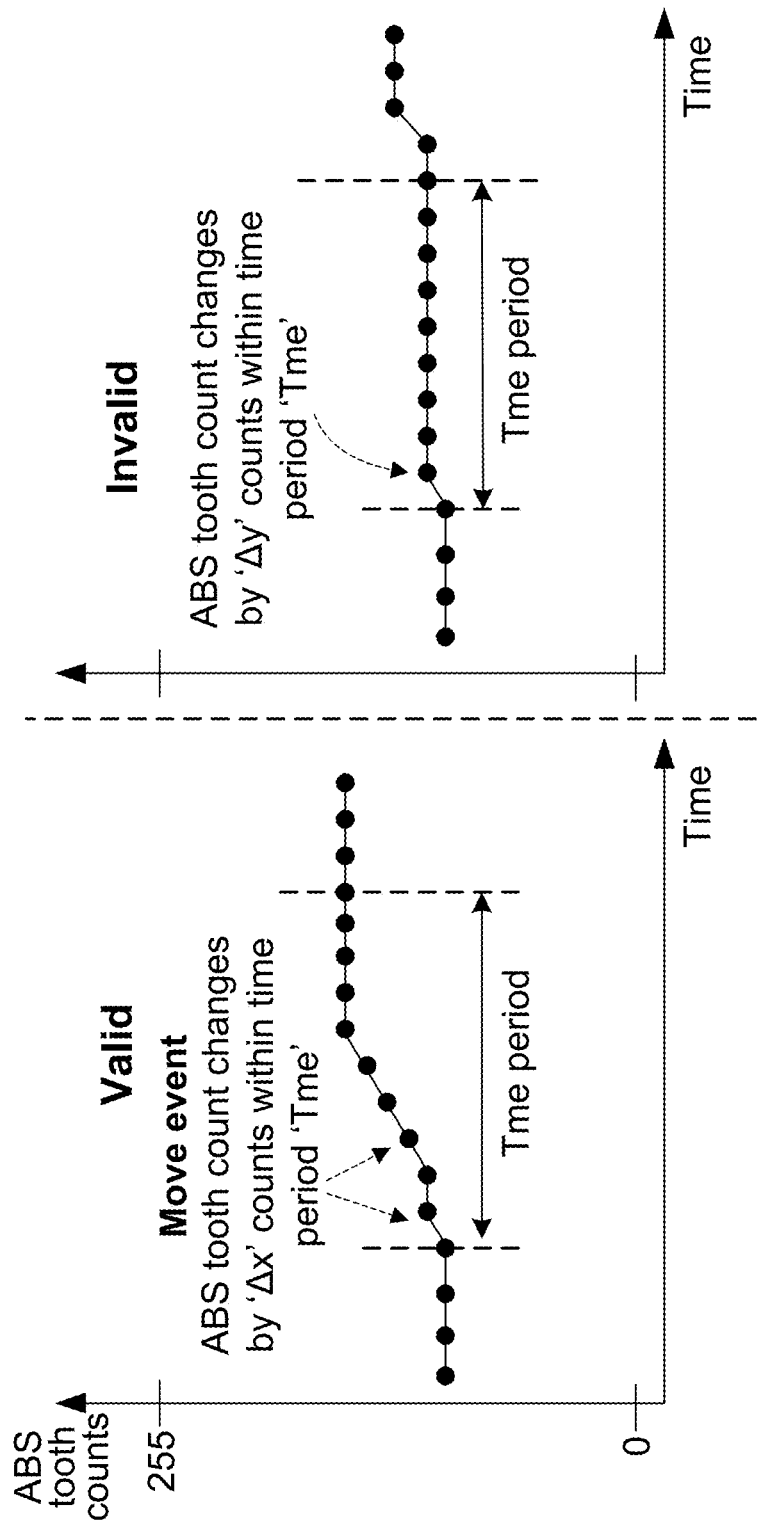
FIGS. 32A and 32B illustrate detecting a valid move event.

FIG. 32 illustrates one example of detecting a valid move event. FIG. 32A illustrates one example of detecting a valid move event. During a relevant monitoring time period, if ABS tooth counts changes by Δx counts as shown in FIG. 32A, this signifies a valid move event. On the other hand, during the relevant monitoring time period, if ABS tooth counts changes by Δy counts as shown in FIG. 32A, this signifies an invalid move event. The amount of Δx and Δy counts may be configured in light of hardware elements such as a vehicle, ABS sensors, TPM sensors, etc. and the Δx counts are always greater than the Δy counts. By way of example only, in this embodiment, Δx has a value of 2 and Δy has a value of 1. It should also be noted that, Δy may be 0 and would signify that the ABS tooth counts have not changed and remain flat for the entire period time.

Figure 33:
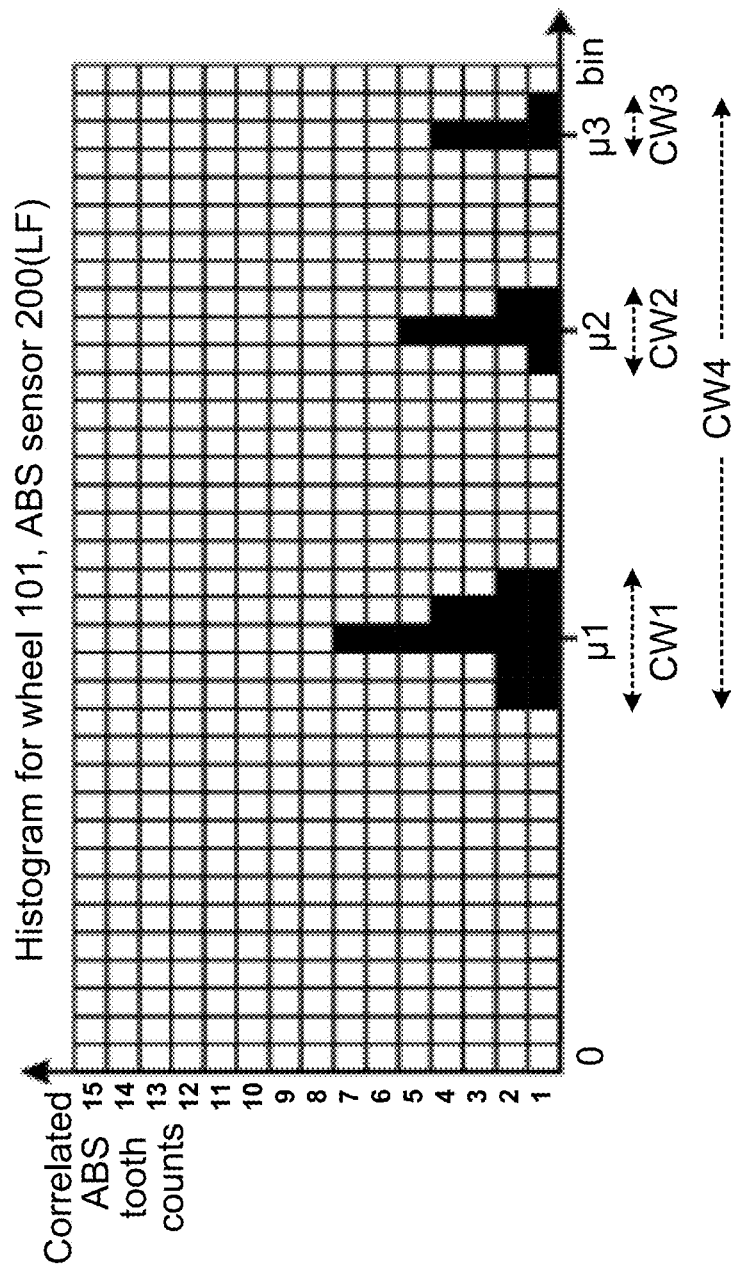
FIG. 33 illustrates a histogram applying COIN width weighting analysis.

As discussed above in connection with FIG. 29B, multiple COIN widths may be obtained during the entire drive of the vehicle as rollback events have been detected. This requires accumulating an average COIN width value for a histogram over the course of the entire drive. As shown in FIG. 33, it is not desirable to calculate the COIN width as the COIN width value, CW4. CW4 is the entire distribution of ABS tooth counts as shown in FIG. 33. CW4 may not properly and accurately represent the true COIN width which may result in incorrect outcome of auto-location. In this embodiment, the COIN width value may be more efficiently calculated as a weighted cumulative average of the three individual COIN widths, CW1, CW2 and CW3 through COIN width weighting.

COIN width weighting is used to calculate a weighted cumulative COIN width, CCW, which is a function of the individual COIN widths for each of the distinct distributions at $\mu1$, $\mu2$ and $\mu3$, and the number of ABS tooth counts which comprise each of these distinct distributions. The number of ABS tooth counts which correspond to each of the distinct distributions $\mu1$, $\mu2$ and $\mu3$ will be referred to as n1, n2 and n3, respectively. Accordingly, the weighted cumulative COIN width, CCW, is calculated as:

$$CCW=(CW1*n1+CW2*n2+CW3*n3)/(n1+n2+n3) \quad \text{(Equation 1)}$$

Calculating CCW based on Equation 1 may not require storing a mean value of correlated ABS tooth counts histograms and storing the last correlated ABS tooth count calculated. The weighted cumulative COIN width can be updated after each time a valid rollback event has been detected. By using the examples illustrated in FIGS. 29A and 29B, the following update can be performed.

$$\text{After time } t1, CCW=(CW1*n1)/n1 \quad \text{(Equation 2)}$$

$$\text{After time } t2, CCW=[(CCW*n1)+(CW2*n2)]/(n1+n2) \quad \text{(Equation 3)}$$

$$\text{After time } tN, CCW=[CCW*(n1+n2)+(CW3*n3)]/(n1+n2+n3) \quad \text{(Equation 4)}$$

Upon determination of CCW, auto-location is performed as discussed above in connection with FIGS. 15 and 21-26. Instead of the COIN width value, CCW value is used to identify the location of the wheel. With respect to the COIN width margin and threshold, CCW value is used instead of the COIN width value. The COIN width margin and the COIN width threshold may still be applied.

In the embodiments discussed above, the COIN width analysis is used to perform auto-location of wheels. The COIN width analysis may not be affected by extreme data points which may be present for various and unknown reasons and result in an accurate outcome of auto-location. The COIN width analysis may be based on the lowest COIN with only. Alternatively, or additionally, the COIN width analysis may be based on the combination of the lowest COIN width and the COIN width margin, the lowest COIN width and the COIN width threshold, and/or the lowest COIN width, the COIN width margin and the COIN width threshold. As more COIN width related values are considered, accuracy of the auto-location may improve. It is possible to select relevant COIN width related values based on vehicle configurations, market needs, processing resources, etc. By using the COIN width analysis, more reliable and more accurate auto-location may be performed.

In addition, the COIN width analysis may not require additional hardware and is compatible with standard hardware and system configurations equipped with vehicles and vehicle manufacturing facility. As the auto-location with high precision may be performed, more upgraded and safety based functionality may be provided to vehicle manufacturers and drivers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A wheel auto-location method, comprising:
receiving at a control unit of a vehicle, from one of a plurality of tire pressure monitoring (TPM) sensors, a radio frequency (RF) transmission that indicates a TPM sensor wheel phase angle measurement point during a rotation of a wheel and TPM sensor parameters, wherein the RF transmission is associated with a phase correlation data storage event trigger;
storing a current content of a rolling window of antilock brake system (ABS) data for each of a plurality of ABS sensors indicative of a wheel phase angle in response to the phase correlation data storage event trigger, wherein a time period covered by the rolling window is the same or greater than a time period between the TPM sensor wheel phase angle measurement point and a receipt point of the RF transmission, and the current content of the rolling window corresponds to the ABS data incremented between the TPM sensor wheel phase angle measurement point and the receipt point of the RF transmission;

calculating a time of the TPM sensor wheel phase angle measurement point based on the time period between the TPM sensor wheel phase angle measurement point and the receipt point of the RF transmission;

determining a relevant ABS data value at the time of the TPM sensor wheel phase angle measurement point from the current content of the rolling window of the ABS data based on the TPM sensor wheel phase angle measurement point over time;

receiving further measurements that indicate the TPM sensor wheel phase angle at multiple points in time;

determining the relevant ABS data for each of the plurality of ABS sensors for each of the multiple points in time for which the TPM sensor wheel phase angle is received;

generating a histogram array for the relevant ABS data for each of the plurality of ABS sensors, the histogram array comprising a plot of the relevant ABS data and the TPM sensor wheel phase angle;

applying a confidence interval to each histogram array of the relevant ABS data, wherein the confidence interval excludes outlier data;

calculating a confidence interval (COIN) width value from each histogram array from which the outlier data has been excluded; and applying an auto-location algorithm to identify a specific location of the wheel based on determining which of the plurality of ABS sensors generates the histogram with the lowest COIN width value for the TPM sensor wheel phase angle and assigning one of the plurality of TPM sensors to a same wheel location as the ABS sensor having the lowest COIN width value.

2. The method of claim 1, further comprising determining a COIN width margin for each of the plurality of TPM sensors and
wherein applying the auto-location algorithm further comprises applying the auto-location algorithm to identify the specific location of the wheel based on the lowest COIN width value and the COIN width margin.

3. The method of claim 1, further comprising determining a COIN width threshold for each of the plurality of TPM sensors and
wherein applying the auto-location algorithm further comprises applying the auto-location algorithm to identify the specific location of the wheel based on the lowest COIN width value and the COIN width threshold.

4. The method of claim 2, further comprising determining a COIN width threshold for each of the plurality of TPM sensors and
wherein applying the auto-location algorithm further comprises applying the auto-location algorithm to identify the specific location of the wheel based on the lowest COIN width value, the COIN width margin and the COIN width threshold.

5. The method of claim 1, wherein applying the auto-location algorithm comprises:
selecting a histogram showing a normal distribution pattern, or a pattern which is most similar to the normal distribution pattern; and
identifying the specific location of the wheel based on a location of an ABS sensor corresponding to a selected histogram,
wherein the selected histogram has the lowest COIN width value.

6. A method for performing auto-location of a wheel in a vehicle, comprising:
arranging a wheel unit to be associated with a wheel of the vehicle, the wheel unit comprising a tire pressure monitoring ("TPM") sensor and a wheel phase angle sensor and the wheel unit transmitting TPM sensor parameters;
arranging an antilock brake system ("ABS") sensor to be associated with each wheel of the vehicle, the ABS sensor producing ABS data indicative of the wheel phase angle;
upon rotation of the wheel, detecting with the wheel phase angle sensor a first time (T1) at a predetermined wheel phase angle;
at a second time (T2), sending from the wheel unit a radio frequency (RF) transmission;
at an electronic control unit ("ECU"), receiving the RF transmission;
continually maintaining a rolling window of the ABS data associated with each wheel;
storing a current content of the rolling window of ABS data for each wheel upon receipt of the RF transmission;
calculating the first time (T1) based on a predetermined time delay (T2-T1) between the first time (T1) and the second time (T2);
determining the ABS data at the first time (T1) for each wheel;
generating a histogram array for the relevant ABS data for each of the ABS sensors, the histogram array comprising a plot of the relevant ABS data and the wheel phase angle;
applying a confidence interval to each histogram array of the ABS data, wherein the confidence interval excludes outlier data;
calculating a confidence interval (COIN) width value from each histogram array from which the outlier data has been excluded;
identifying a location of the wheel whose COIN width value of ABS data is the smallest.

7. The method of claim 6, wherein the ABS data at the first time (T1) comprises ABS tooth counts of the ABS sensor, and generating the histogram array comprises:
converting the ABS tooth counts for each RF transmission to a bin number, the bin number representing a rotation degree of the wheel;
storing an occurrence count of the identical bin number in the histogram array; and
formulating a histogram having one axis showing the bin number converted from the ABS tooth counts and the other axis showing the occurrence count of the identical bin number.

8. The method of claim 6, wherein the ABS data at the first time (T1) comprises ABS tooth counts of the ABS sensor, and the method further comprising:
monitoring a trend of the ABS tooth counts;
detecting a stop event when the ABS tooth counts show no change for a first predetermined monitoring period;
detecting a move event when the ABS tooth counts show a gradual change for a second predetermined monitoring period; and
detecting a second stop event when the ABS tooth counts show no change for the first predetermined monitoring period.

9. The method of claim 8, further comprising:
upon detection of a rollback event, calculating a COIN width value from the histogram array for the ABS data until the time of the rollback event.

10. The method of claim 9, wherein calculating the COIN width value comprises calculating a weighted cumulative COIN width, which is a function of accumulated COIN width values and a respective number of ABS tooth counts corresponding to each of the COIN width values.

11. The method of claim 6, wherein the step of identifying a location of the wheel comprises identifying the location of the wheel whose ABS sensor shows a histogram having a normal distribution pattern.

12. The method of claim 6, wherein the step of identifying a location of the wheel comprises excluding the location of the wheel whose ABS sensor shows a histogram having a random or non-normal distribution pattern.

13. The method of claim 6, further comprising defining a boundary of a histogram to determine the COIN width with respect to each ABS sensor.

14. A wheel auto-location method, comprising:
receiving, from one of a plurality of tire pressure monitoring (TPM) sensors, a radio frequency (RF) transmission indicating a TPM sensor wheel phase angle measurement point during rotation of a wheel and TPM sensor parameters;
calculating a time of the TPM sensor wheel phase angle measurement point based on the RF transmission;
maintaining a rolling window of ABS data for each of a plurality of ABS sensors and capturing a relevant rolling window of ABS data at the time of the TPM sensor wheel phase angle measurement point;
monitoring the ABS data and detecting a rollback event which causes the ABS data to represent an irregular pattern;
generating a histogram array for the relevant ABS data for each of the ABS sensors, the histogram array comprising the relevant ABS data and the wheel phase angle;
applying a confidence interval to each histogram array of the ABS data, wherein the confidence interval excludes outlier data;
calculating a confidence interval (COIN) width value from each histogram array from which the outlier data has been excluded;
correlating the ABS data at the one-measurement point with a specific location of a wheel based on confidence interval (COIN) width analysis of the relevant rolling window of ABS data at the time of the TPM sensor wheel phase angle measurement point; and
determining the specific location of the wheel where the TPM sensor parameters are assigned.

15. The method of claim 14, wherein correlating the ABS data with the specific location of the wheel comprises:
converting the ABS data into an equivalent bin number;
counting an occurrence of the identical equivalent bin number;
formulating a histogram based on the equivalent bin number and the occurrence count of the identical equivalent bin number; and
applying an observed confidence level to the histogram and calculating a COIN width value.

16. The method of claim 15, further comprising identifying the specific location of the wheel whose ABS sensor shows a smallest COIN width value, wherein the smallest COIN width value is smaller than a COIN width threshold, and wherein the COIN width value from ABS sensors associated with remaining wheels are larger than the sum of the smallest COIN width value and COIN width margin.

17. The method of claim 14, further comprising:
calculating a COIN width based on the number of ABS teeth until the occurrence of the rollback event; and
calculating a weighted cumulative COIN width based on individual COIN width calculations and the count of the number of ABS teeth used in each COIN width calculation at the time of occurrence of each rollback event.

18. A tire pressure monitoring system for performing auto-location of a wheel in a vehicle, comprising:
a wheel unit to be associated with a wheel of the vehicle, the wheel unit comprising:
a tire pressure monitoring (TPM) sensor that measures TPM sensor parameters of the wheel; and
a wheel phase angle sensor that detects an angle of interest (P1) at a first time (T1);
wherein the wheel unit transmits at the second time (T2) a radio frequency (RF) message comprising:
an identification of the TPM sensor; and
measured TPM sensor parameters; and
an electronic control unit ("ECU") of the vehicle in communication with the wheel unit and an ABS sensor; and
computer program code operable in conjunction with the ECU of the vehicle, the ECU in communication with the wheel unit and the ABS sensor of the vehicle, wherein in response to the phase correlation data storage event trigger, the ECU is operable in response to the computer program code to execute instructions of:
calculating the first time (T1) based on a predetermined time delay (T2-T1);
storing a count of a number of ABS teeth which represents the number of ABS teeth that have passed each ABS sensor in a given period of time and is indicative of wheel phase angle based on a phase correlation data storage event trigger and determining the count of the number of ABS teeth or data at the first time (T1);
generating a histogram array for the relevant ABS data for each of the ABS sensors, the histogram array comprising the relevant ABS data and the wheel phase angle;
applying a confidence interval to each histogram array of the ABS data, wherein the confidence interval excludes outlier data;
calculating a confidence interval (COIN) width value from each histogram array from which the outlier data has been excluded;
correlating a location of the wheel with a location of the ABS sensor based on the confidence interval (COIN) width value calculated from the count of the number of ABS teeth at the first time (T1); and
associating the TPM sensor parameters with the determined location of the wheel.

19. The system of claim 18, wherein the ECU is further operable to execute instructions of determining the location of the wheel based on a lowest COIN width value and at least one of a predetermined COIN width margin, or a predetermined COIN width threshold.

20. The system of claim 18, wherein the ECU is further operable to execute instructions of:
detecting a rollback event and calculating a COIN width based on the number of ABS teeth until an occurrence of the rollback event; and
calculating a weighted cumulative COIN width based on individual COIN width calculations and the count of the number of ABS teeth used in the COIN width calculation at the time of occurrence of the rollback event.

* * * * *